US012715664B2

(12) United States Patent
Paget et al.

(10) Patent No.: US 12,715,664 B2
(45) Date of Patent: Aug. 25, 2026

(54) PATTERNED CAN END MODULAR DISPENSING SYSTEMS WITH ENHANCED RECYCLABILITY

(71) Applicant: C-Loop Packaging Sweden AB, Stockholm (SE)

(72) Inventors: Nicholas Guy Paget, Stockholm (SE); Ross Graham Murdoch, Stockholm (SE); Matthew Eric Batchelor, London (GB); Alexander Pierre Du Preez, London (GB)

(73) Assignee: C-Loop Packaging Sweden AB, Stockholm (SE)

( * ) Notice: Subject to any disclaimer, the term of this patent is extended or adjusted under 35 U.S.C. 154(b) by 0 days.

(21) Appl. No.: 18/251,177

(22) PCT Filed: Oct. 30, 2021

(86) PCT No.: PCT/IB2021/060067
§ 371 (c)(1),
(2) Date: Apr. 28, 2023

(87) PCT Pub. No.: WO2022/091044
PCT Pub. Date: May 5, 2022

(65) Prior Publication Data
US 2024/0025603 A1 Jan. 25, 2024

Related U.S. Application Data

(60) Provisional application No. 63/202,205, filed on Jun. 1, 2021, provisional application No. 63/202,206, filed
(Continued)

(30) Foreign Application Priority Data

Oct. 28, 2021 (AU) ................................ 202116648
Oct. 29, 2021 (EM) ........................ 008741391-0001
Oct. 29, 2021 (EM) ........................ 008741391-0002

(51) Int. Cl.
*B65D 45/32* (2006.01)
*B05B 11/00* (2023.01)
(Continued)

(52) U.S. Cl.
CPC ........ *B65D 45/325* (2013.01); *B05B 11/0005* (2013.01); *B65D 17/4014* (2018.01);
(Continued)

(58) Field of Classification Search
CPC .......... B65D 45/325; B65D 2251/0025; B65D 2251/0093; B65D 17/10; B65D 17/08;
(Continued)

(56) References Cited

U.S. PATENT DOCUMENTS 1,813,859 A 7/1931 Lawrence
1,972,172 A 9/1934 Spencer
(Continued)

FOREIGN PATENT DOCUMENTS

AU 2020104293 A4 3/2021
BE 730184 A 9/1969
(Continued)

OTHER PUBLICATIONS

Alibaba.com, Aluminum Perfume Bottle Essential Oil Aluminum Bottle Mist Spray Bottle, accessed Sep. 3, 2020, retrieved from the internet, <https://www.alibaba.com/product-detail/aluminum-perfume-bottle-essential-oil-aluminum_286306014.html?spm=a2700.details.deiletai6>.
(Continued)

*Primary Examiner* — Steven A. Reynolds
*Assistant Examiner* — Prince Pal
(74) *Attorney, Agent, or Firm* — Thompson Patent Law Offices PC

(57) ABSTRACT

Apparatus and associated methods relate to a can having a pattern of radial displacement of material of a malleable can
(Continued)

end with respect to a longitudinal axis of a malleable can body. In an illustrative example, the can end may sealingly couple to an open end of the longitudinally extending can body by a circumferential seam to form a sealed cavity. A can-opening dispenser may, for example, include at least one radially displaceable element (RDEL) configured such that, when operated into releasable engagement with the radially patterned seam, the dispenser resists rotation relative to the can about the longitudinal axis of the can. The RDEL may, for example, be radially deflected by operation of a collar in a first rotational direction (FRD). Continued operation of the collar in the FRD may, for example, operate an opening member to open the can. Various embodiments may advantageously provide self-opening dispensers for recyclable cans.

17 Claims, 36 Drawing Sheets

Related U.S. Application Data on Jun. 1, 2021, provisional application No. 63/202,207, filed on Jun. 1, 2021, provisional application No. 63/202,215, filed on Jun. 1, 2021, provisional application No. 63/107,603, filed on Oct. 30, 2020.

(51) Int. Cl.
*B65D 17/28* (2006.01)
*B65D 77/04* (2006.01)

(52) U.S. Cl.
CPC .. *B65D 77/0486* (2013.01); *B65D 2251/0025* (2013.01); *B65D 2251/0093* (2013.01)

(58) Field of Classification Search
CPC .. B65D 17/401; B65D 17/4014; B65D 17/02; B65D 1/12; B05B 11/1047; B05B 11/0038
USPC ..... 206/222, 221, 532; 215/257, 258.4, 272, 215/277, 297, 200; 222/212
See application file for complete search history.

(56) References Cited

U.S. PATENT DOCUMENTS 2,001,553 A 5/1935 Spencer
2,581,768 A 1/1952 O'gasey
3,033,415 A 5/1962 Carroll
3,043,485 A * 7/1962 Ewert ................ B65D 47/0866 222/545
3,069,040 A * 12/1962 Corsette ................ B65D 41/17 215/354
3,357,229 A 12/1967 Luedi
3,599,836 A 8/1971 Hegi
3,729,032 A 4/1973 Tischlinger et al.
4,077,178 A 3/1978 Nelson et al.
4,244,489 A 1/1981 Klein
4,976,368 A 12/1990 Klein
5,119,955 A * 6/1992 Granofsky ........... B65D 17/506 220/254.2
5,176,278 A * 1/1993 Quarberg ............... B65D 51/20 220/729
5,348,174 A * 9/1994 Velicka .................. B65D 83/38 220/915
5,431,305 A * 7/1995 Kaminski ............ B65D 47/244 222/521
5,645,190 A * 7/1997 Goldberg ............... B65D 1/165 220/674
5,680,952 A 10/1997 Chasteen
5,692,633 A 12/1997 Gordon
5,875,936 A * 3/1999 Turbett ............... B05B 11/0094 222/536
6,450,358 B1 * 9/2002 Berro ..................... B65D 25/48 220/780
6,477,743 B1 * 11/2002 Gross ................... B65D 51/226 222/499
D478,273 S * 8/2003 Derman ......................... D9/691
6,702,161 B2 * 3/2004 Adams ................. B65D 51/227 206/532
6,915,553 B2 7/2005 Turner et al.
7,055,868 B2 6/2006 Watanabe
7,111,763 B2 * 9/2006 Masuda .............. B05B 11/1047 222/105
7,152,766 B1 12/2006 Walsh et al.
7,458,486 B2 12/2008 Weist et al.
7,971,739 B2 * 7/2011 Ammann ............. B65D 51/227 215/250
7,980,424 B2 7/2011 Johnson
8,087,547 B1 1/2012 Lindsey
8,088,423 B2 1/2012 Ohresser et al.
8,141,700 B2 * 3/2012 Simonian ........... B65D 51/2892 222/145.5
8,205,771 B2 6/2012 Compton
8,297,456 B1 * 10/2012 Anderson ............ B65D 51/225 215/257
8,302,803 B1 11/2012 Greenberg et al.
8,534,490 B2 * 9/2013 Chapin .............. B65D 17/4012 220/729
8,556,123 B2 * 10/2013 Py ...................... B65D 47/2075 222/491
8,602,266 B2 * 12/2013 Canfield ............. B05B 11/1033 222/207
8,668,400 B2 * 3/2014 Ecker ................... A01K 13/003 222/91
8,820,554 B2 * 9/2014 Rho ..................... B65D 51/225 215/349
8,844,761 B2 * 9/2014 Zabaleta .............. B65D 17/401 220/267
8,939,308 B2 1/2015 Ramsey et al.
9,150,336 B2 10/2015 Brandenburger et al.
9,272,827 B2 3/2016 Marina et al.
9,415,990 B2 8/2016 Campanelli et al.
9,527,639 B2 12/2016 Walton
9,580,203 B2 2/2017 Frank
9,580,299 B2 2/2017 Dehe et al.
9,815,676 B2 11/2017 Witte et al.
9,821,928 B2 11/2017 Forrest et al.
9,896,237 B2 2/2018 Gogola et al.
10,017,295 B2 7/2018 Chasteen et al.
10,285,908 B2 * 5/2019 Mittal .................... B65D 41/34
10,569,150 B1 2/2020 Botsko et al.
10,954,031 B2 3/2021 Stammen et al.
10,968,010 B1 4/2021 Zabaleta et al.
11,033,920 B2 * 6/2021 Toh ......................... B05B 15/30
11,059,064 B2 * 7/2021 Smalley .............. B05B 11/1001
11,117,149 B2 * 9/2021 Holtzman ........... B05B 11/0054
11,745,915 B2 9/2023 Stammen et al.
11,752,513 B2 9/2023 Goettke
11,772,111 B1 * 10/2023 Busch ................. B05B 11/0008 222/110
11,952,164 B1 * 4/2024 Zabaleta .............. B65D 17/401
12,168,240 B2 * 12/2024 Toh ...................... A47K 5/1201
2003/0150866 A1 8/2003 Brifcani et al.
2003/0197018 A1 10/2003 Chupak
2004/0026354 A1 * 2/2004 Folchini ............... B65D 45/325 215/277
2004/0067090 A1 * 4/2004 Budds .................. B65D 51/222 401/133
2005/0263414 A1 12/2005 Harilela et al.
2007/0095857 A1 * 5/2007 Py ........................ B65D 47/205 222/91
2008/0105640 A1 5/2008 Ott
2008/0302756 A1 * 12/2008 Phillips .................. B65D 51/20 215/329
2008/0308554 A1 * 12/2008 Farrar .................. B65D 47/122 220/281
2009/0084814 A1 4/2009 Wisniewski et al.

(56) References Cited

U.S. PATENT DOCUMENTS

| | | | |
|---|---|---|---|
| 2009/0289025 A1 | 11/2009 | Mueller et al. | |
| 2010/0059516 A1 | 3/2010 | Parker et al. | |
| 2010/0251799 A1 | 10/2010 | Gogola | |
| 2011/0100854 A1 | 5/2011 | Chapin | |
| 2011/0303672 A1 | 12/2011 | Fields et al. | |
| 2012/0000340 A1 | 1/2012 | Kojima et al. | |
| 2012/0078222 A1 | 3/2012 | Smith et al. | |
| 2013/0134173 A1 | 5/2013 | Riley et al. | |
| 2013/0224420 A1 | 8/2013 | McCann, III et al. | |
| 2014/0083879 A1* | 3/2014 | Ulstad | B65D 51/225 215/11.1 |
| 2014/0151396 A1 | 6/2014 | Stehli et al. | |
| 2015/0210458 A1* | 7/2015 | Ziegenfelder | B65D 83/771 53/476 |
| 2015/0329238 A1 | 11/2015 | Chasteen et al. | |
| 2015/0360826 A1* | 12/2015 | Fournier | B65D 51/002 215/277 |
| 2015/0368033 A1 | 12/2015 | Krug et al. | |
| 2016/0016223 A1 | 1/2016 | Wilkinson et al. | |
| 2017/0144176 A1* | 5/2017 | Toh | B05B 11/0008 |
| 2017/0173615 A1* | 6/2017 | Toh | B05B 11/001 |
| 2017/0183132 A1* | 6/2017 | Frishman | B21D 51/443 |
| 2018/0065168 A1* | 3/2018 | Obata | B21D 51/32 |
| 2019/0030201 A1* | 1/2019 | Gruenbacher | B60H 3/0028 |
| 2019/0112100 A1* | 4/2019 | Scott | B21D 22/28 |
| 2020/0023391 A1* | 1/2020 | Cesare | B65D 75/5883 |
| 2020/0122172 A1 | 4/2020 | Tortosa Maroto | |
| 2020/0156833 A1* | 5/2020 | Le | B05B 11/0044 |
| 2020/0255193 A1* | 8/2020 | Weishaar | B65D 47/066 |
| 2021/0251432 A1 | 8/2021 | Chen et al. | |
| 2021/0253303 A1* | 8/2021 | Bartolucci | B67C 7/00 |
| 2022/0063864 A1 | 3/2022 | Forrest et al. | |
| 2022/0106691 A1 | 4/2022 | Finke | |
| 2022/0152639 A1* | 5/2022 | Moretti | B05B 11/026 |
| 2022/0176394 A1* | 6/2022 | Ophardt | B05B 11/1011 |
| 2022/0218136 A1 | 7/2022 | Pontecorvo | |
| 2022/0248915 A1 | 8/2022 | Yang et al. | |
| 2022/0292573 A1 | 9/2022 | Ferguson et al. | |
| 2022/0402664 A1* | 12/2022 | Dirx | B67D 1/0462 |
| 2023/0021579 A1* | 1/2023 | Zabaleta | B65D 17/4014 |
| 2023/0302517 A1* | 9/2023 | Fitzsimons | B65D 1/265 |
| 2023/0331435 A1 | 10/2023 | Piech | |
| 2024/0025603 A1* | 1/2024 | Paget | B65D 17/401 |
| 2024/0050972 A1* | 2/2024 | Wells | B65D 17/501 |
| 2024/0217714 A1* | 7/2024 | Nelson | B65D 45/325 |
| 2024/0237860 A1 | 7/2024 | Wells | |

FOREIGN PATENT DOCUMENTS

| | | | |
|---|---|---|---|
| CA | 3200106 | A1 | 5/2022 |
| CN | 1902895 | U | 7/2011 |
| CN | 201895865 | U | 7/2011 |
| CN | 204872022 | U | 12/2015 |
| CN | 112933332 | A | 9/2022 |
| CN | 116761761 | A | 9/2023 |
| DE | 1033534 | B | 7/1958 |
| DE | 2307715 | A1 | 9/1973 |
| EM | DM219193 | | 1/2021 |
| EM | 018657015 | | 6/2022 |
| EP | 0512832 | A2 | 11/1992 |
| EP | 0512832 | A3 | 3/1993 |
| EP | 0929450 | A | 7/1999 |
| EP | 1795278 | A1 | 6/2007 |
| EP | 2143458 | B1 | 5/2017 |
| EP | 3388359 | A1 | 10/2018 |
| EP | 4237344 | A1 | 9/2023 |
| FR | 1263290 | A | 6/1961 |
| FR | 2217222 | A1 | 9/1974 |
| FR | 2361276 | A1 | 3/1978 |
| GB | 968966 | A | 9/1964 |
| GB | 1247107 | A | 9/1971 |
| GB | 1583980 | A | 2/1981 |
| GB | 2240330 | A | 7/1991 |
| GB | 2586015 | A | 2/2021 |
| JP | H10137638 | A | 5/1998 |
| JP | 2001328655 | A | 11/2001 |
| JP | 2002179063 | A | 6/2002 |
| JP | 4762426 | B2 | 9/2002 |
| JP | 2003002328 | A | 1/2003 |
| JP | 4560298 | | 8/2005 |
| JP | 2008114859 | A | 5/2008 |
| JP | 2009515782 | A | 4/2009 |
| JP | 2010235146 | A | 10/2010 |
| JP | 5362611 | B2 | 12/2013 |
| JP | 2020152406 | A | 9/2020 |
| JP | 2024076861 | A | 6/2024 |
| JP | 7682635 | B | 5/2025 |
| KR | 2019980068907 | | 12/1998 |
| KR | 20150003475 | U | 9/2015 |
| KR | 1020180086091 | | 7/2018 |
| TW | 202102428 | A | 1/2021 |
| WO | 9312013 | A1 | 6/1993 |
| WO | 9508317 | A1 | 3/1995 |
| WO | 2008069213 | A1 | 6/2008 |
| WO | 2010044659 | A1 | 4/2010 |
| WO | 2012143263 | A1 | 10/2012 |
| WO | 2013172783 | A1 | 11/2013 |
| WO | 2016170883 | A1 | 10/2016 |
| WO | 2017078692 | A1 | 5/2017 |
| WO | 2017151419 | A1 | 9/2017 |
| WO | 2018114301 | A1 | 6/2018 |
| WO | 2020148332 | A1 | 2/2020 |
| WO | 2021002748 | A1 | 1/2021 |
| WO | 2021013492 | A1 | 1/2021 |
| WO | 2021032885 | A1 | 2/2021 |
| WO | 2021048752 | A1 | 3/2021 |
| WO | 2021138708 | A1 | 7/2021 |
| WO | 2021245430bA1 | | 12/2021 |
| WO | 2022091044 | A1 | 5/2022 |
| WO | 2022140818 | A1 | 7/2022 |
| WO | 2023000034 | A1 | 1/2023 |
| WO | 2023141331 | A1 | 7/2023 |
| WO | 2023144504 | A1 | 8/2023 |
| WO | 2024023505 | A1 | 2/2024 |
| WO | 2024127281 | A2 | 6/2024 |
| WO | 2024127281 | A3 | 6/2024 |

OTHER PUBLICATIONS

Chneeu, 6 Pcs Pastry Wheel Decorator Cutter, Cookie Cutter Wheel Pizza Baking Beads Pie Crust Cutters, DIY Baking Cooking Tool, retrieved from the internet, <https://www.amazon.com/Pastry-Decorator-Cutter-Cutters-Cooking/dp/B07WTTXFS6/ref=sr_1_11?dchild=1&keywords=pie+edge+crimper&qid=1633658572&sr=8-11>.

Coffee Brewster, How does a Keurig work? Understand the K-Cups and machines, retrieved from the internet, <https://coffeebrewster.com/best-coffee-maker/keurig/how-does-it-work/>.

Cottage Craft Works, Pie Maker | Fruit Dough | Pie Crust | Turnover Machine, retrieved from the internet, <https://cottagecraftworks.com/pie-maker-fruit-dough-pie-crust-turnover-machine>.

Graybill Machines, Pie Shell Press Machine, retrieved from the internet, <https://www.graybillmachines.com/projects/pie-shell-press-machine/>.

International Preliminary Report on Patentability in related International Application No. PCT/IB2021/060067, dated Feb. 2, 2023, 48 pages.

International Search Report and Written Opinion of the International Searching Authority in related International Application No. PCT/IB2021/060067, dated Feb. 23, 2022, 17 pages.

Jokari, Jokari Fizz-Keeper Can Pump and Pour, Assorted Colors (Pack of 3), retrieved from the internet <https://www.amazon.com/Jokari-Fizz-Keeper-Pump-Assorted-Colors/dp/B07ZJ5BM29/ref=sr_1_3?keywords=jokari%2Bfizz%2Bkeeper&qid=1682613669&sr=8-3&th=1>.

Mason Jar Lifestyle, Daisy Straw Hole Lids for Regular Mouth Mason, Ball, Canning Jars, retrieved from the internet, <https://www.amazon.com/Daisy-Regular-Mason-Canning-Yellow/dp/

(56) References Cited

OTHER PUBLICATIONS

B013O5NSRY/ref=sr_1_12?dchild=1&keywords=daisy%2Bmason%2Bjar%2Blids&qid=1633655218&sr=8-12&th=1>.
Mjtrinihobby, Topping Up a Car's R134a Air Conditioning System, Autodesk Instructables, retrieved from the internet <https://www.instructables.com/Topping-up-a-car-air-conditioning/>.
Smart House Inc, Clear Soda Can Lids (6 Pack) | Superior Can Covers For Soda, Beer, Energy Drinks, Juice, Seltzer | Must-Have Picnic Accessories & Beach Gadgets | BPA-Free Reusable Fizz Lids | By Smart House Inc, retrieved from the internet <https://www.amazon.com/Clear-Soda-Can-Lids-Pack/dp/B07V7SD7SN/ref=sr_1_4?dchild=1&keywords=soda%2Bcan%2Bcap%2Bsaver&qid=1599089747&sr=8-4&tag=duc0c-20&th=1>.
Smokea, Smokea Metal N2O Nitrous Oxide Canister Cracker, retrieved from the internet, <https://smokea.com/products/smokea-metal-n20-nitrous-oxide-canister-cracker?variant=31343456193>.
Trades, Simple Reuse System, retrieved from the internet, <https://tradesforgood.com/blogs/the-problem/packaged-for-good>.
Tuvie, Cans 'n Caps: Re-use Your Aluminum Beverage Can to Reduce Aluminum Waste, retrieved from the internet <https://www.tuvie.com/cans-n-caps-re-use-your-aluminum-beverage-can-to-reduce-aluminum-waste/>.
Written Opinion of the International Preliminary Examining Authority in related International Application No. PCT/IB2021-060067, dated Oct. 18, 2022, 11 pages.
Zawada, C, Lejonet & Bjornen, retrieved from the internet, <https://designbro.com/lovelypackage/lejonet-bjornen/>.
Certificate of Registration of related Australian Design No. 202116648, Feb. 7, 2022.
Certificate of Registration of related Australian Design No. 202210051, Feb. 7, 2022.
Certificate of Registration of related Europe Design No. 008741391-0001, Oct. 29, 2021.
Certificate of Registration of related Europe Design No. 008741391-0002, Oct. 29, 2021.
Certificate of Registration of related Switzerland Design No. 146385, Nov. 7, 2021.
Certificate of Registration of related United Kingdom Design No. 6173086, Oct. 29, 2021.
Bibliographic Data, Korea Intellectual Property Office, in application No. KR201980018031, dated Sep. 21, 1998, 7 pages.
Examiner Williams, Intellectual Property Office, Examination Report under Section 18(3), dated May 31, 2024, 3 pages.
International Preliminary Report on Patentability in International Application No. PCT/AU2022/050774, dated Jan. 18, 2024, 12 pages.
International Preliminary Report on Patentability in International Application No. PCT/GB2023/050021, dated Jul. 30, 2024, 8 pages.
International Written Opinion in International Application No. PCT/AU2021/051486, dated Mar. 10, 2022, 7 pages.
Korea Office Action in related Korea Application No. 10-2023-7017952, dated Jan. 13, 2025.
The click cap; Thirsty for change?, accessed May 20, 2024, www.theclickcap.com.
Japan Office Action in related application, dated Aug. 21, 2025, 4 pages.
International Preliminary Report on Patentability RE Crown Packaging Technology dated Jul. 30, 2024, 8 pages.
FireShot Pro Webpage Screenshot #1513 dated May 20, 2024, 12 pages.
FireShot Pro Webpage Screenshot #364 dated Jan. 12, 2024, 9 pages.
FireShot Pro Webpage Screenshot #1513 dated Dec. 7, 2022, 2 pages.
FireShot Pro Webpage Screenshot #557 dated Dec. 19, 2022, 3 pages.
Guinness, Explore Nitrosurge, Explore Guinness Nitrosurge, Guinness Draught Nitrosurge, 8, Guinness & Co., 2024.
Brazilian Office Action in related Brazil Application No. BR 11 2023 008324 9, dated Oct. 30, 2021, 4 pages.
First Chinese Office Action in related China Application No. 202180086403.0, dated Jul. 31, 2021, 9 pages.
Korean Office Action in related Korean Application No. 10-2023-7017952, dated Jan. 7, 2026, 6 pages.
Second Office Action in related China Application No. 202180086403.0, dated Feb. 6, 2026, 9 pages.
"202 B-64 Beer/Beverage .0088 Gauge Manufacturing Specification", Ball Corporation; dated Sep. 14, 2025; 1 page.
"202 Mini Seam Recommended Double Seam Specifications", Ball Corporation; dated Oct. 19, 2009; 1 page.
Filizola, D.M. et al.; "Annealing Effect on the Microstructure and Mechanical Properties of AA 5182 Aluminum Alloy", Materials Research; 2021; Received Dec. 1, 2020; Revised Feb. 12, 2021; Accepted Apr. 14, 2021; 9 pages.
Bandpay & Greuter; Facts and Arguments; Mar. 3, 2026; 46 pages.

* cited by examiner

PATTERNED CAN END MODULAR DISPENSING SYSTEMS WITH ENHANCED RECYCLABILITY

CROSS-REFERENCE TO RELATED APPLICATIONS

This application claims the benefit of U.S. Application Ser. No. 63/107,603, titled "Reusable Dispensing Cap for Recyclable Container and Closure," filed by Nicholas Guy Paget, et al., on Oct. 30, 2020.

This application claims the benefit of U.S. Application Ser. No. 63/202,205, titled "Patterned Can End and Reusable Dispensing Engine Used Therewith," filed by Nicholas Guy Paget, et al., on Jun. 1, 2021.

This application claims the benefit of U.S. Application Ser. No. 63/202,206, titled "Seaming of Patterned Can End," filed by Nicholas Guy Paget, et al., on Jun. 1, 2021.

This application claims the benefit of U.S. Application Ser. No. 63/202,207, titled "Reusable Dispensing Engine for Recyclable Container," filed by Nicholas Guy Paget, et al., on Jun. 1, 2021.

This application claims the benefit of U.S. Application Ser. No. 63/202,215, titled "Can End and Reusable Dispensing Engine," filed by Nicholas Guy Paget, et al., on Jun. 1, 2021.

This application claims the benefit of Australian Design Registration Application No. 202116648, titled "Patterned Can Seam," filed by C-Loop Packaging Sweden AB on Oct. 28, 2021.

This application claims the benefit of European Community Design Application No. 008741391, filed by C-Loop Packaging Sweden AB on Oct. 29, 2021.

This application claims the benefit of Switzerland Community Design Application for a Patterned Can Seam filed by C-Loop Packaging Sweden AB on Oct. 28, 2021.

This application incorporates the entire contents of the foregoing application(s) herein by reference.

TECHNICAL FIELD

Various embodiments relate generally to container seams, reusable dispensers, or some combination thereof.

BACKGROUND

Containers may be used to hold various contents. For example, plastic bottles of various shapes and sizes may be used to hold food items, personal care items, cleaners, and/or industrial chemicals. Metal cans may, for example, be used to hold beverages and/or paint.

Containers may have various closing mechanisms. For example, plastic bottles often have screw-on or snap-on lids. A shampoo bottle may, for example, have a snap-on lid. A soap bottle may, for example, have a screw-on lid. A user may operate the lid to provide access to the contents inside the container. Some containers may be unitarily formed (e.g., a sealed pouch). A user may, for example, cut and/or tear an aperture in the container to access the contents.

SUMMARY

Apparatus and associated methods relate to a can having a pattern of radial displacement of material of a malleable can end with respect to a longitudinal axis of a malleable can body. In an illustrative example, the can end may sealingly couple to an open end of the longitudinally extending can body by a circumferential seam to form a sealed cavity. A can-opening dispenser may, for example, include at least one radially displaceable element (RDISP) configured such that, when operated into releasable engagement with the radially patterned seam, the dispenser resists rotation relative to the can about the can's longitudinal axis. The RDISP may, for example, be radially deflected by operation of a collar in a first rotational direction (FRD). Continued operation of the collar in the FRD may, for example, operate an opening member to open the can. Various embodiments may advantageously provide self-opening dispensers for recyclable cans.

Various embodiments may achieve one or more advantages. For example, some embodiments may advantageously provide a reusable container opening and/or dispensing mechanism which may be releasably assembled with multiple containers. Various embodiments with reusable dispensers may advantageously facilitate, by way of example and not limitation, the use of a relatively higher quality, more durable, more accurate, more featureful, and/or otherwise more desirable dispenser than would typically be used with disposable containers. Some embodiments may advantageously, for example, facilitate a 'war on plastic' by reducing the use of non-recyclable or non-sustainable plastic materials.

Various embodiments may advantageously provide a recyclable container with a tab-less opening closure and a contoured-rim closure. A patterned seam may, for example, advantageously provide releasable engagement features, for example, for a closure-opening cap. In various embodiments a patterned seam may advantageously provide, by way of example and not limitation, mechanical coupling, visual identification, haptic identification, or some combination thereof. In various embodiments, a patterned seam of a distinct appearance and/or a tab-less closure may advantageously identify a container's contents as non-drinkable goods, without requiring further description or labeling. For example, various embodiments may advantageously provide container lids and self-opening dispensing mechanisms which advantageously identify contents as not "ready to consume," even in the absence of labeling to that effect. Accordingly, various embodiments may increase consumer safety.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a reusable dispensing engine and patterned container seam system is introduced with reference to FIGS. 1-7. Second, that introduction leads into a description with reference to FIGS. 8-16 of some exemplary embodiments of reusable dispensing engines. Third, with reference to FIGS. 17-20, exemplary embodiments of container ends, and container end patterns are described. Fourth, with reference to FIGS. 21, the discussion turns to exemplary embodiments that illustrate an exemplary threaded container end. Fifth, and with reference to FIGS. 22-24, this document describes exemplary apparatus and methods useful for creating patterned container seams. Sixth, this disclosure turns to a discussion of a container-restraining reusable dispensing engine with reference to FIG. 25. An exemplary embodiment of a multi-mode reusable dispensing engine is disclosed with reference to FIG. 26. The discussion turns, with reference to FIGS. 27A-27B, to exemplary multi-purpose reusable dispensing engines. Finally, the document discusses further embodiments, exemplary applications and aspects relating to reusable dispensing engines and patterned container seams.

Figure 1:
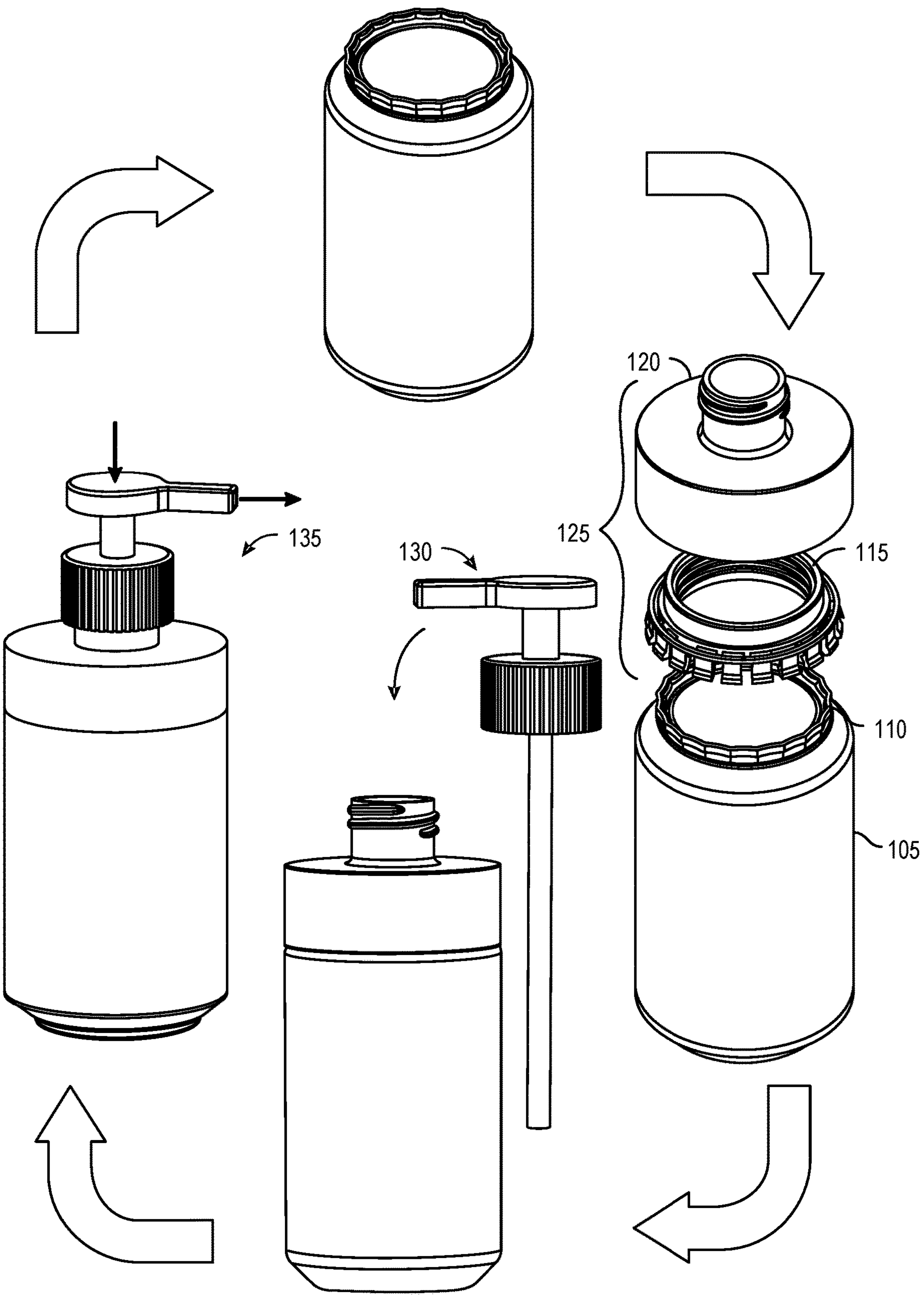
FIG. 1 depicts an illustrative lifecycle of an exemplary disposable container and closure assembly with a reusable dispensing engine.

FIG. 1 depicts an illustrative lifecycle of an exemplary disposable container and closure assembly with a reusable dispensing engine. In the depicted scenario, a container 105 is sealed with a patterned seam 110. A coupling engine 115 is configured to releasably couple to the seam 110. A dispensing housing 120 is provided which threadedly engages with the coupling engine 115 to releasably secure the dispensing housing 120 to the container 105. Together, the coupling engine 115 and the dispensing housing 120 form an RDE 125. As depicted, in a first step (upper center) a user provides a container 105. In a second step (right), the user assembles the RDE 125 onto the container 105.

As depicted, the RDE 125, a dispensing assembly 130 (e.g., pump) is assembled to the RDE 125 in a third step (bottom). In various embodiments the dispensing assembly 130 may, by way of example and not limitation, be configured as disclosed at least with reference to FIGS. 1A-1B and FIGS. 5A-5C of U.S. Application Ser. No. 63/107,603, titled “REUSABLE DISPENSING CAP FOR RECYCLABLE CONTAINER AND CLOSURE,” filed by Nicholas Guy Paget, et al., on Oct. 30, 2020, the entire contents of which are incorporated herein by reference. In the third step, the user threadedly assembles the dispensing assembly 130 with the dispensing housing 120 of the RDE 125. Accordingly, the user may advantageously assemble the RDE 125 and the dispensing assembly 130 onto a container 105 to create a dispensing system 135.

In a fourth step (left), the user may dispense contents of the container 105 by operating the pump, as depicted. In various embodiments the container 105 may be reusable, recyclable, refillable, or some combination thereof. In various embodiments the RDE 125 may advantageously provide a reusable container opening and/or dispensing mechanism which may be releasably assembled with multiple containers 105.

The RDE 125 may be disassembled from the container 105, in preparation for recycling the container 105 and releasably coupling the RDE to another unopened container (e.g., beginning again at the first step and repeating the cycle).

Figure 2:
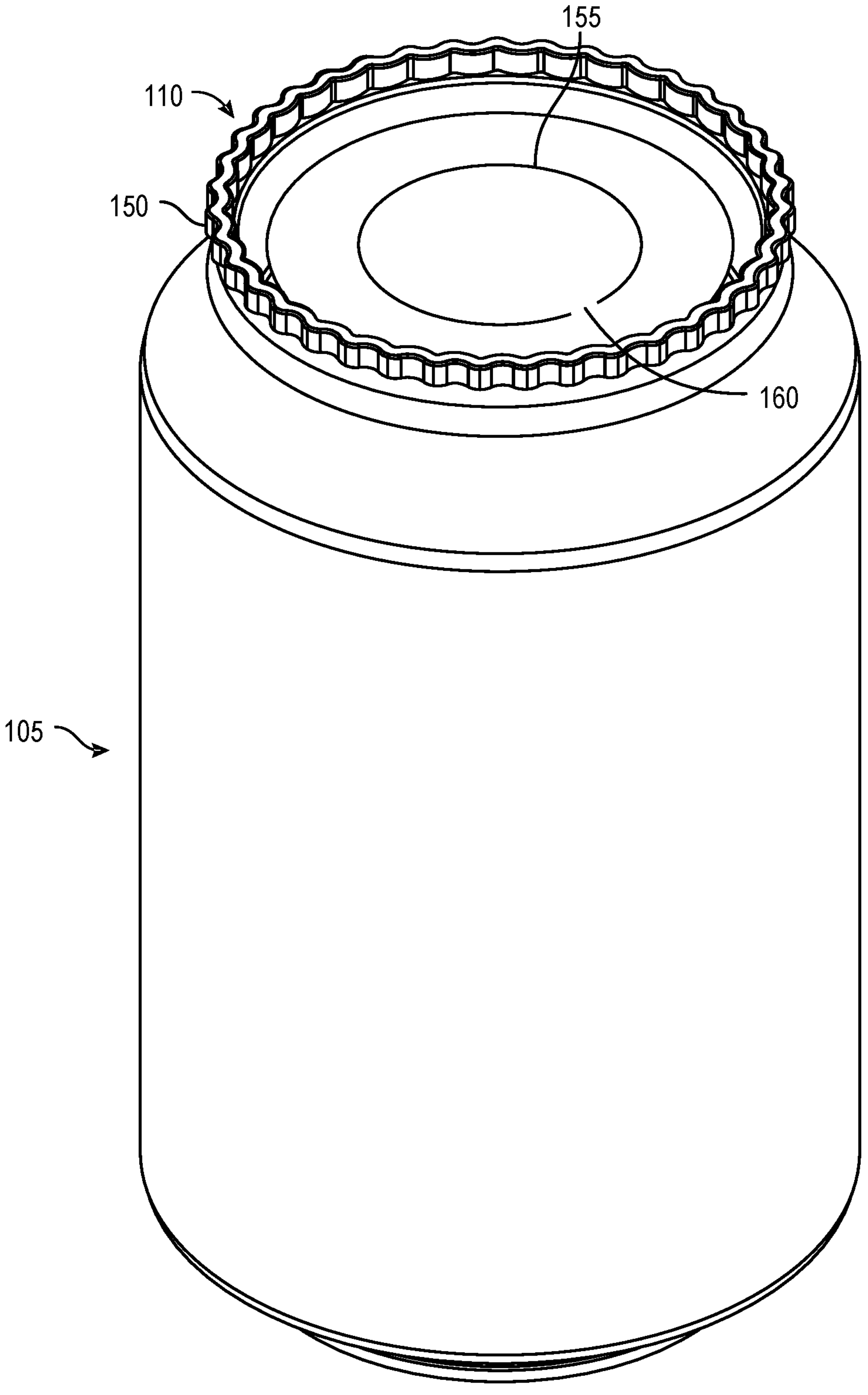
FIG. 2 depicts an exemplary patterned top of the RDE of FIG. 1.

FIG. 2 depicts an exemplary patterned top of the RDE of FIG. 1. As depicted, the container 105 is provided with the patterned seam 110. The seam 110 fluidly seals a container end (e.g., depicted as container end 205 in FIG. 3) to the container 105. In various embodiments the pattern of the seam 110 may advantageously provide, by way of example and not limitation, mechanical coupling, visual identification, haptic identification, or some combination thereof.

As depicted, the container 105 is provided with a tab-less opening closure. In some embodiments, the container 105 may, for example, be recyclable. The can body is provided with a tab-less opening can closure (e.g., labeled as 205 in FIG. 3). The can closure is provided with a stress concentration ring 155 interrupted by solid region 160. The can closure is sealed to the can body by a crimp seam 150.

In various embodiments the container 105 may, by way of example and not limitation, be a can. The can may, for example, be made of a malleable material. The can may, for example, be recyclable. In some embodiments the can may be metal (e.g., aluminum, steel). In some embodiments the container 105 may, for example, be a plastic container.

In various embodiments, the seam 110 may, for example, be patterned after seaming. In some embodiments the seam 110 may be seamed and patterned simultaneously. As an exemplary illustration, the seam 110 may be formed as a double seam. For example, material of a container body (e.g., can body) and/or container closure (e.g., can end) may be double-folded and cold-formed to sealingly couple the closure and body.

For example, the can body may be a standard aluminum can body, provided with a can end in the form of the tab-less opening can closure. By way of example and not limitation, the stress concentration ring 155 may be opened by a reusable opener, such as the exemplary RDE 125 of FIG. 1. The resulting aperture may advantageously permit communication between an exterior and interior of the container 105. For example, the aperture may provide fluid communication between the exterior and the interior of the container 105. In some embodiments (e.g., as depicted in FIG. 1), the aperture may permit entry of a dispensing pump (e.g., dispensing assembly 130), a utensil (e.g., a spoon or measuring device), other dispensing apparatus, or some combination thereof.

In some embodiments, the solid region 160 may be omitted and the stress concentration ring 155 may form a continuous curvilinear path. The stress concentration ring may be formed, for example, as multiple interrupted stress concentration features. The stress concentration ring may, for example, be formed as a much smaller arc. In some embodiments, a stress concentration region and/or path (e.g., the stress concentration ring 155) may be provided on an underside of a container end (e.g., interior to the cavity formed when the container and container end are sealingly assembled).

In some embodiments, the stress concentration ring 155 may, for example, define an area of at least 30% of the container closure. The stress concentration ring 155 may, for example, define an area no more than 80% of the area of the container closure. In some embodiments, the stress concentration ring 155 may define an area of at least 50% of the area of the container closure. In some embodiments the stress concentration ring 155 may define an area no more than 75% of the area of the container closure.

In various embodiments, the stress concentration ring 155 may include a contour in the closure (e.g., with at least one substantially right-angle shoulder, as depicted) such that pressing adjacent thereto creates an increased region of stress along a shoulder. The stress concentration ring 155 may, for example, include a portion of the closure having a thinner thickness. In various embodiments, the stress concentration ring 155 may be omitted altogether. For example, an opening device (e.g., a reusable closure-opening cap) may be used to open the can without a predetermined stress concentration path and/or region (e.g., such as stress concentration ring 155).

Figure 3:
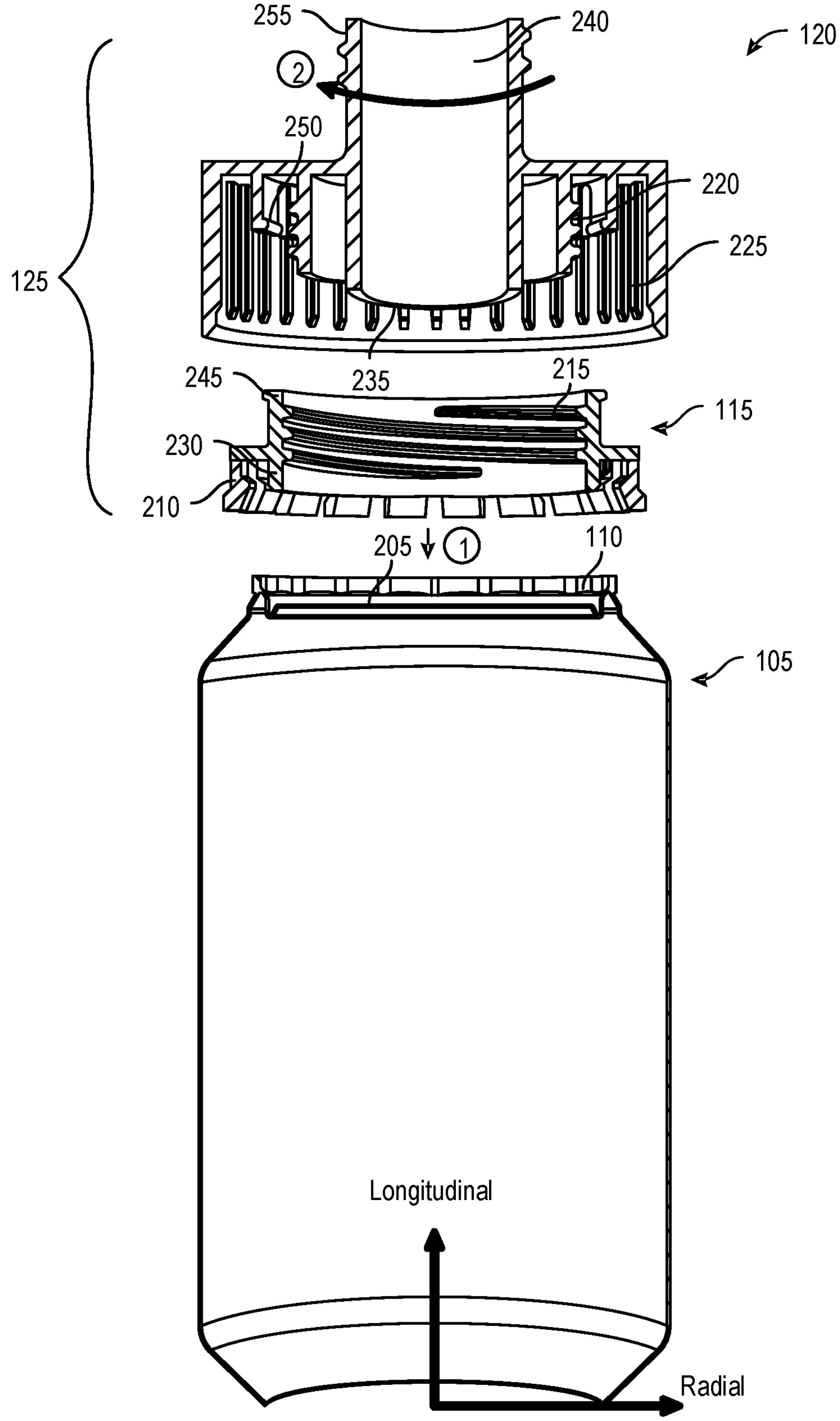
FIG. 3 depicts a cross-section of the exemplary RDE of FIG. 1.

FIG. 3 depicts a cross-section of the exemplary RDE of FIG. 1. As depicted, the seam 110 mechanically couples (e.g., fluidly seals) a container end 205 to the container 105.

The container end 205 may, for example, be made of a malleable material. The container end 205 may, for example, be recyclable. In some embodiments, the container end 205 may be a can end. For example, the can end may be a can shell. In some embodiments, the can end is aluminum. In some embodiments the can end is steel. In various embodiments, the container end 205 is sealingly coupled to the container 105 by the seam 110.

The coupling engine 115 is provided with lugs 210 in a circumferential pattern. In a first depicted operation ("1"), the coupling engine 115 is assembled along a longitudinal axis with the container 105 (e.g., can) such that the coupling engine 115 is releasably coupled to the seam 110 by the lugs 210.

The coupling engine 115 is provided with coupling features 215. The coupling features 215 releasably (e.g., threadedly) couple to mating coupling features 220 of the dispensing housing 120. In the depicted example, the coupling features 215 and the coupling features 220 are mating threads. Accordingly, in a second operation depicted ("2"), the housing 120 is threadedly coupled to the coupling engine 115.

The housing 120 is provided with pressing features 225. When the respective engagement features 215 and 220 of the coupling engine 115 and the housing 120 are threadedly engaged and the housing is operated in a first rotational direction (as depicted by the arrow associated with the second operation "2"), the housing 120 is advanced axially along a longitudinal axis toward the container 105. As the housing 120 is axially advanced, the pressing features 225 engage the lugs 210, urging them radially inwards towards a center of the coupling engine 115. Accordingly, the lugs 210 releasably engage the seam 110. The coupling engine 115 is thereby axially coupled to the seam 110 such that axial movement of the coupling engine 115 relative to the container 105 is constrained.

The coupling engine 115 is provided with a longitudinal extension 230. In the depicted example, the longitudinal extension 230 fits radially inward of the seam 110. Accordingly, as the lugs 210 are urged radially inward by the pressing features 225, the seam 110 is releasably trapped between the longitudinal extension 230 and the lugs 210. In various embodiments the longitudinal extension 230 may advantageously, by way of example and not limitation, strengthen the seam 110 against flexing and/or bending, increase axial and/or rotational force required to separate the coupling engine 115 from the seam 110, or some combination thereof.

Continued rotational operation (e.g., in the first rotational direction) of the housing 120 brings a hammer 235 in pressing engagement with the container end 205. Continued axial advancement (e.g., by continued rotational operation) of the housing 120 may, for example, cause the hammer 235 to open an aperture through the container end 205. Accordingly, a lumen 240 of the housing 120 may be advantageously placed in fluid communication with an interior of the container 105. Contents of the container 105 may, therefore, be advantageously dispensed through the lumen 240.

In some embodiments, the hammer 235 may, for example, pierce and/or cut the container end 205. For example, the hammer 235 may be provided with at least one piercing point and/or cutting edge. In some embodiments the hammer 235 may, for example, fracture and/or break the container end 205. For example, the hammer 235 may be blunt. The hammer 235 may, for example, induce material failure in the container end 205. For example, the hammer 235 may engage a predetermined region of elevated stress concentration in the container end 205 (e.g., a score line). In some embodiments the hammer 235 may, for example, unseal (a portion of) the container end 205.

In the depicted example, the housing 120 is provided with dispenser engagement features 255. The dispenser engagement features 255 may, for example, be configured to releasably couple to the dispensing system 135 (e.g., a hand pump), a spout, other dispenser, or some combination thereof.

Figure 4:
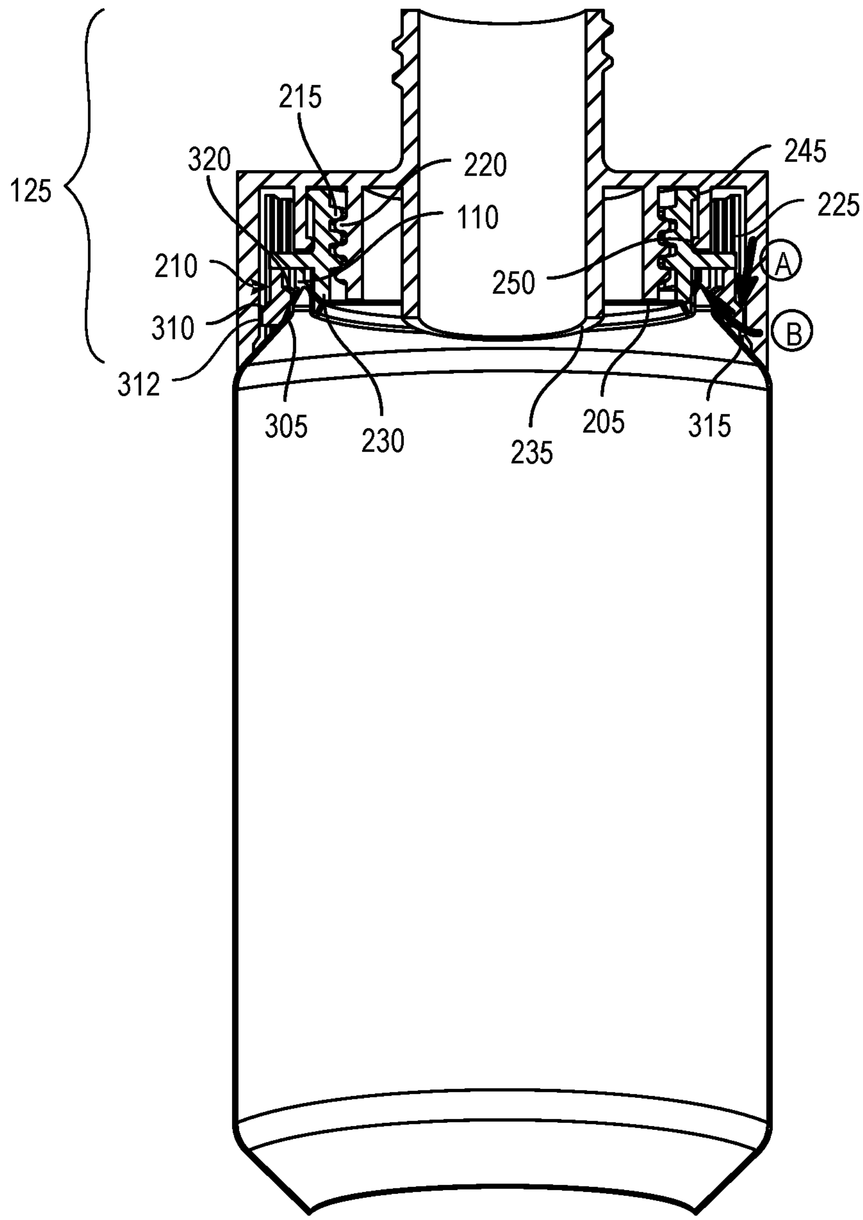
FIG. 4 depicts a cross-section of the exemplary RDE of FIG. 1 in a dispensing mode.

FIG. 4 depicts a cross-section of the exemplary RDE of FIG. 1 in a dispensing mode. As depicted, each lug 210 is provided with a seam engagement surface 305. In the depicted example, the seam engagement surface 305 is a substantially planar surface canted relative to the longitudinal axis of the container 105. In various embodiments the seam engagement surface 305 may, by way of example and not limitation, be curvilinear. For example, a radial distance from the center of the coupling engine 115 to the seam engagement surface 305 may monotonically decrease in an axial direction along the longitudinal axis away from the container 105. The seam engagement surface 305 may advantageously guide the lugs 210 over the seam 110 (e.g., radially outward of the seam 110) as the coupling engine 115 is axially assembled onto the container 105 (e.g., as depicted by operation "A").

Each lug 210 is further provided with a pressing surface 310. As depicted, the pressing surface 310 is provided on a radially outer surface of the corresponding lug 210. As the housing 120 is axially advanced over the coupling engine 115, engagement surfaces 315 of corresponding pressing features 225 engage the pressing surfaces 310. Continued axial advancement of the housing 120 over the coupling engine 115 induces inward radial deflection of the lugs 210 (e.g., as depicted by operation "B") by the pressing features 225 until the pressing features 225 slide off the pressing surfaces 310 to engage outer surfaces 312 of the lugs 210. Accordingly, inward radial deflection of the lugs 210 may advantageously (releasably) couple the coupling engine 115 to the seam 110, at least in an axial direction (e.g., along the longitudinal axis). In various embodiments the pressing surface 310 may, by way of example and not limitation, be planar (e.g., as depicted), curvilinear, having monotonically decreasing radius to the center of the coupling engine 115 in a direction away from the container 105 along the longitudinal axis, or some combination thereof.

Each lug 210 is further provided with a retention surface 320. The retention surface 320, as depicted, engages the seam 110. In a coupled mode, e.g., when the lugs 210 are deflected radially inward, the retention surface 320 may prevent disassembly of the coupling engine 115 from the seam 110. Accordingly, for example, the housing 120 may be advantageously retained in the fluid communication with the container 105. For example, engagement of the lugs 210 with the retention surface 320 may resist axial forces applied (e.g., incidentally, accidentally, purposely) to separate the housing 120 and the container 105. For example, the retention surfaces 320 may provide axial separation prevention up to a first axial force threshold. The first axial force threshold may, by way of example and not limitation, correspond to mechanical failure (e.g., deformation, bending, tearing, breaking) of the seam 110, the coupling engine 115, the housing 120, another component of the RDE 125, or some combination thereof.

When the lugs 210 are not deflected radially inward, the retention surfaces 320 may provide axial separation prevention up to a second axial force threshold. The second axial force threshold may, for example, be less than the first axial force threshold. Accordingly, the retention surfaces 320 may advantageously allow a user to "clip" the coupling engine 115 (e.g., individually, or as part of the RDE 125) over the seam 110, while preventing the coupling engine 115 from falling off the container 105 while the user attempts to further operate the RDE 125. The second axial force threshold may, for example, advantageously permit a user to easily "snap"/"pop" the coupling engine 115 off the seam 110 (e.g., to reposition, to change to another container 105).

In various embodiments the retention surface 320 may be planar (e.g., as depicted). In various embodiments the retention surface 320 may, for example, curvilinear. In some embodiments, the retention surface 320 may, for example, have a monotonically increasing radius relative to the center of the coupling engine 115 in a direction along the longitudinal axis away from the container 105.

The coupling engine 115 is further provided with a retention feature 245 configured to mate with a retention feature 250 of the housing 120. The retention features 245 and 250 may, for example, releasably, rotatably, and/or slidingly couple the coupling engine 115 to the housing 120. Accordingly, in various embodiments a user may advantageously operate the entire RDE 125 (e.g., the coupling engine 115 and the housing 120) by operating the housing 120. For example, the user may grasp the housing 120, axially "snap" it onto the container 105 (e.g., thereby "clipping" the lugs 210 of the coupling engine 115 over the seam 110), and rotationally operate the housing 120 (e.g., axially advancing the housing 120 towards the container 105). Accordingly, the housing 120 may thereby deflect the lugs 210 radially inward, axially coupling the coupling engine 115 to the seam 110, and then the hammer 235 may open the container end 205, placing the lumen 240 of the housing 120 in fluid communication with the container 105. In various embodiments the user may advantageously operate the entire RDE 125 to remove the RDE 125 from the container 105 by operating the housing 120 in a second (e.g., opposite to the first rotational direction) rotational direction (e.g., 'screwing off'), thereby axially advancing the housing 120 away from the container 105, releasing the lugs 210 to return radially outward from the deflected position, and thereby putting the RDE 125 in an intermediate (e.g., partially engaged) mode. In various embodiments the user may then axially separate the RDE 125 from the container 105 by a rotational motion, an axial motion, a twisting motion, or some combination thereof.

Figure 5A:
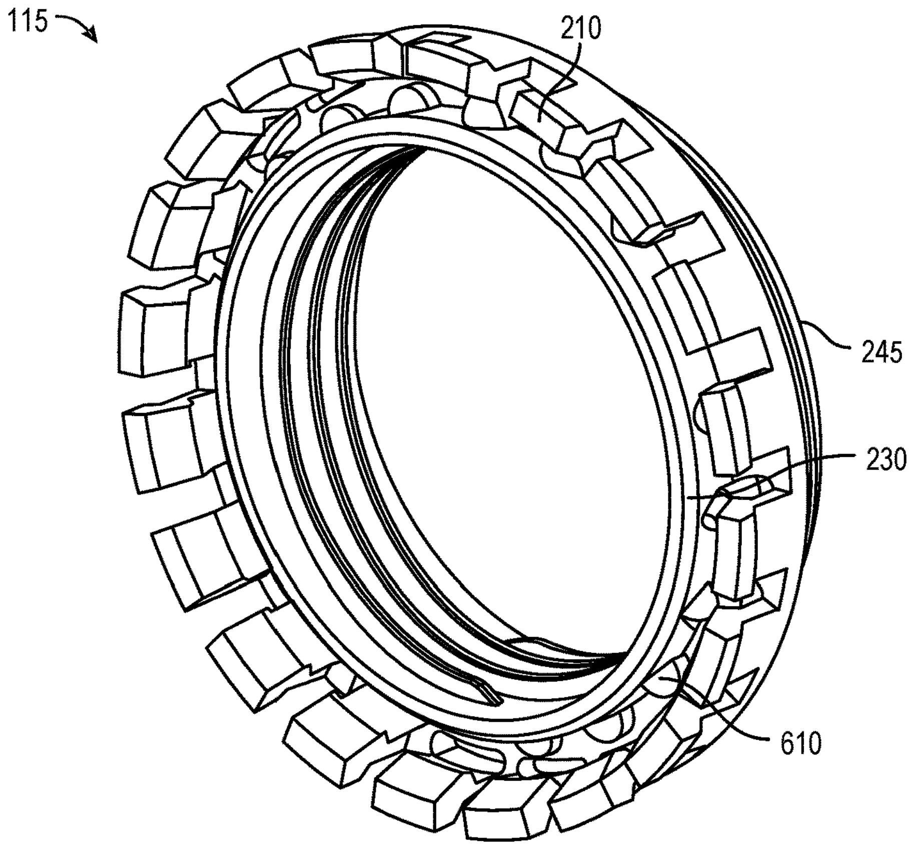
FIG. 5A and FIG. 5B depict an exemplary coupling engine of the exemplary RDE of FIG. 1.
Figure 5B:
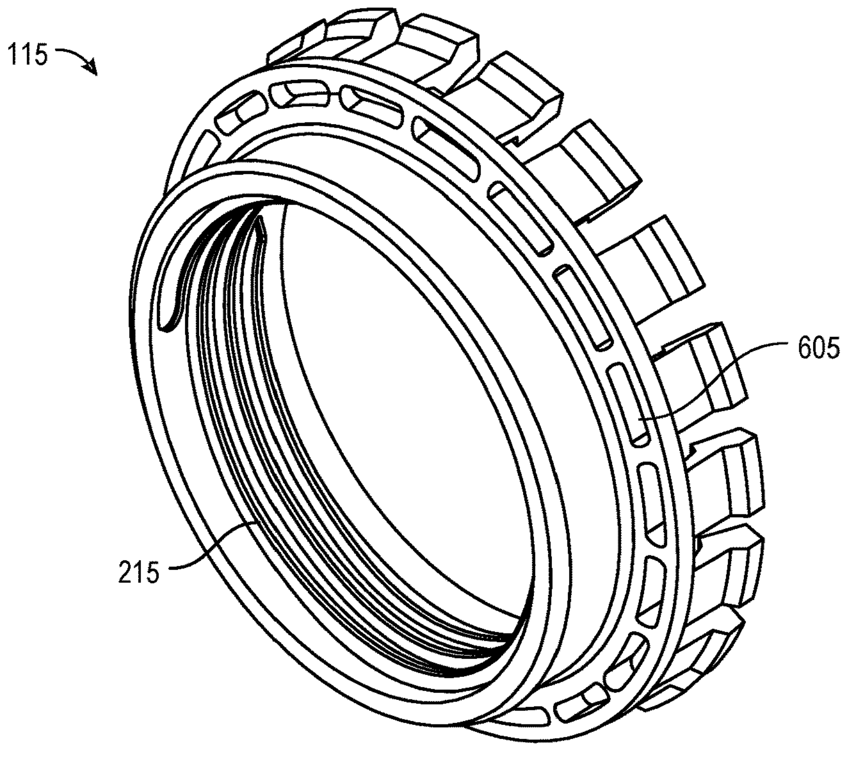

FIG. 5A and FIG. 5B depicts an exemplary coupling engine of the exemplary RDE of FIG. 1. In the depicted example, the coupling engine 115 is provided with apertures 605 circumferentially spaced around the coupling engine 115. In various embodiments the apertures 605 may, for example, correspond to lugs 210. The apertures 605 may, for example, be offset from the lugs 210. The apertures 605 may, for example, be positioned/patterned independently of the lugs 210. In various embodiments the apertures 605 may, by way of example and not limitation, advantageously reduce weight of the coupling engine 115, reduce material of the coupling engine 115, increase manufacturability of the coupling engine 115 (e.g., provide access for elements of a mold tool), reduce force necessary to radially deflect the lugs 210 (e.g., by providing a 'living hinge' of material between adjacent apertures 605), or some combination thereof.

As depicted, the coupling engine 115 is provided with retention features 610 distributed circumferentially around the coupling engine 115 and radially inward of the lugs 210. The retention features 610 may, for example, circumferentially engage the pattern of the seam 110 of the container end 205 when the coupling engine 115 is axially assembled over the container 105. Accordingly, the retention features 610 may, by way of example and not limitation, resist rotation of the coupling engine 115 relative the container 105 when engaged with the pattern of the seam 110. The retention features 610 may, for example, advantageously allow a user to rotate the housing 120 relative to the coupling engine 115 while only holding the container 105.

When the lugs 210 are not deflected radially inward, the retention features 610 may resist a first moment threshold relative to the container 105. The first moment threshold may, for example, allow a user to 'click'/'pop' the RDE 125 relative to the container 105 with a relatively low force until the RDE is in a desired angular orientation relative to the container 105.

When the lugs 210 are deflected (e.g., fully, as determined by the pressing features 225 and/or the pressing surface 310) radially inward, the retention features 610 may, for example, resist up to a second rotational moment threshold relative to the container 105. The second rotational moment threshold may, by way of example and not limitation, correspond to failure of the container 105, the coupling engine 115, the housing 120, another component of the RDE 125, or some combination thereof. The user may, for example, advantageously rotationally operate the housing 120 relative to the coupling engine 115 to axially advance the hammer 235 to open the container end 205 while only holding the container 105 (e.g., without separately holding the coupling engine 115).

Figure 6A:
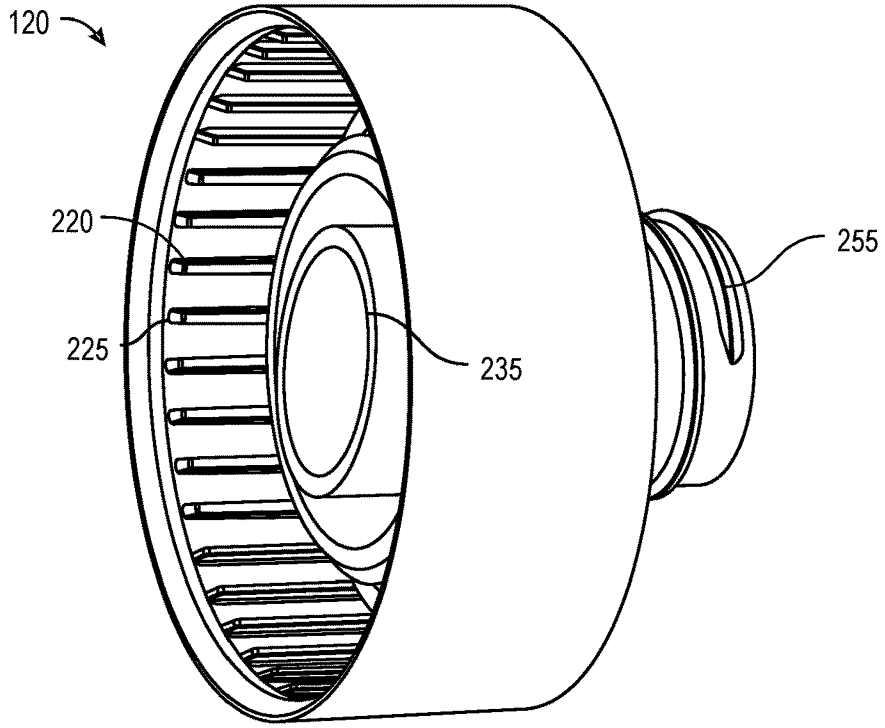
FIG. 6A and FIG. 6B depict an exemplary dispensing housing of the RDE of FIG. 1.
Figure 6B:
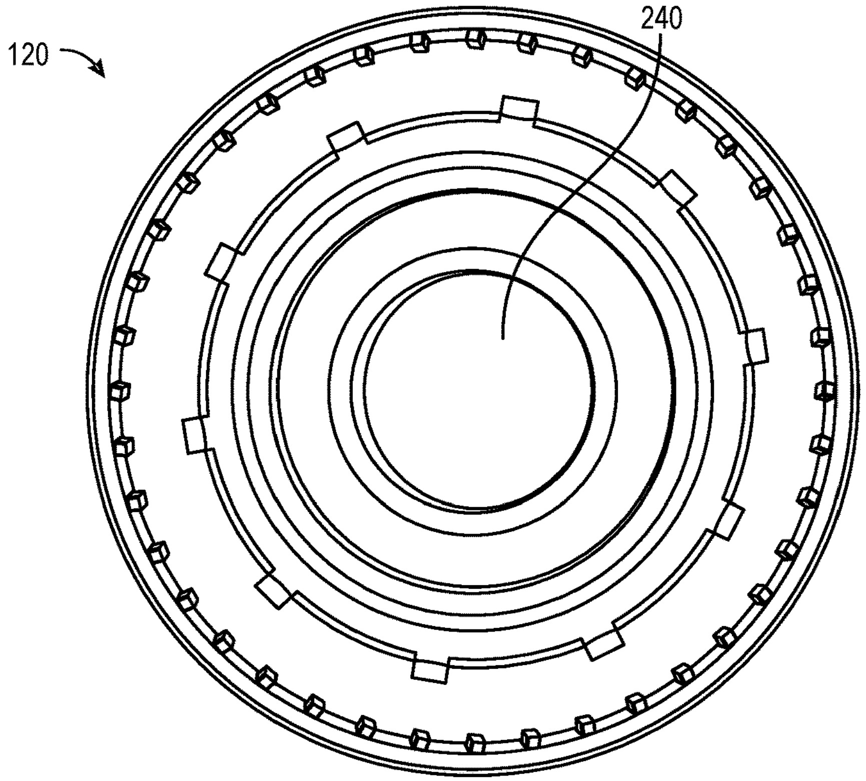
Figure 7:
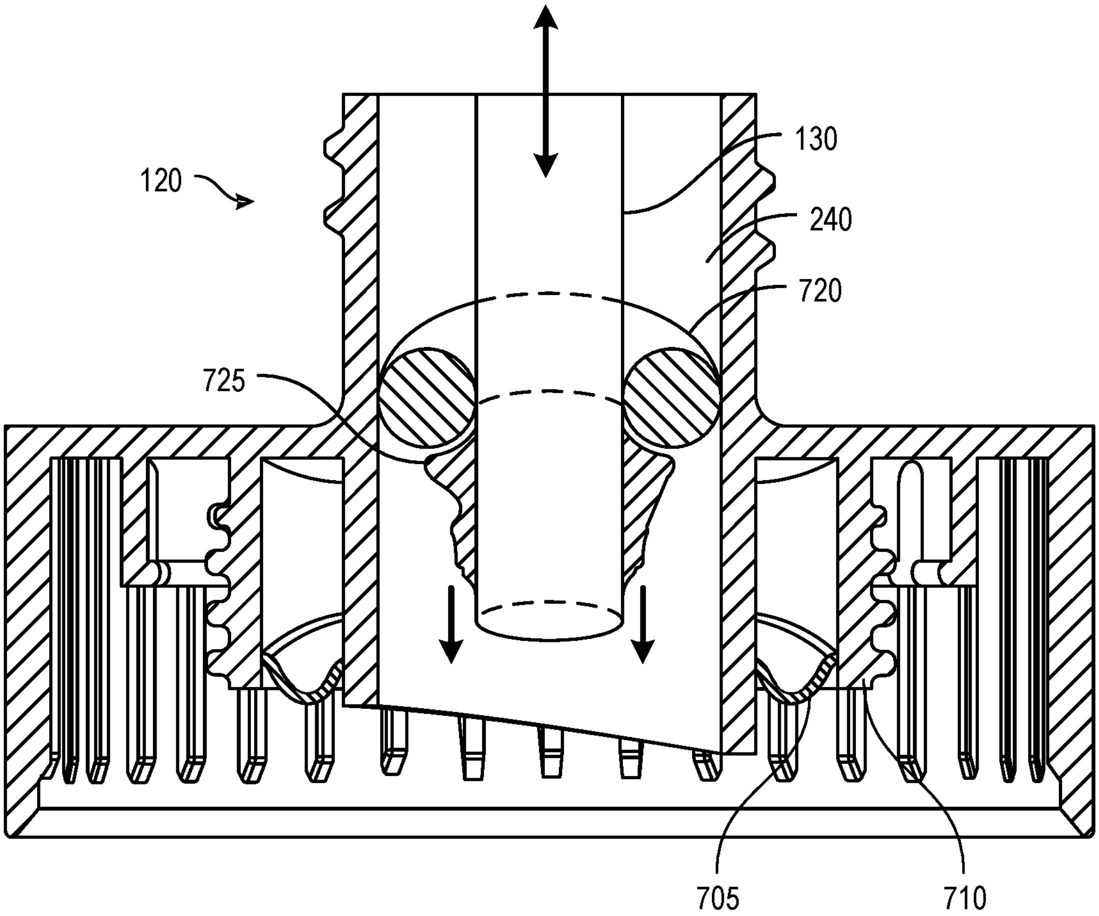
FIG. 7 depicts exemplary sealing members of the dispensing housing of FIG. 1.

FIG. 6A and FIG. 6B depict an exemplary dispensing housing of the RDE of FIG. 1. FIG. 7 depicts exemplary sealing members of the dispensing housing of FIG. 1. In FIG. 7, the housing 120 is provided with an exemplary sealing member 705. The exemplary sealing member 705 may be, for example, a substantially sealing member disposed in a cavity. For example, the sealing member 705 may engage cavities (e.g., by being bent as shown to fit into circumferential grooves in the housing 120). In some embodiments the sealing member 705 may, for example, engage features (e.g., protruding circumferential ribs in the housing 120). The sealing member 705 extends axially past a lower surface 710 of the housing 120. The lower surface 710 may, for example, engage the container end 205 when the RDE 125 is assembled onto the container 105 in a dispensing mode. Accordingly, in the dispensing mode, the sealing member 705 may advantageously sealingly engage (e.g., be compressed against) the container end 205. A fluid seal may accordingly be formed which may advantageously prevent contents of the container 105 from spilling out around, for example, the hammer 235.

In some embodiments, the housing 120 may be provided with an exemplary sealing member. The exemplary sealing member (e.g., an O-ring) may, for example, be disposed in at least one cavity (e.g., a circumferential groove) and/or about (e.g., above, below, between) features (e.g., circumferential protrusions) on an outer wall of the lumen 240, an inner wall of the coupling features 220, or some combination thereof. The sealing member may extend axially below the lower surface 710 of the housing 120. Accordingly, the sealing member may, for example, advantageously sealingly engage the container end 205 when the RDE 125 is in the dispensing mode.

FIG. 7 further depicts an exemplary wiping member of the dispensing housing of FIG. 1. In the depicted example, the housing 120 is provided with a wiping member 720 in the lumen 240: Wiping member 720 may, for example, exposed at least one cavity and/or about features on an inner wall of the lumen 240. The wiping member 720 may, by way of example and not limitation, be configured to slidingly receive a straw of the dispensing assembly 130 center aperture formed by the wiping member 720. Accordingly, the wiping member 720 may, by way of example and not limitation, advantageously "wipe" contents 725 (e.g., of the container 105) off the straw of the dispensing assembly 130 has the dispensing assembly 130 is axially withdrawn from the housing 120. Contents 725 may, by way of example and not limitation, include lotion, soap, and/or medication.

Figure 8:
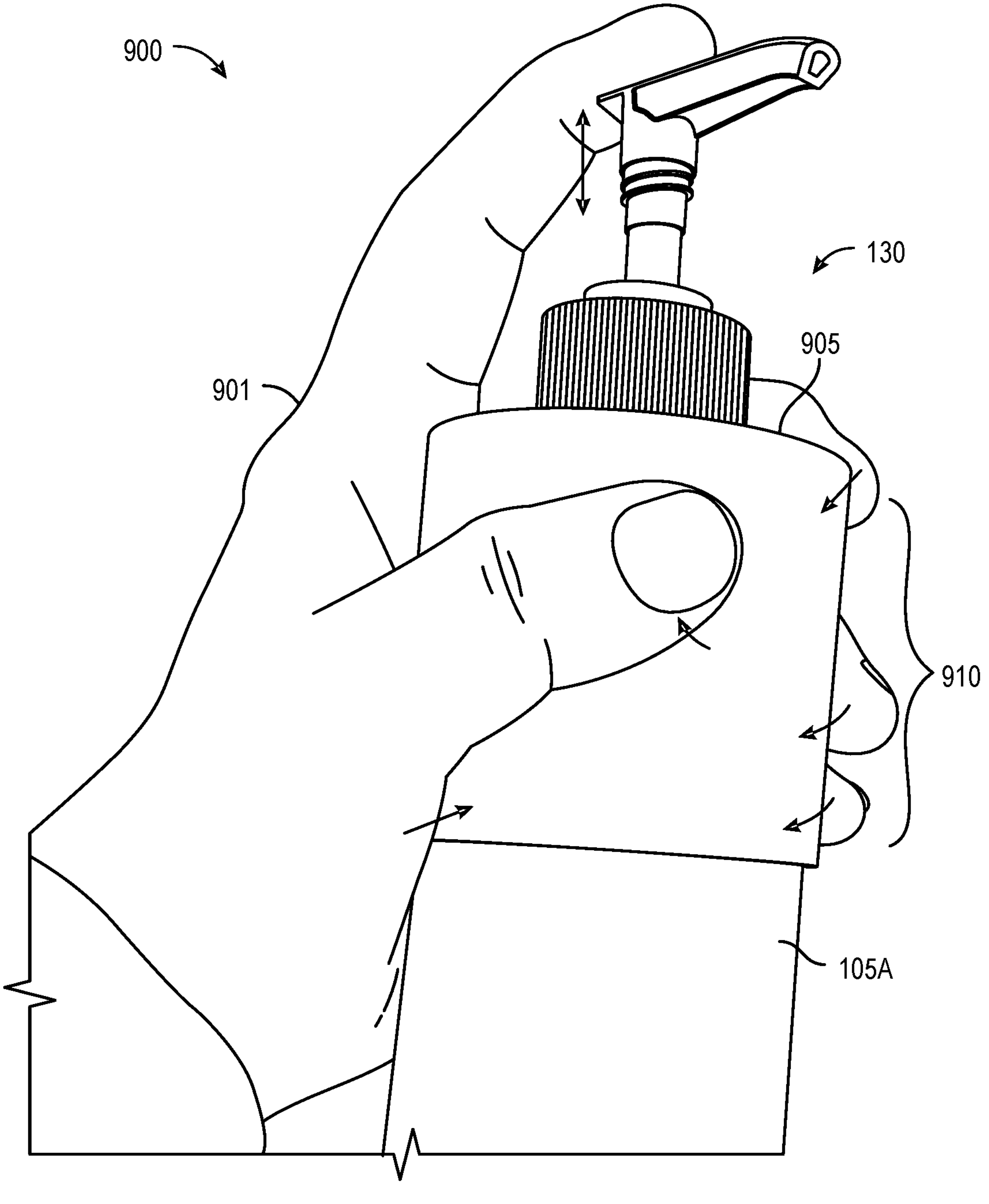
FIG. 8 and FIG. 9 depict an exemplary RDE having an exemplary container shielding dispensing housing.
Figure 9:
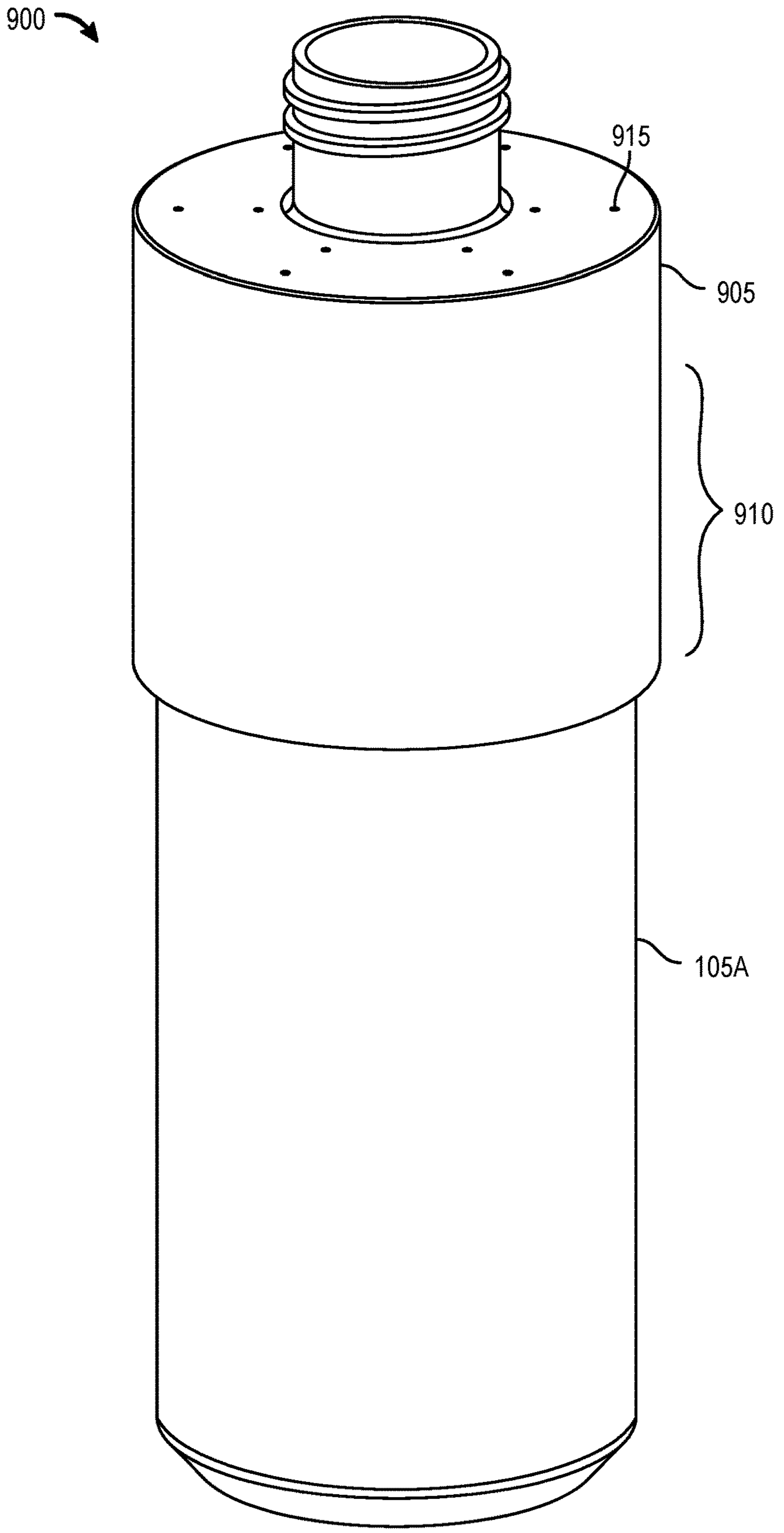

FIG. 8 and FIG. 9 depict an exemplary RDE having an exemplary container shielding dispensing housing. FIG. 8 depicts an exemplary RDE 900 in an exemplary use case scenario. As depicted in the exemplary scenario, a user 901 may grasp a housing 905 (e.g., including a skirt 910). The user 901 may operate the dispensing assembly 130 coupled to the housing 905. Accordingly, the container 105A may be advantageously shielded (e.g., as depicted) from crushing by force applied by the user 901 (e.g., during pumping, as shown by arrows indicator direction of force applied by user's fingers).

For example, in such embodiments, inward pressurization of the container 105A, which may advantageously prevent crushing of the container 105A, may be lost upon opening the container 105A using the housing 905 (e.g., as part of an RDE). Accordingly, the RDE 900 (e.g., at least the skirt 910) may advantageously prevent crushing of the container 105A after depressurization.

In the depicted example, the RDE 900 is provided with the dispensing housing 905 assembled axially over the container 105A. The housing 905 may, by way of example and not limitation, couple to the container 105A by a coupling engine 115 such as is described at least with reference to FIGS. 1-7. The container 105A may, for example, extend along a further distance in the longitudinal axis then the container 105A (e.g., the container 105A may be 'taller' than the container 105).

As depicted, the housing 905 extends axially downward along the longitudinal axis over the container 105A. For example, the housing 905 (as depicted) includes the longitudinally extending skirt 910 (e.g., the housing 905 may be 'taller' than the housing 120). The skirt 910 may, for example, be configured to cover a predetermined axial length of the container 105A.

In various embodiments a diameter of an RDE (e.g., a diameter of the housing 905) may be sized to fit comfortably in a user's hand. For example, in some embodiments a diameter of an RDE may be at least 50 mm. In some embodiments a diameter of an RDE may be a maximum of 80 mm. In some embodiments, a diameter of an RDE may be between 60-68 mm. In some embodiments, a diameter of an RDE may be substantially 63 mm. Various embodiments may, for example, advantageously be configured to fit over a "sleek" type can body. Various embodiments may, for example, advantageously be configured to fit over a "standard" type can body. Various embodiments may, for example, be configured to fit over a "slim" type can body. Various embodiments may, for example, be configured to fit over a "king" type can body. As an illustrative example, embodiments in the 60-68 mm range may, for example, advantageously promote interaction of a user and/or comfort of a user while gripping the RDE and operating a dispensing assembly with one hand (e.g., a lotion bottle and/or shampoo bottle).

In the depicted example, the housing 905 is further provided with multiple apertures 915. The apertures 915 may, for example, provide venting. For example, the skirt 910 may fit relatively closely (e.g., as a 'loose' sliding fit) over the container 105. The apertures 915 may, by way of example and not limitation, allow air to escape as the housing 905 is assembled axially over the container 105A. Accordingly, the apertures 915 may, for example, advantageously reduce force required to axially assemble the housing 905 onto the container 105A.

Figure 10:
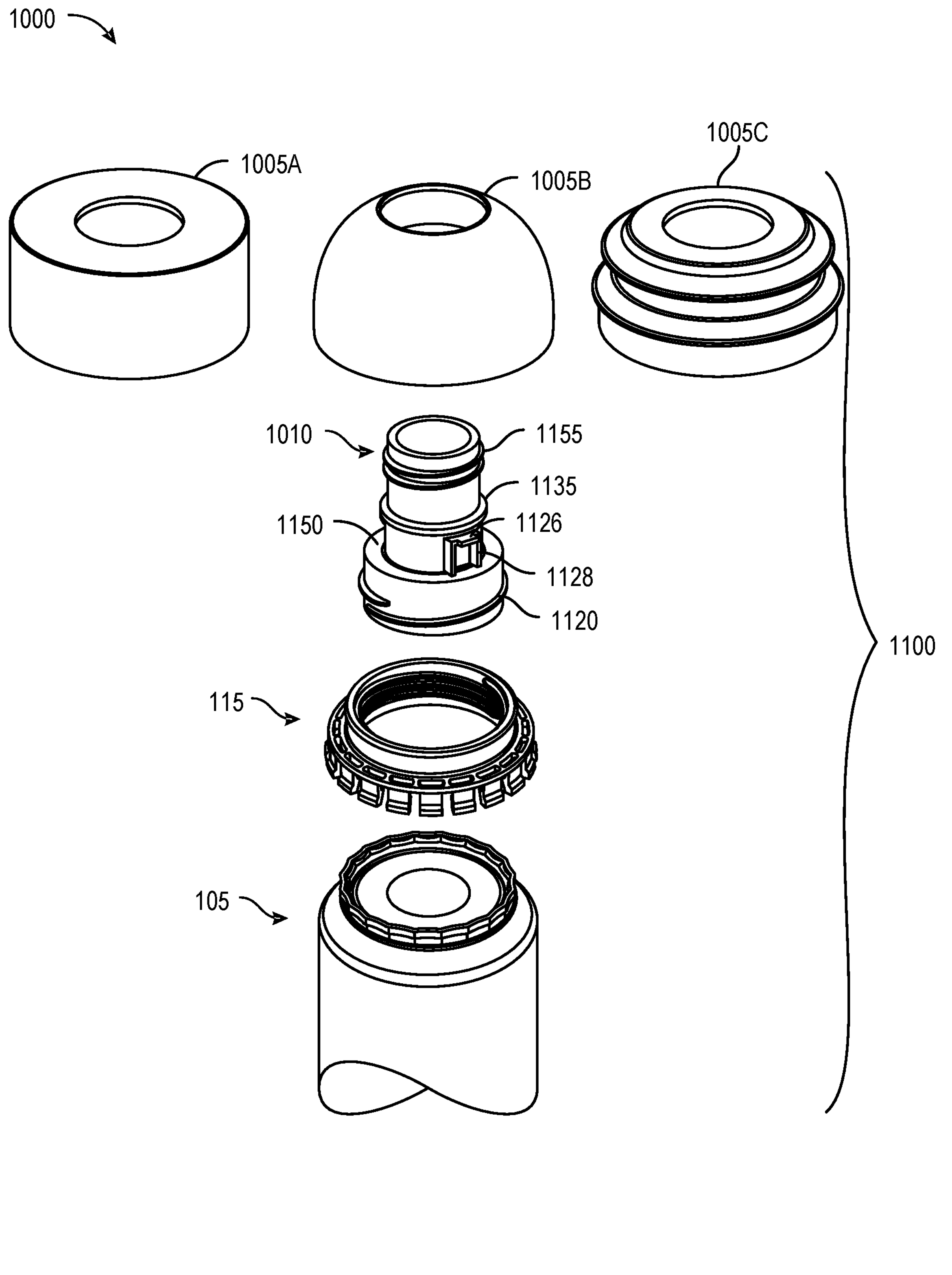
FIG. 10 depicts an exemplary perspective view of an exemplary RDE having an exemplary interchangeable housing.
Figure 11:
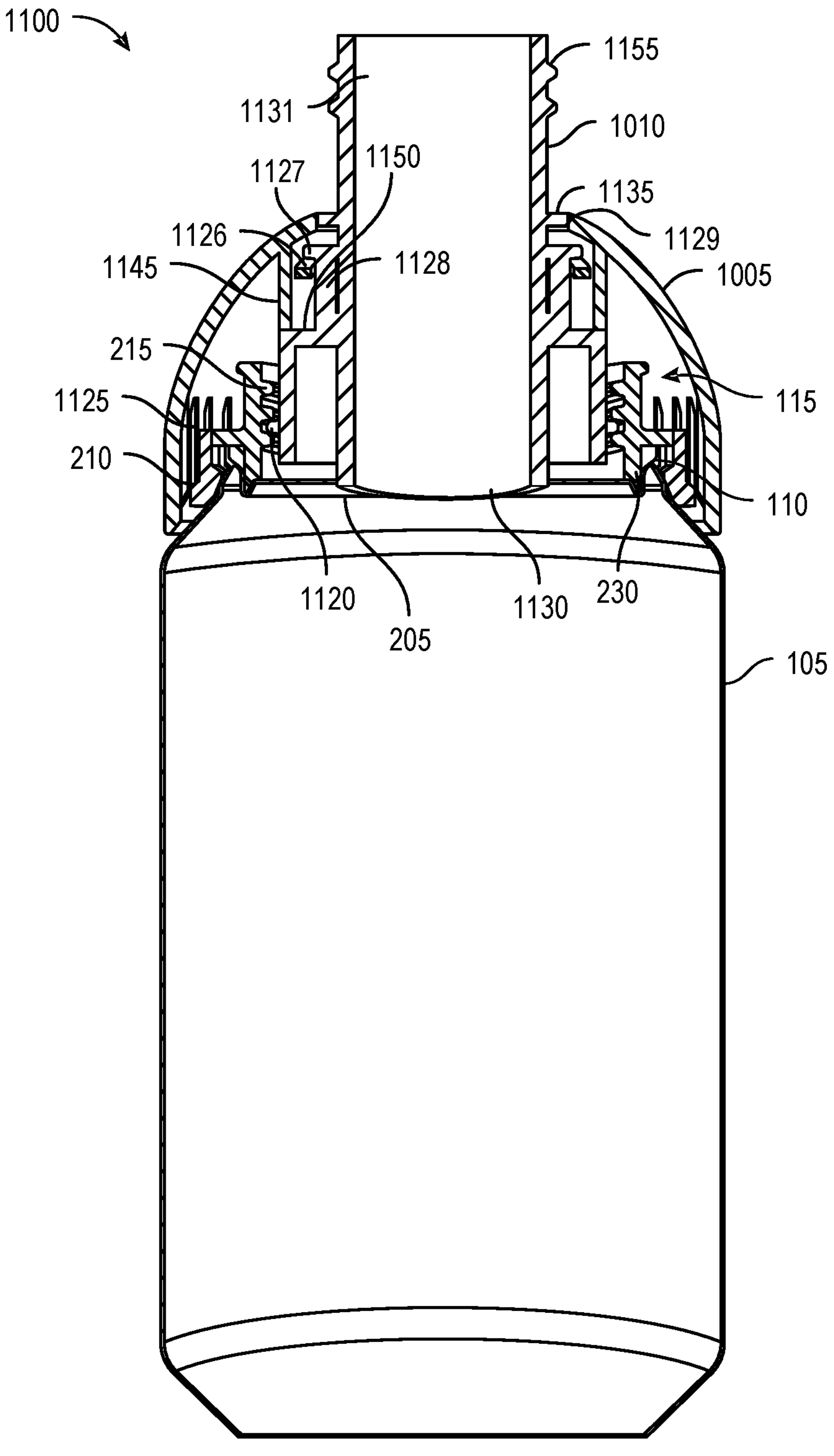
FIG. 11 depicts an exemplary cross-section view of the exemplary RDE of FIG. 10 with a domed housing.
Figure 12:
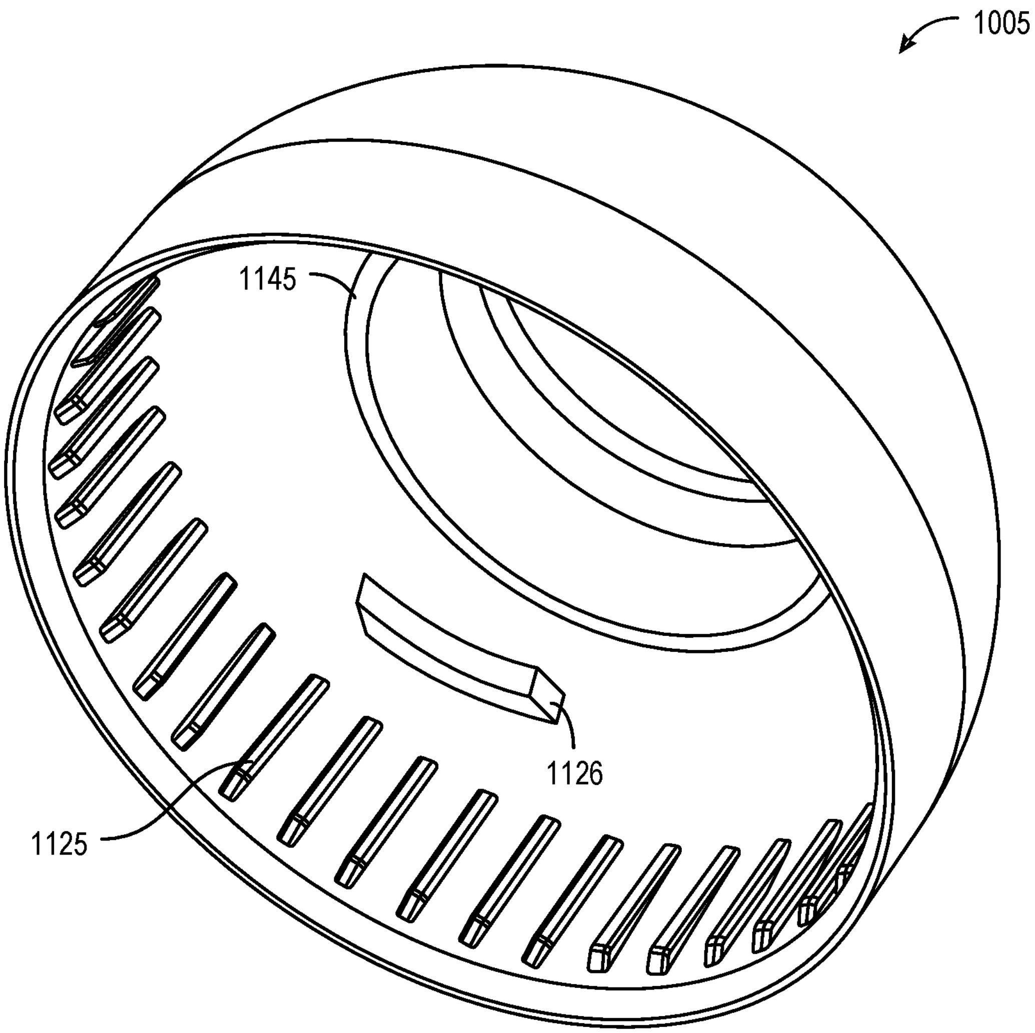
FIG. 12 depicts a perspective views of the exemplary domed housing of FIG. 10.

FIG. 10 depicts an exemplary perspective view of an exemplary RDE having an exemplary interchangeable housing. FIG. 11 depicts an exemplary cross-section view of the exemplary RDE of FIG. 10 with a domed housing. FIG. 12 depicts a perspective views of the exemplary domed housing of FIG. 10.

An RDE system 1000 is provided with interchangeable housings 1005. In the depicted example, the interchangeable housings 1005 includes a cylindrical housing 1005A, a domed housing 1005B, and a ridged housing 1005C. As depicted, each and any of the interchangeable housing 1005 couples an opening engine 1010 to the container 105 via the coupling engine 115. The housing 1005, the opening engine 1010, and the coupling engine 115 together may form, for example, an RDE. The RDE, when coupled to the container 105, may form a dispensing assembly 1100.

As depicted at least in FIGS. 10-11, the opening engine 1010 is provided with coupling features 1120 (e.g., threads) configured to matingly couple with (e.g., threadedly couple) coupling features 215 of the coupling engine 115. The housing 1005 is provided with pressing features 1125 configured to engage the lugs 210 of the coupling engine 115. Accordingly, as the housing 1005 is axially advanced, the pressing features 1125 may deflect the lugs 210 radially inward. The coupling engine 115 may thereby, for example, be releasably coupled to the seam 110.

As depicted, the opening engine 1010 is provided with a sliding engagement feature 1126 and a lip 1129. The opening engine 1010 is provided with a sliding engagement feature 1127. As depicted in FIG. 10, the engagement feature 1127 is circumferentially interrupted (e.g., is not continuous around the circumference of the opening engine 1010). Similarly, as depicted in FIG. 12, the engagement feature 1126 is circumferentially interrupted. Accordingly, the housing 1005 and the opening engine 1010 may be rotationally oriented relative to each other about the longitudinal axis such that the engagement features 1126 axially pass the engagement features 1127. As the housing 1005 is rotated relative to the opening engine 1010, engagement feature 1127 may engage a wall 1128 below the engagement feature 1127 of the opening engine 1010. Interaction of the engagement feature 1127 with the wall 1128 may synchronize rotation of the housing 1005 with the opening engine 1010. Accordingly, the engagement features 1127 may axially constrain the opening engine 1010 via the corresponding engagement features 1126. In some embodiments, by way of example and not limitation, the opening engine 1010 and the housing 1005 may be unitarily formed (e.g., by ultrasonic welding).

As the housing 1005 is rotated in a first rotational direction (e.g., clockwise when viewed from the upper end, as depicted, along the longitudinal axis), the engagement features 1126 and lip 1129 interacting with the engagement features 1127 and corresponding walls 1128, together with the mating coupling features 1120 and 215 may cause the housing 1005 and the opening engine 1010 to axially advance towards the container 105. Accordingly, the pressing features 1125 may deflect the lugs 210 radially inward, coupling the RDE system 1000 to the container 105. Further rotation in the first rotational direction may cause continued axial advancement, bringing a hammer 1130 of the opening engine 1010 into contact with the container end 205 such that the hammer places a lumen 1131 of the opening engine 1010 in fluid communication with an interior of the container 105. In the depicted example, housing 1005 is further provided with an extension 1145 which may presently engage a shoulder 1150 of the opening engine 1010.

As depicted, the opening engine 1010 is further provided with a lip 1135 configured to slidingly fit radially within an aperture in the housing 1005 formed by the lip 1129. The opening engine 1010 is further provided with engagement features 1155. The engagement features 1155 may, by way of example and not limitation, be configured to releasably couple with a dispensing assembly (e.g., the dispensing assembly 130).

Figure 13:
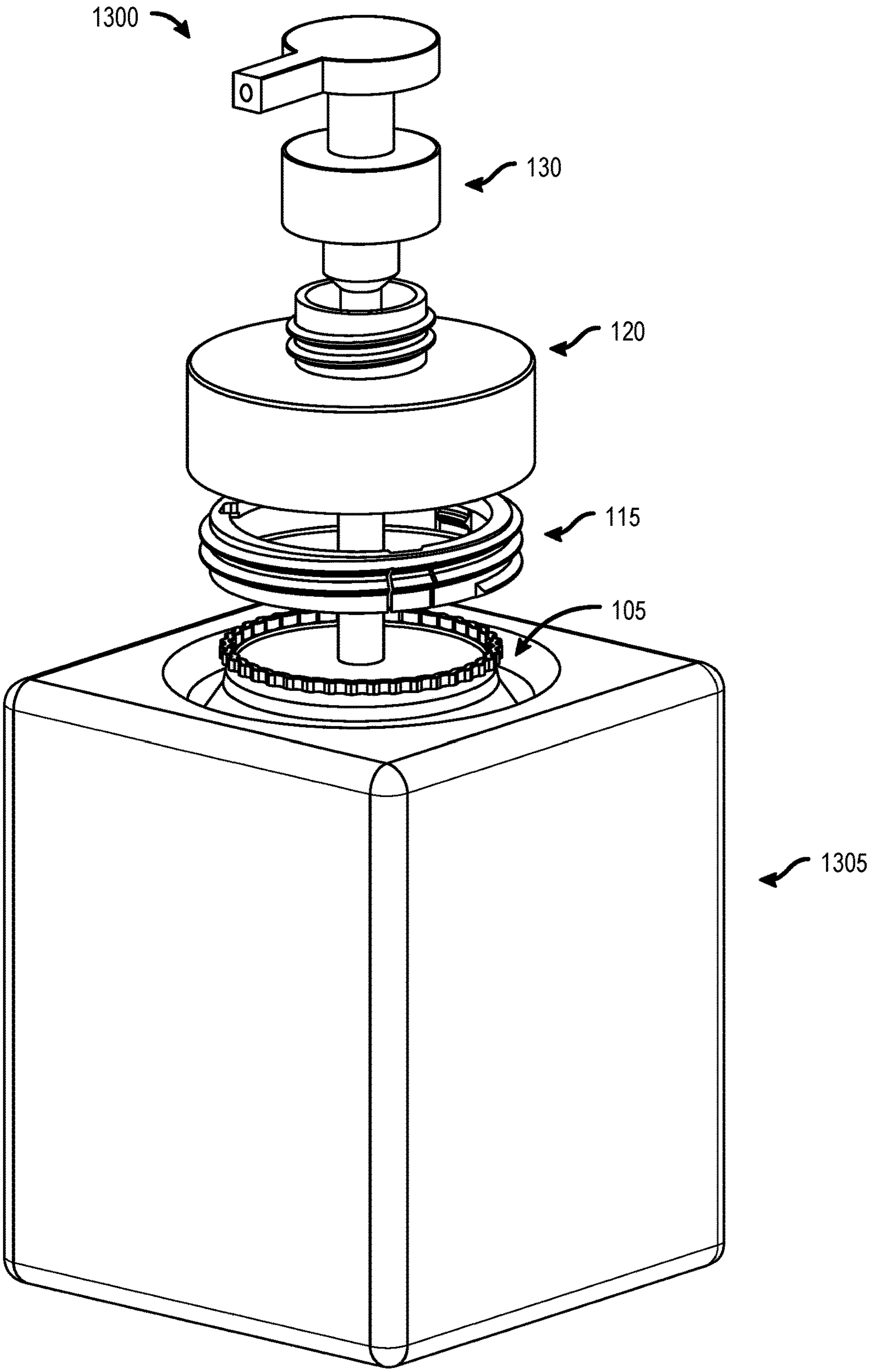
FIG. 13 depicts an exploded view of an exemplary recyclable container and closure assembly 1300 with reusable dispensing cap, provided with an outer enclosure in an illustrative use-case scenario.

FIG. 13 depicts an exploded view of an exemplary recyclable container and closure assembly 1300 with reusable dispensing cap, provided with an outer enclosure in an illustrative use-case scenario. A container 105 is disposed within an outer enclosure 1305. A coupling engine 115 is fitted over a rim of can 505. A housing 120 is screwed down over the coupling engine 115. A dispensing assembly 130 is screwed onto the housing 120.

The outer enclosure 1305 may, by way of example and not limitation, be a decorative enclosure. For example, the outer enclosure 1305 may be designed to coordinate with surrounding décor (e.g., a marble enclosure with brass hardware such as a dispensing pump, a stainless enclosure and hardware, a wood-look enclosure with brown 'rusty' metal look hardware, a decoratively engraved or embossed oil rubbed bronze enclosure and hardware, a basket enclosure, or other desired combination). In some embodiments the outer enclosure 1305 may, for example, be configured as a sanitary enclosure (e.g., in a healthcare, clean manufacturing, or research facility), or some combination thereof.

An outer enclosure 1305 may, by way of example and not limitation, be wall mounted. An outer enclosure 1305 and releasable self-opening dispenser (e.g., the coupling engine 115 and housing 120, together forming a RDE 125, (releasably) coupled to a dispensing assembly 130) may, for example, be configured as an automatic dispensing enclosure. In some embodiments, the assembly 1300 (such as one or more components of the assembly) may, for example, be provided with automatic sensors. Such embodiments may advantageously allow users to avoid touching the pump, such as for use, for example, with hand sanitizer, soap, and/or lotion.

In various embodiments, the dispensing assembly 130 may be omitted. In some embodiments the dispensing assembly 130 may be replaced (e.g., with a different dispensing module). In some embodiments the dispensing assembly 130 may, for example, be integrated into the RDE 125. In various embodiments, the coupling engine 115, the housing 120, or both may be integrated into the outer enclosure 1305. In some embodiments the coupling engine 115 and/or the housing 120 may be permanently coupled to the outer enclosure 1305. In some embodiments the coupling engine 115 and/or the housing 120 may be releasably coupled to the outer enclosure 1305.

In some embodiments, the container 105 may, for example, be disposed within the outer enclosure 1305 by inserting the container from the top of the outer enclosure 1305. In some embodiments the outer enclosure 1305 may, for example, be configured to receive the container 105 through an aperture in a bottom surface. In some embodiments the outer enclosure 1305 may be configured to receive the container 105 through an aperture in a side surface.

In some embodiments, the container 105 may be rotationally secured within the outer enclosure 1305 by a gripping feature (not shown). Such embodiments may, for example, advantageously facilitate installing of the RDE 125 onto the container 105. In some embodiments, the outer enclosure 1305 may be bottomless. In some embodiments the outer enclosure 1305 may have an aperture of sufficient size for the container 105 to be grasped while installing the RDE 125 onto the container.

In some embodiments, the housing 120 may be rotationally and axially constrained by the outer enclosure 1305, and so may advantageously facilitate screwing the container 105 thereinto from a bottom and/or side of the outer enclosure 1305. Various embodiments providing for one or more enclosures may advantageously provide, for example, enhanced options related styling, integration, other desirable features, or some combination thereof.

Figure 14:
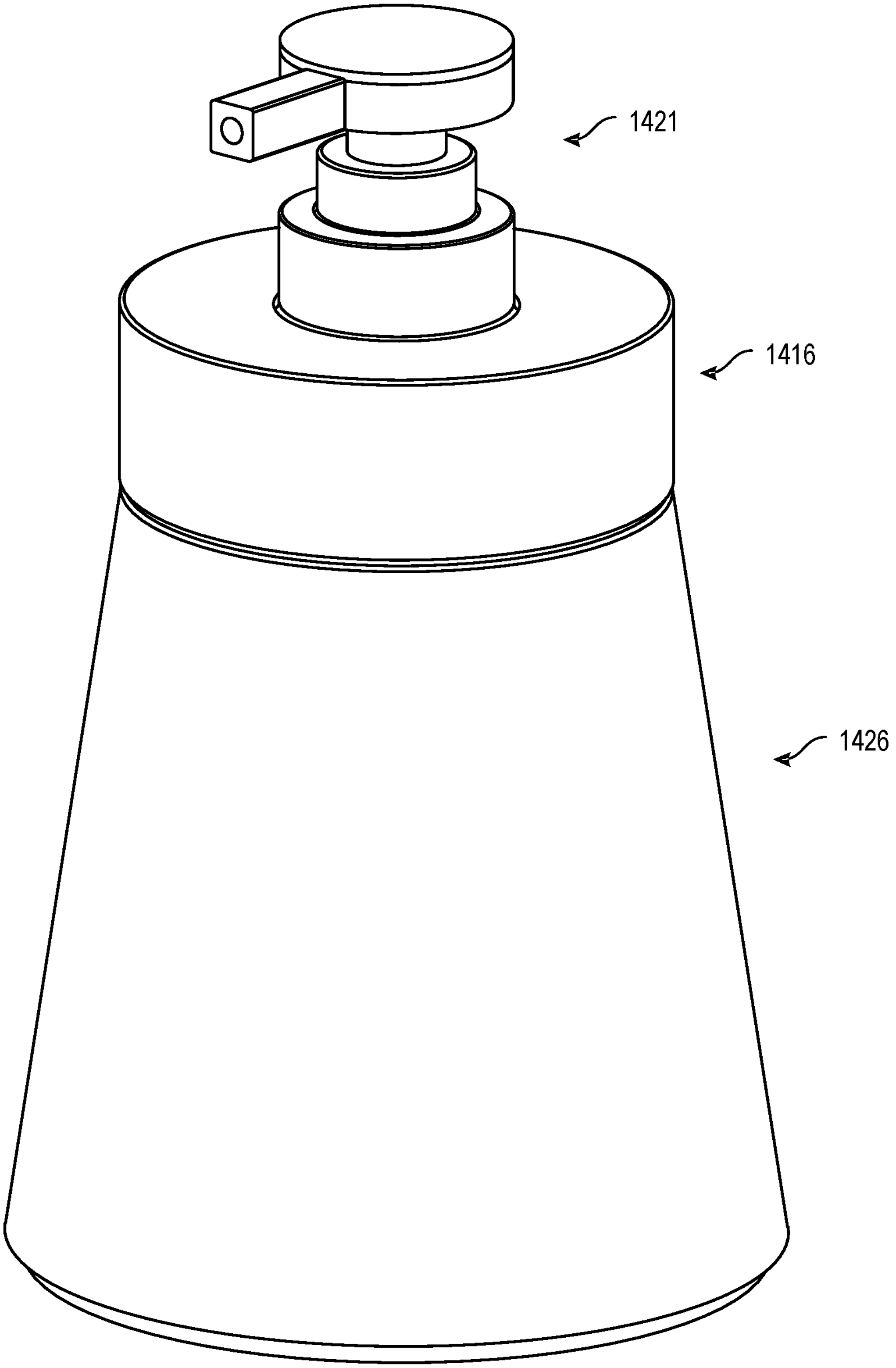
FIG. 14 depicts a perspective view of exemplary recyclable container and closure assembly with an RDE, provided with a tapered outer enclosure in an illustrative use-case scenario.

FIG. 14 depicts a perspective view of exemplary recyclable container and closure assembly with an RDE, provided with a tapered outer enclosure in an illustrative use-case scenario. A container such as container 105 may be disposed within an outer enclosure 1426. A retaining coupler 1416 is fitted over a rim of, for example, the container 105. In some embodiments the retaining coupler 1416 may, for example, be configured such as disclosed at least with reference to the housing 120.

The retaining coupler 1416 may, for example, be configured to mechanically interface with an outer enclosure 1426. The retaining coupler 1416 may, for example, be configured as a closure-opening cap (e.g., may be screwed down over a rotational-locking member such as coupling engine 115). A dispensing pump 1421 (e.g., configured as disclosed at least with reference to the dispensing assembly 130) is mechanically coupled to the assembly (e.g., screwed onto or integrated into retaining coupler 1416). The assembly may be styled to advantageously provide an aesthetically pleasing housing and dispensing pump for a (recyclable) container. The container may, for example, advantageously act as a refill cartridge for the housing.

Figure 15:
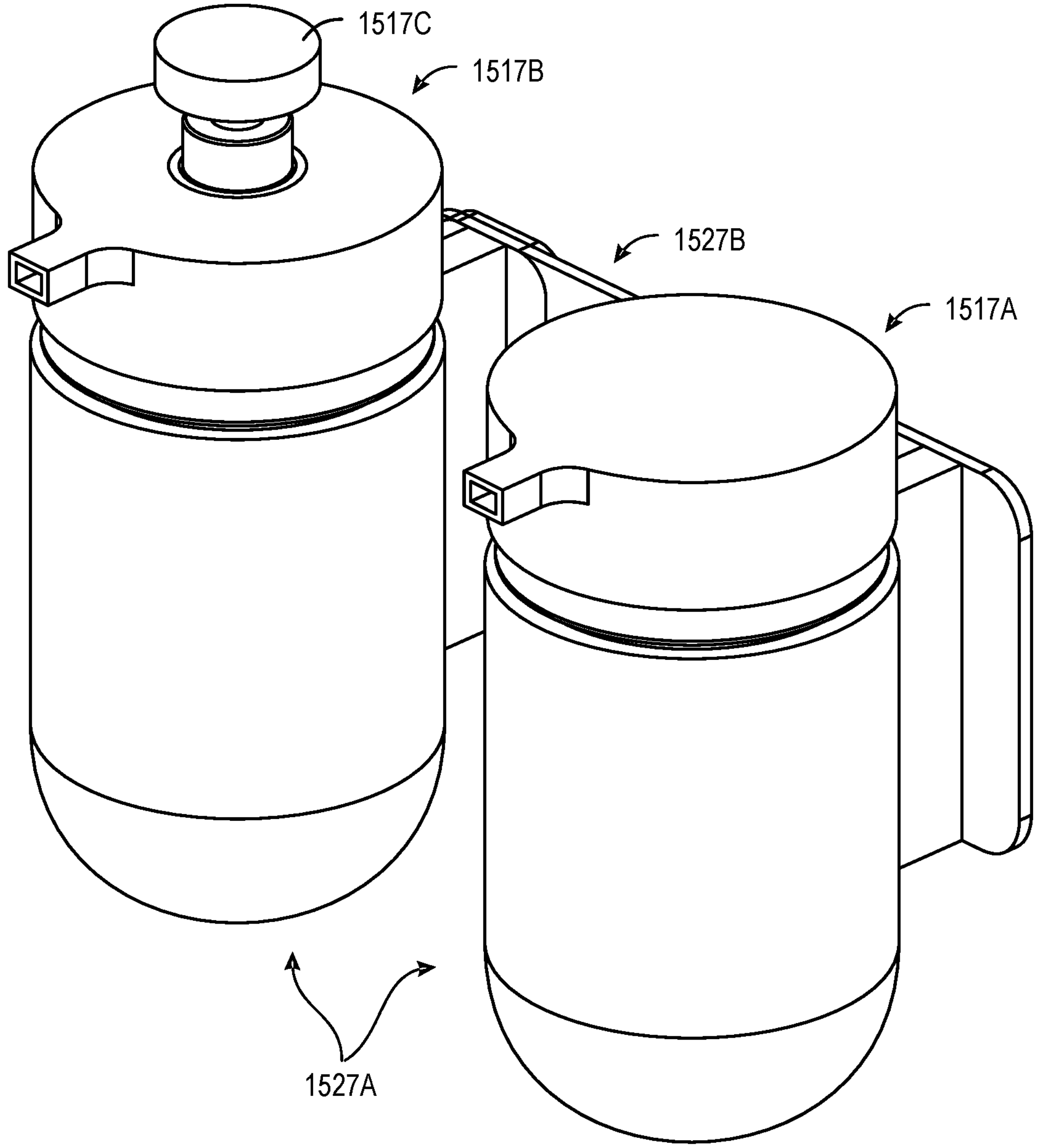
FIG. 15 depicts a perspective view of exemplary recyclable container and closure assemblies with respective RDEs, provided with a wall-mountable outer enclosure in an illustrative use-case scenario.

FIG. 15 depicts a perspective view of exemplary recyclable container and closure assemblies with respective RDEs, provided with a wall-mountable outer enclosure in an illustrative use-case scenario. A container(s) such as a container 105 may be disposed within one or each of outer enclosure receptacles 1527A, which are connected to a wall mount fixture 1527B. A closure-opening cap 1517A, a closure-opening cap 1517B, or some combination thereof, may be mechanically coupled to a rim of the container. In some embodiments the closure-opening cap 1517A and/or the closure-opening cap 1517B may, for example, be at least partially configured such as disclosed at least with reference to the RDE 125. In various embodiments, the closure-opening cap 1517A and the closure-opening cap 1517B may, by way of example and not limitation, include a dispensing mechanism (e.g., using a straw or straw-less). For example, the closure-opening cap 1517A may be vertically reciprocated in order to generate pressure to urge contents of the recyclable container up and out of the dispensing closure-opening cap 1517A. A plunger 1517C of the closure-opening cap 1517B may, for example, be vertically reciprocated in order to generate pressure to urge contents of the recyclable container up and out of the closure-opening cap 1517B. Accordingly, various such embodiments may, by way of example and not limitation, advantageously provide a simplified mechanism (e.g., without a straw), may advantageously be suspended on a vertical surface (e.g., a wall), may advantageously offer a choice of contents (e.g., soap and lotion) to users, advantageously offer a plurality of contents (e.g., soap for multiple adjacent sinks), or some combination thereof.

Figure 16:
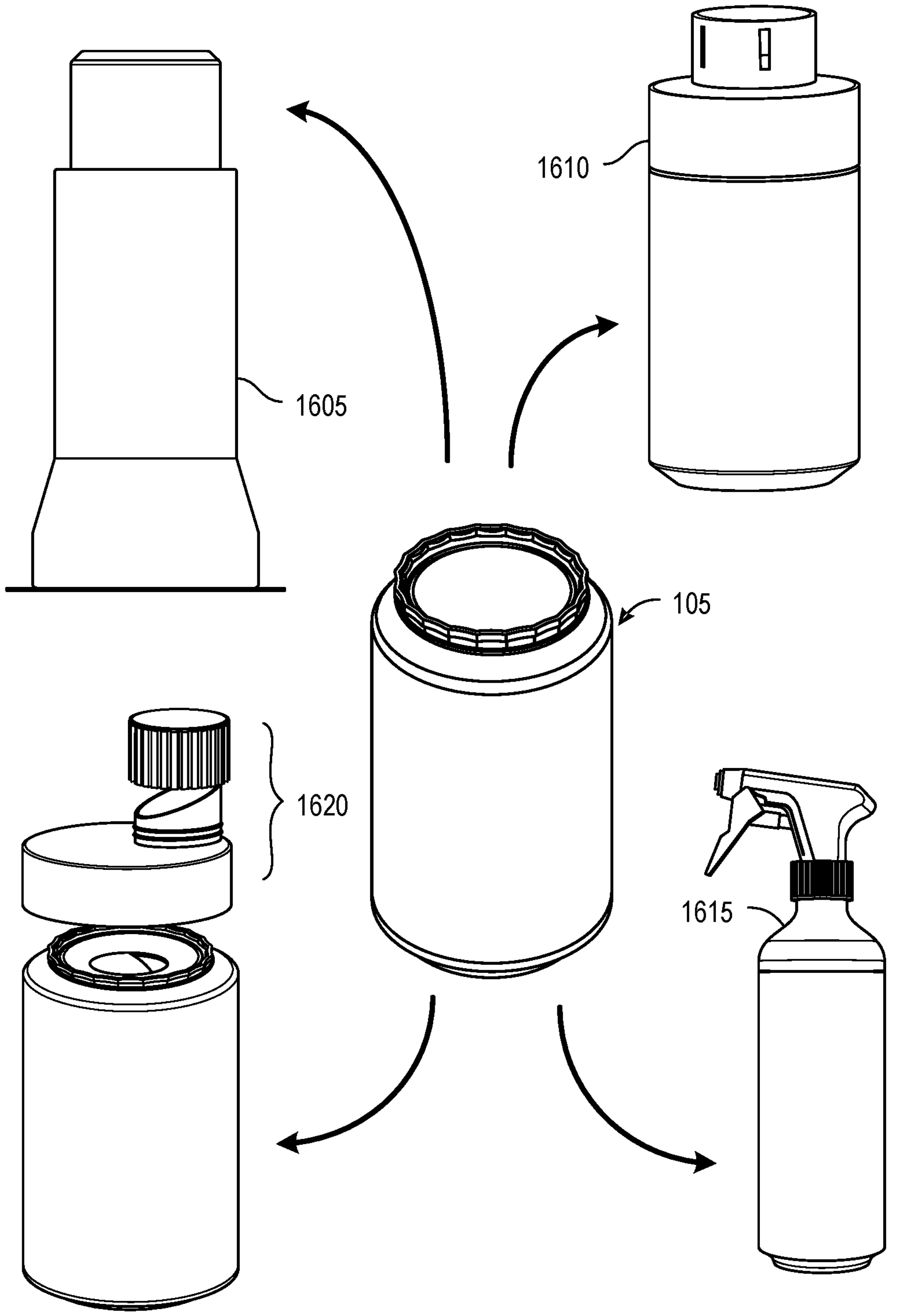
FIG. 16 depicts exemplary use-case scenarios with exemplary RDEs and exemplary replaceable containers.

FIG. 16 depicts exemplary use-case scenarios with exemplary RDEs and exemplary replaceable containers. A condiment dispenser 1605 may, for example, be configured as a salt and/or pepper dispenser. The condiment dispenser 1605 may, for example, be configured to crack and/or grind peppercorns contained in a container 105. The condiment dispenser 1605 may, for example, include an RDE (e.g., as disclosed at least with reference to RDE 125). The condiment dispenser 1605 may, for example, be configured to releasably couple to and/or open the container 105. Accordingly, a user may advantageously operate the (sealed) container 105 into the condiment dispenser 1605 such that the container 105 is opened by an RDE in the condiment dispenser 1605, and the contents are (selectively) dispensed using the condiment dispenser 1605.

An exemplary dispenser 1610 may, for example, be configured to controllably dispense pharmaceuticals. The exemplary dispenser 1610 may, for example, include an RDE. The exemplary dispenser 1610 may be configured to releasably couple to and/or open a container 105. For example, the container 105 may contain pharmaceuticals. In some embodiments the contents of the container 105 may include pills and/or tablets. In some embodiments the contents may include powder. In some embodiments the contents may include liquids. The exemplary dispenser 1610 may, for example, be configured to meter dispensing of the contents of the container 105. The exemplary dispenser 1610 may, for example, be configured to control dispensing of the contents of the container 105 (e.g., by a child-proof cap and/or electronic access control). A user may, for example, advantageously operate the exemplary dispenser 1610 onto the (sealed) container 105 such that the container 105 is opened by an RDE in the exemplary dispenser 1610 and the contents are (selectively) dispensed using the exemplary dispenser 1610.

In various embodiments, for example, an RDE may be configured to generate a (dynamic) visual indicia. For example, the RDE may include a dynamic screen. The dynamic screen may, for example, include an electrophoretic display (e.g., referred to as e-ink, e-paper). As an exemplary illustration, a screen may be configured to display a person's name (e.g., associated with a prescription in a can). A screen may, for example, be configured to display instructions. In some embodiments a screen may, for example, be configured to display content levels and/or types. Such embodiments may, for example, advantageously increase safety (e.g., reduce accidental taking of someone else's prescription, reduce accidental use of an undesired substance).

In an exemplary embodiment, a container may be filled with a prescription for a user and sealed by a pharmacy. The pharmacy may provide an electronically-readable label (e.g., RFID chip, QR code, barcode). An RDE may be configured to read the electronically-readable label and generate a corresponding display (e.g., contents, dosage, prescription recipient, usage instructions). In some embodiments, the label may include a passcode (e.g., a secret key). The RDE may be configured to prompt a user for a corresponding passcode (e.g., a complimentary key). The RDE may be configured, for example, to connect to a user's computing device (e.g., smartphone, such as through an app) to prompt the user, to receive the passcode, and/or to verify the input. The RDE may, for example, be operably coupled to a communication engine (e.g., Wi-Fi, near-field communication such as Bluetooth, cellular communication) In some embodiments the RDE may read a serial code on the label of the container and retrieve corresponding verification details (e.g., date of birth, name, zip code, phone number, prescription ID). The RDE may prompt the user for the verification detail(s). In response to receiving a valid response, the RDE may open the container and/or unlock to dispense contents. In response to receiving an invalid response the RDE may not unlock and/or may not open the container. Such embodiments may advantageously resist tampering, drug abuse, and/or accidental ingestion of pharmaceuticals. Various embodiments may, for example, dynamically validate prescription regimens (e.g., timing, frequency) before unlocking.

An exemplary spray dispenser 1615 may, for example, be configured to selectively dispense contents of a container 105. The exemplary spray dispenser 1615 may, for example, include an RDE. The exemplary spray dispenser 1615 may, for example, be configured to releasably couple and/or open a container 105. For example, the container 105 may contain sprayable contents (e.g., liquid). The exemplary spray dispenser 1615 may, for example, include a straw configured to be introduced into the container 105 (e.g., through an aperture opened by an RDE in the exemplary spray dispenser 1615). In some embodiments the spray head may be coupled to the RDE after the RDE is coupled to the container 105, such that the straw is introduced after opening of an aperture into the container 105 by the RDE. In some embodiments the straw may, for example, be spring-loaded, telescoping, and/or flexible such that the spray head may remain coupled to the RDE during coupling of the exemplary spray dispenser 1615 to the container 105. For example, the straw may be displaced (e.g., collapsed, coiled, flexed, bent) during coupling of the exemplary spray dispenser 1615 to the container 105 until an aperture is opened by the RDE into the 105. The straw may subsequently 'self-introduce' into the container 105 via the aperture opened by the RDE. A user may, for example, advantageously operate the exemplary spray dispenser 1615 onto the (sealed) container 105 such that the container 105 is opened by an RDE in the exemplary spray dispenser 1615 and the contents are (selectively) dispensed (e.g., jetted, misted, sprayed) using the exemplary spray dispenser 1615.

An exemplary spout dispenser 1620 may, for example, be configured to selectively dispense contents of a container 105. The exemplary spout dispenser 1620 may, for example, include an RDE. The exemplary spout dispenser 1620 may, for example, be configured to releasably couple and/or open a container 105. For example, the container 105 may contain pourable contents (e.g., solid objects, powders, liquids). A user may selectively operate a cap (e.g., threaded, as depicted) to a cap of the exemplary spout dispenser 1620 (e.g., the cap may be configured as disclosed at least with reference to the housing 120). A user may, for example, advantageously operate the exemplary spout dispenser 1620 onto the (sealed) container 105 such that the container 105 is opened by an RDE in the exemplary spout dispenser 1620 and the contents are (selectively) dispensed (e.g., jetted, misted, sprayed) using the exemplary spout dispenser 1620. In some embodiments, by way of example and not limitation, the contents may be advantageously consumed directly from the container 105 via the exemplary spout dispenser 1620. For example, such embodiments may advantageously provide a resealable drinking assembly with a recyclable and replaceable canister.

Figure 17:
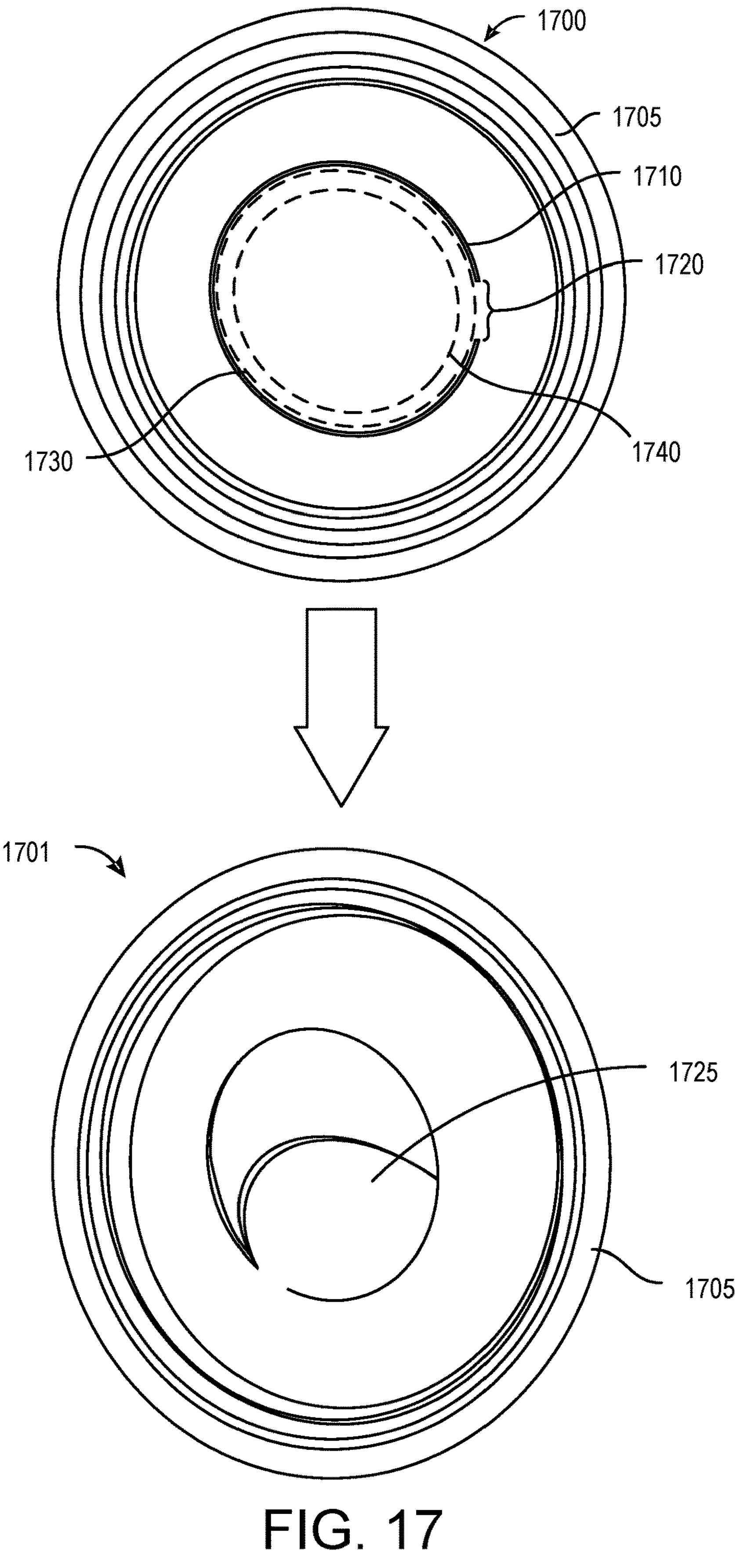
FIG. 17 depicts an exemplary container end in a closed mode and an opened mode, respectively.

FIG. 17 depicts an exemplary container end in a closed mode and an opened mode, respectively. The container end 1705 is provided with a score 1710 (e.g., as disclosed at least with reference to the stress concentration ring 155), which is interrupted by a bridge 1720 (e.g., as disclosed at least with reference to the solid region 160). The score 1710 may, for example, correspond to a thinner region of material and/or a depressed region of material. For example, the score may define a region of higher stress concentration in the container end 1705. The bridge 1720 may, for example, correspond to a thicker (e.g., full thickness) region of material. For example, the bridge 1720 may define a region corresponding to lower stress concentration in the container end 1705 than the score 1710. The score 1710 defines a core 1725.

In a closed mode 1700, the core 1725 is continuous with the container end 1705 (e.g., as a continuous fluid barrier). In an open mode 1701, controlled material failure of the end 1705 may be induced (e.g., by a hammer such as disclosed at least with reference to the hammer 235) along the score 1710. The bridge 1720 may retain the core 1725 coupled to the container end 1705. Accordingly, the core 1725 may be advantageously retained such as, for example, for recycling and/or safety.

In some embodiments an opening member (e.g., the hammer 235) may travel along a curvilinear path. In the depicted example, the opening member may, for example, travel along at least a portion of a path (e.g., between outer radius 1730 and inner radius 1740). The path may be adjacent to but not directly on the score 1710. For example, an opening member may travel just inside the score 1710. The opening member may induce a stress in the container end 1705 along the score 1710 above a (predetermined) failure threshold such that an aperture of predetermined size and/or shape is opened in the container end 1705.

In various embodiments, the container end 1705 may be (sealingly) coupled to a longitudinally extending malleable can body. For example, the container end 1705 may be seamed to a can body. The seam may, for example, be patterned (e.g., as disclosed at least with reference to FIG. 2).

Further, an exemplary opening region of the container end 1705 is depicted. In the depicted scenario, the container end 1705 is provided with the score 1710. Force required to open the can using the depicted score 1710 (e.g., as disclosed at least with reference to the hammer 235) may, for example, be below a predetermined opening force threshold if the hammer engages the container end 1705 between an inner radial offset threshold and an outer radial offset threshold.

Experimentation with the depicted example container end 1705 (e.g., using a test device(s)/setup disclosed below) resulted in an inner radial offset threshold and an outer radial offset threshold of substantially 0.5-1 mm. In various embodiments the inner and outer radial offset thresholds may be equal. In some embodiments the inner and outer radial offset thresholds may, for example, be different. Accordingly, a hammer engagement region may be defined by an outer radius 1730 corresponding to the outer radial offset threshold and an inner radius 1740 corresponding to the inner radial offset threshold. As depicted, the hammer engagement region may be contained within the score 1710.

Various RDE embodiments may, for example, position a hammer (e.g., the hammer 235) within a predetermined hammer engagement region corresponding, by way of example and not limitation, to at least one predetermined opening force threshold. In various embodiments the predetermined opening force threshold may, by way of example and not limitation, correspond to an RDE rotational moment (e.g., a torque required to be applied by a human to the RDE to cause a container end to be opened) between 1-10 N-m (Newton-meters). In some embodiments, the predetermined opening force threshold may, for example, correspond to an RDE rotational moment of no more than 6 N-m. In some embodiments, the predetermined opening force threshold may, for example, correspond to an RDE rotational moment of no more than 4 N-m. Various such embodiments may, for example, correspond to a relatively weak hand grip. In some embodiments, the predetermined opening force threshold may, for example, be more than 10 N-m. Accordingly, a predetermined opening force threshold may, for example, be advantageously selected such that a wide variety of users (e.g., weak, infirm, young, aged) may advantageously operate the RDE.

In various embodiments, a predetermined opening force threshold (e.g., applied along the longitudinal axis of the can) may be, by way of example and not limitation, between 10-100 N (Newtons). In some embodiments, a predetermined opening force threshold may be between, for example, 60-100 N. In some embodiments, a predetermined opening force threshold may be substantially 80 N.

Figure 18:
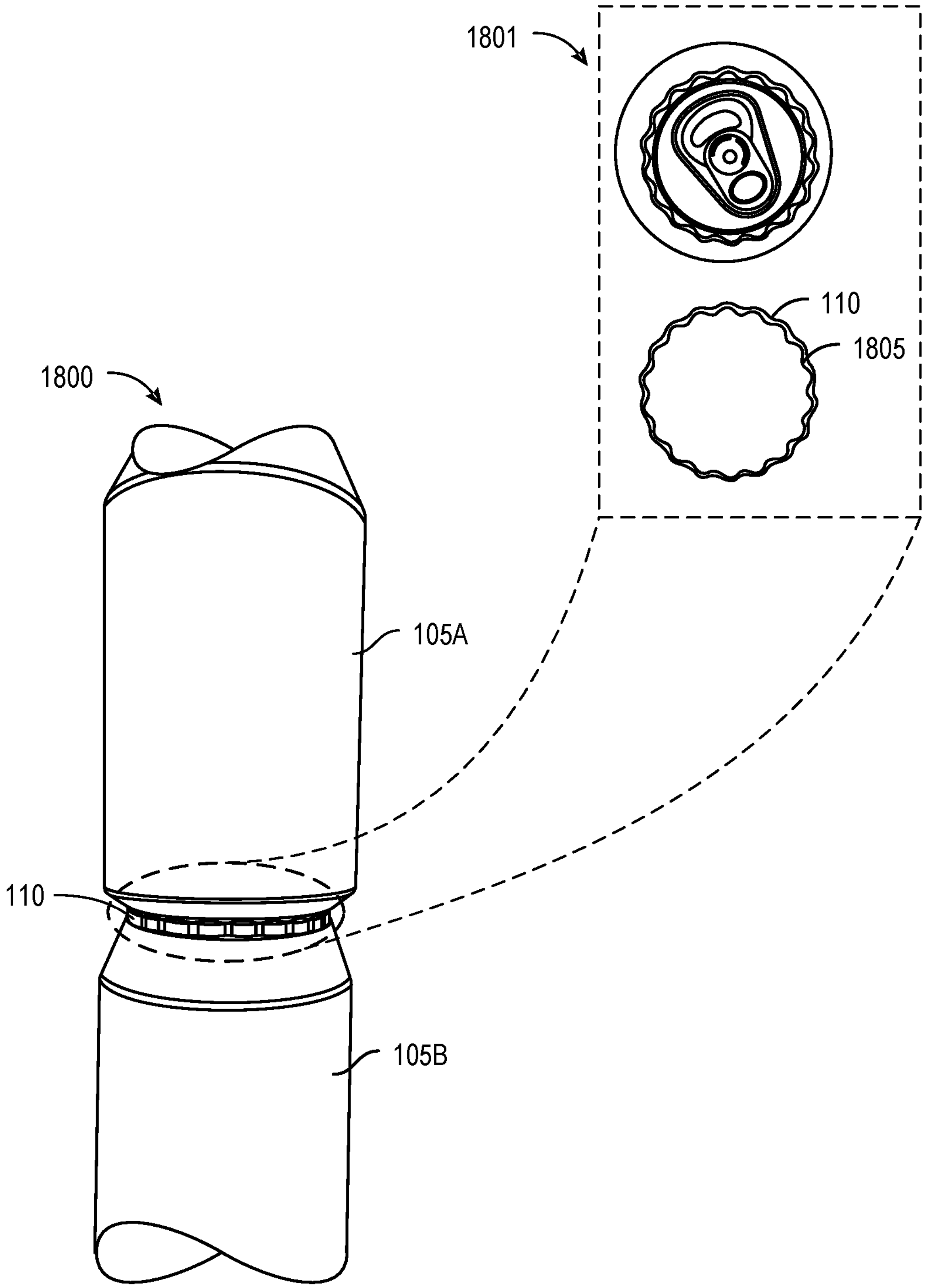
FIG. 18 depicts exemplary geometry of a patterned end in relation to a stacking configuration.

FIG. 18 depicts exemplary geometry of a patterned end in relation to a stacking configuration. As depicted in an exemplary scenario 1800, a container 105A is stacked upon a container 105B provided with the seam 110. As depicted in a plan view 1801, the seam 110 may be formed using at least an inner form 1805. The seam 110 may, for example, be formed by beginning with a substantially un-patterned (e.g., circular) rim (e.g., seam). The rim may be formed against the inner form 1805 (e.g., by tools/features and/or methods disclosed at least with reference to FIGS. 22-24). The rim may "bounce back" from the inner form 1805 to form the finished seam 110. Accordingly, the seam 110 may have a smaller effective radius (e.g., inner radius) than the beginning rim. The seam 110 may, for example, be completely circumscribed by the path of the beginning rim. Accordingly, the upper container 105A may rest vertically higher within the seam 110 then in a corresponding un-patterned seam. For example, the bottom of the container 105A may not touch a flat portion of the container end of the container 105B. Various such embodiments may advantageously prevent material stretching during patterning of the seam. Such embodiments may, for example, advantageously reduce or avoid thinning of the seam material during patterning and may, for example, thereby reduce material failure and/or sealing failure.

In various embodiments, the rim may be formed outward against an outer form such that the finished seam (e.g., corresponding to the seam 110 having a larger effective radius) may completely circumscribe the beginning rim. Accordingly, in various such embodiments a bottom of the upper container 105A may contact the flat portion of the container end of the lower container 105B. Various such embodiments may advantageously increase stability of stacked containers (e.g., cans).

As depicted in FIG. 18, the container end includes an opening element (depicted as a can tab). The opening element may, for example, be operated to open an aperture in the can end. The opening element may, as depicted, be configured to engage a predetermined stress concentration region (curvilinear pattern on the can end adjacent to, extending from, and/or about the can tab).

Figure 19:
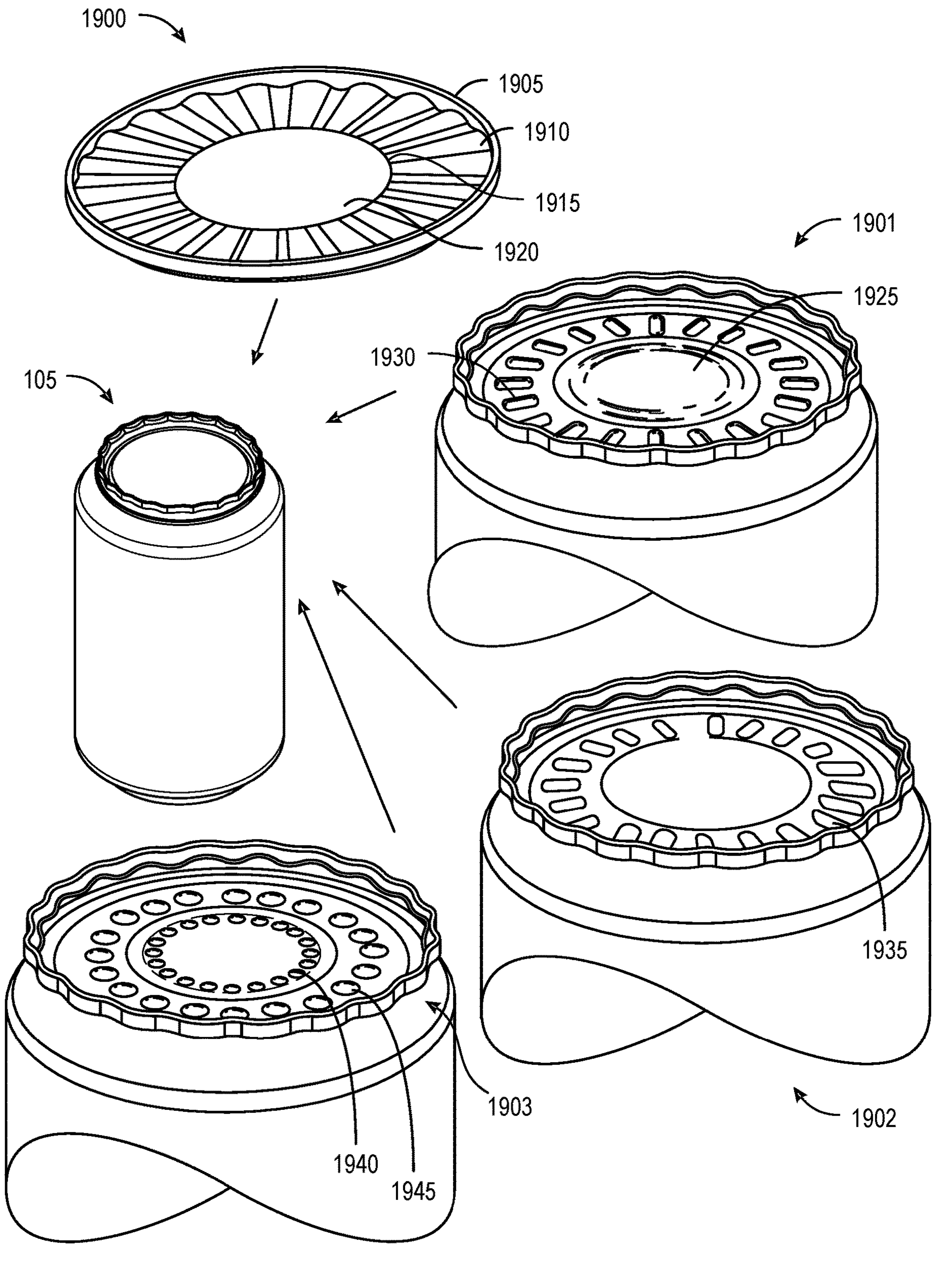
FIG. 19 and FIG. 20 depict exemplary patterned container ends.
Figure 20:
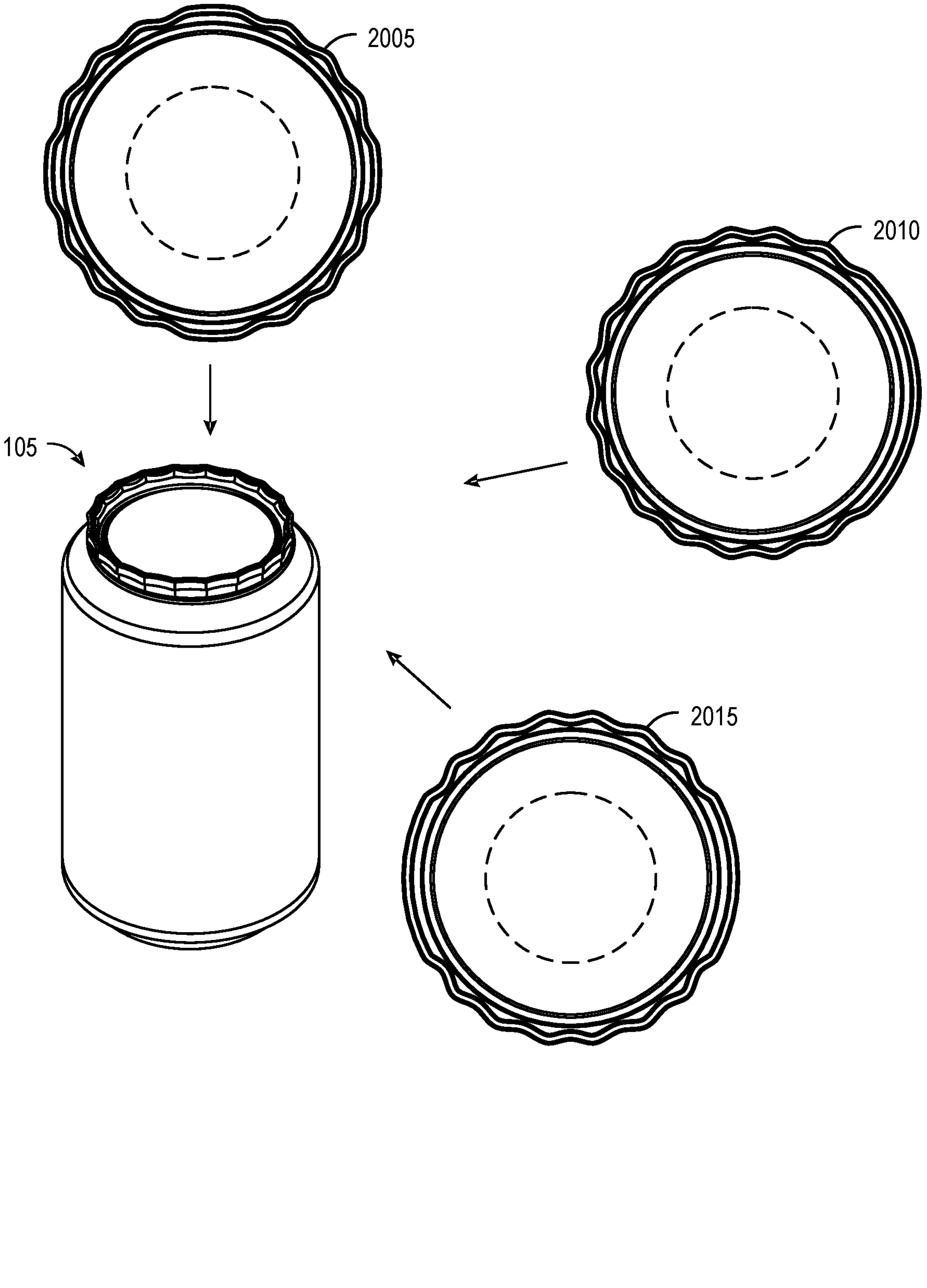

FIG. 19 and FIG. 20 depict exemplary patterned container ends. FIG. 19 depicts exemplary axial displacement feature(s) and patterns. A container end 1900 is provided with an outer rim 1905 (which may subsequently be formed, for example, into a patterned seam such as the (lobed) seam 110). A patterned surface 1910 is provided over at least part of the container end 1900. As depicted, a score 1915 defines an un-patterned core 1920. The pattern may, for example, be circumferentially undulating (e.g., sinusoidal). The pattern may, for example, be radially varying (e.g., increasing, decreasing, monotonically increasing/decreasing, or some combination thereof). In various embodiments the pattern may, for example, provide axial deformation resistance. For example, the pattern may prevent a portion of the end 1900 between the rim 1905 and the score 1915 from fracturing and/or bending. Accordingly, the patterned surface 1910 may, by way of example and not limitation, increase a stress concentration in the score 1915 (e.g., when a hammer is applied axially to the end 1900 on or about the score 1915). The patterned surface 1910 may accordingly, for example, advantageously decrease axial travel of a hammer and/or force required to open the end 1900.

A container end 1901 depicts a first exemplary axial displacement feature 1925 and a first exemplary axial displacement pattern 1930. As depicted, the first exemplary axial displacement feature 1925 depicts a vertically displaced ridge (e.g., in a directly parallel to the longitudinal axis of the can). The ridge is substantially circular. In various embodiments the ridge may, for example, include a non-circular curvilinear pattern.

The first exemplary axial displacement pattern 1930 includes substantially oval features extending upwards in a direction parallel to the longitudinal axis of the can. The features are patterned circumferentially (substantially) uniformly about the longitudinal axis of the can.

A container end 1902 depicts a second exemplary axial displacement pattern 1935 radially outside of the score 1710. No features are provided within the score 1710. A container end 1903 depicts a third exemplary axial displacement pattern 1940 radially inward of the score 1710 and a fourth exemplary axial displacement pattern 1945 radially outward of the score 1710.

In various embodiments the axial displacement features and/or the axial displacement patterns may, for example, provide stiffening and/or stress concentration gradient control. For example, the feature(s) and/or patterns may, for example, increase a stress concentration in a score (e.g., the score 1710). For example, the stress concentration may be elevated in response to application of a force near the score 1710 (e.g., within a region such as defined by the outer radius 1730 and the inner radius 1740 as disclosed at least with reference to FIG. 17). For example, the axial displacement features and/or patterns may resist deflection in response to application of force by an opening member. Accordingly, the axial displacement feature(s) and/or pattern(s) may, for example, advantageously increase a stress concentration in the predetermined region and/or path at a given force applied by an opening member.

In various embodiments axial displacement feature(s) may, for example, be curvilinear. The feature(s) may, for example, be asymmetrical (e.g., with respect to the longitudinal axis of the can). In various embodiments axial displacement pattern(s) may, for example, be non-uniform. For example, multiple different features may be used in a pattern. A pattern may, for example, be asymmetric (e.g., circumferentially and/or radially with respect to the longitudinal axis of the can).

FIG. 20 depicts exemplary patterns of radial displacement of exemplary container ends. A first patterned seam 2005 includes a first exemplary pattern. The first patterned seam 2005 is circumferentially uniform about the longitudinal axis. A larger lobe repeats 4 times, and smaller lobes repeat 3 times (counting the radially outward-most lobes) between each larger lobe.

A second patterned seam 2010 includes a single extended lobe (e.g., a non-patterned region), shown on the right side of the can end and multiple smaller lobes. The smaller lobes are substantially uniformly spaced along the seam.

A third patterned seam 2015 includes two extended lobes (e.g., non-patterned regions of the seam), shown on the left and right side of the can end, respectively. The two extended lobes, as depicted, are substantially mirror images of each other about the longitudinal axis of the can in a plane parallel to the can end. The extended lobes are substantially uniformly spaced about the seam. Between the extended lobes are smaller lobes, which are also substantially uniformly spaced.

In various embodiments, container (e.g., can) ends may include various patterns. Some patterns (e.g., as depicted in FIGS. 19-20) may include lobes. In some embodiments, the lobes may be substantially uniformly spaced about the seam. In some embodiments, for example, 22 repeating lobes (e.g., referred to as 'petals') may be provided. In some embodiments, 20 repeating lobes may be provided. Some embodiments may, for example, be provided with 18 repeating lobes. Some embodiments may be provided, for example, with 28 repeating lobes. Various embodiments may include 26 repeating lobes, for example. Some embodiments, for example, may include 24 repeating lobes. In various embodiments, a container end may be patterned with a repeating pattern, an intermittent pattern, an interrupted pattern, a curvilinear pattern, a pattern with linear components, or some combination thereof.

Figure 21:
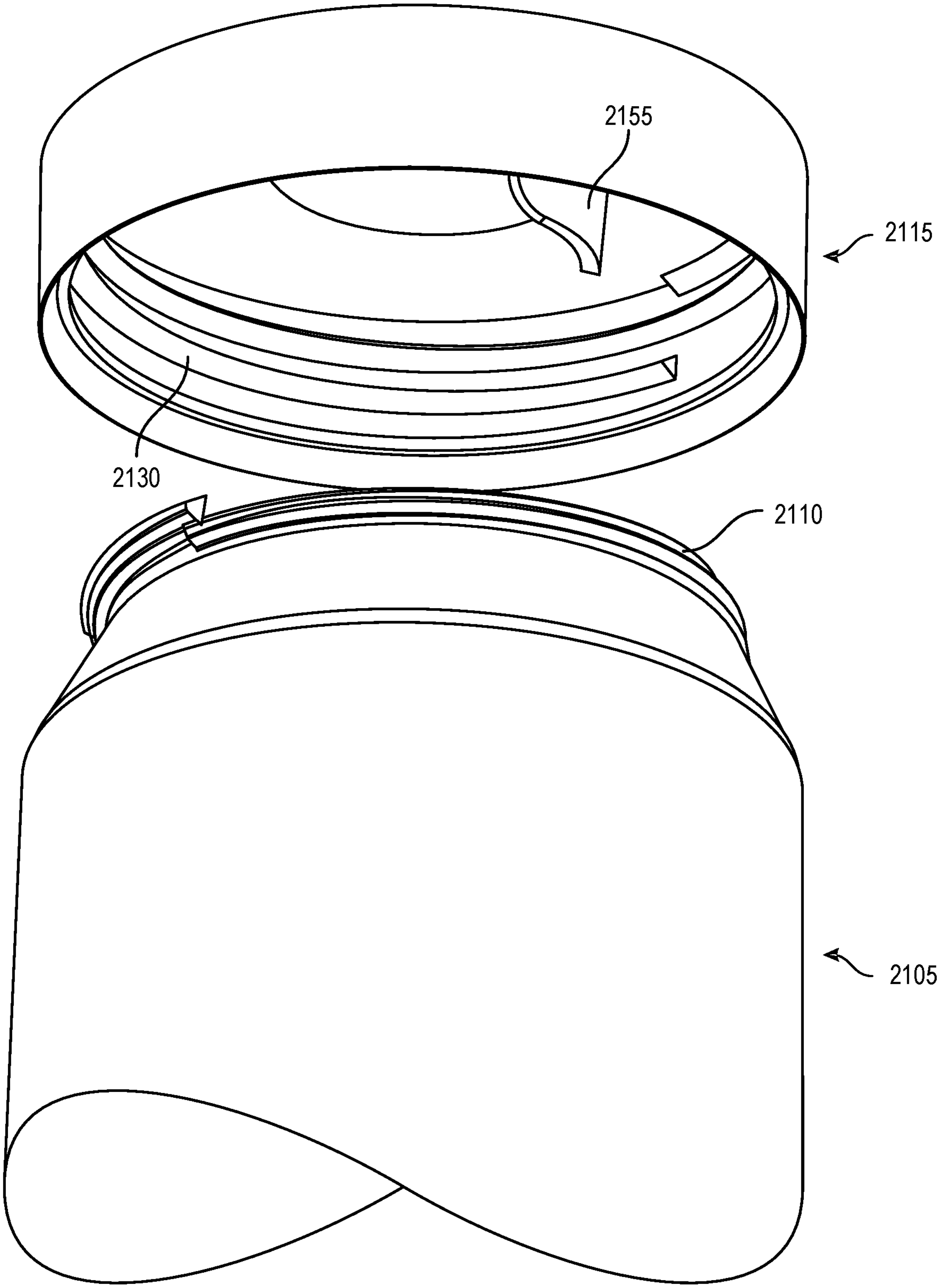
FIG. 21 depicts an exemplary container with tab-less opening closure and exemplary threaded-rim closure, with an exemplary closure-opening dispensing cap.

FIG. 21 depicts an exemplary container with tab-less opening closure and exemplary threaded-rim closure, with an exemplary closure-opening dispensing cap. A container 2105 is formed, as depicted, by a container closure seamed to a container body by a contoured rim 2110. For example, the container body may be a can body (e.g., as disclosed at least with reference to the body of the container 105). The closure may, for example, be a can end, such as is disclosed at least with reference to the container end 205. As depicted, the contoured rim 2110 is formed into a helical thread.

A closure-opening dispensing cap 2115 may be fitted over the rim 2110. The closure-opening dispensing cap 2115 is provided with inner threads 2130. The inner threads 2130 may be configured to threadedly engage the (threaded) contoured rim 2110. As the cap 2115 is rotated clockwise relative to the container 2105, the closure-opening dispensing cap 2115 is urged axially toward the container 2105. The closure-opening dispensing cap 2115 is provided with an opening element 2155, which is pressed against the closure as the closure-opening dispensing cap 2115 is screwed down onto the container 2105. The opening element 2155 may, for example, press against the closure substantially immediately inside a stress concentration ring (e.g., as disclosed at least with reference to the stress concentration ring 155). An interruption in the stress concentration ring (e.g., as disclosed at least with reference to the solid region 160) may retain material torn from the closure by the opening element 2155 to remain attached to the closure. Retaining the material may, for example, advantageously increase the percentage of material recycled by preventing loss, may prevent the removed material from interfering with dispensing, or some combination thereof. In various embodiments, by way of example and not limitation, the container 2105 (e.g., the body, the closure, the assembly) may be configured such that the material may not be retained, the interruption may be omitted, or some combination thereof.

Various embodiments provided with a threaded contoured rim may advantageously obviate the need for a coupling ring. Such embodiments may, for example, facilitate use of a simplified (e.g., a one-piece) closure-opening dispensing cap. Accordingly, various such embodiments may advantageously facilitate ease of use for a user installing a cap, increase cost savings, decrease materials used, increase sustainability, or some combination thereof.

In some embodiments, a threaded feature may be provided in a container end. In some embodiments, such as disclosed at least with reference to FIG. 21, the seam may be formed to create threads (e.g., exterior threads, interior threads). In some embodiments, a threaded feature may be provided in a container end other than a seam. For example, a threaded feature may be formed into a container end (e.g., as a continuous material formed into a malleable can end). In some embodiments, a threaded feature may be coupled to a container end (e.g., riveted, welded, crimped). The threaded feature may, for example, be created before seaming. In some embodiments the threaded feature may, for example, be created after seaming. The threaded feature may, for example, protrude outwards from the container end, such as exterior to the container when the container end is coupled to the container. In some embodiments the threaded feature may, for example, protrude inward from the container end, such as interior to the container when the container end is coupled to the container.

In some embodiments the threaded feature may, for example, have exterior threads (e.g., male threaded). In some embodiments the threaded feature may, for example, have interior threads (e.g., female threaded). Various embodiments may advantageously be configured to (releasably) couple to an RDE apart from a seam.

Figure 22:
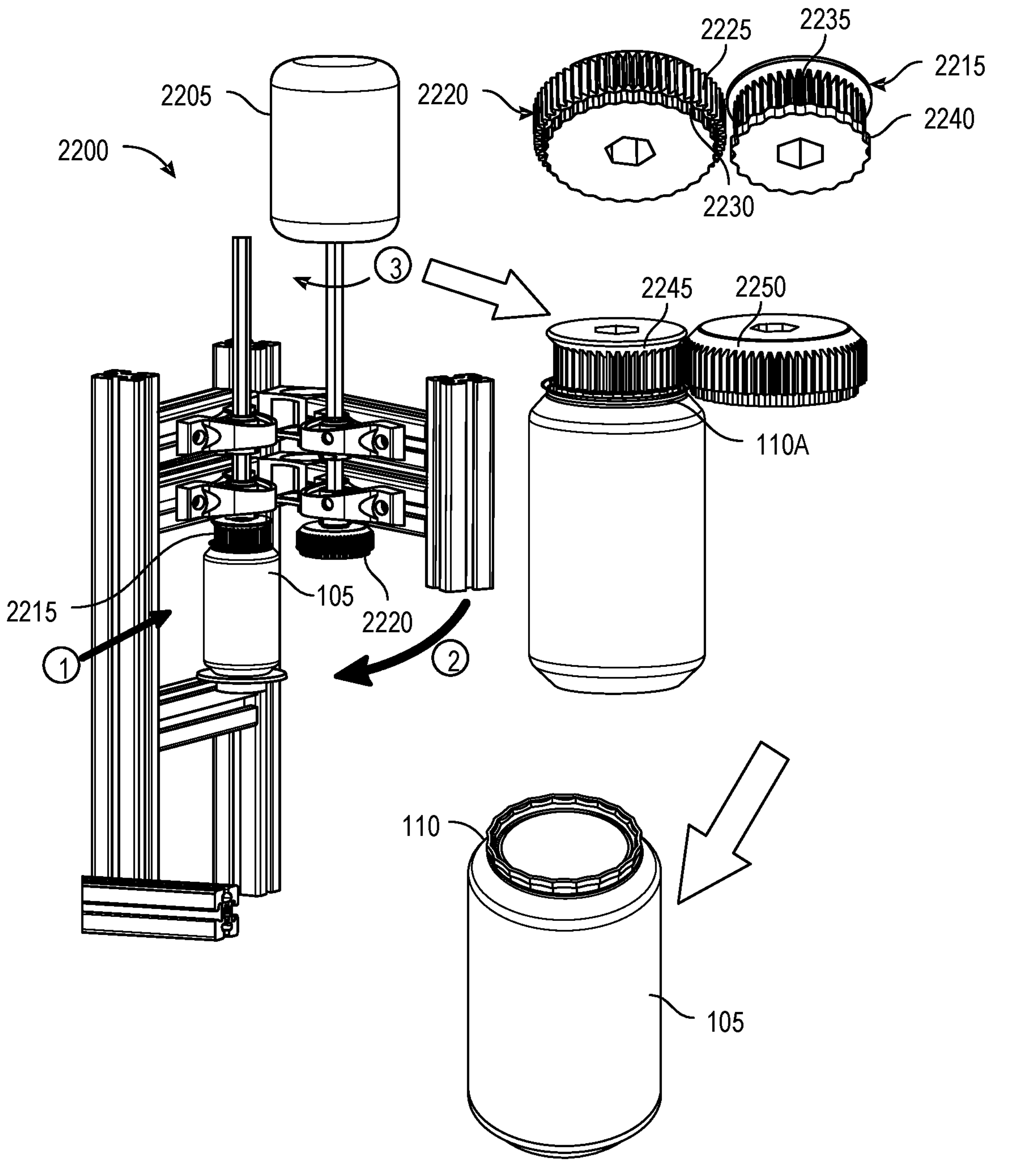
FIG. 22 depicts an exemplary container end seaming device in an exemplary use case scenario.

FIG. 22 depicts an exemplary container end seaming device in an exemplary use case scenario. A seaming system 2200 is depicted in a loading mode. A container 105 (e.g., a can) is loaded (operation "1") into the seaming system 2200. An upper end of the container 105 engages an inner seaming tool 2215. For example, the upper end may be a separate component (e.g., a 'can end') disposed upon the container 105 after filling of the container 105 with contents (e.g., liquid, powder, capsules).

Once the container 105 is loaded into the seaming system 2200, then an outer seaming tool 2220 is operated (e.g., rotated) into engagement (operation "2") with the inner seaming tool 2215, thereby placing the seaming system 2200 into a seaming mode. In the seaming mode, the outer seaming tool 2220 is rotated (operation "3") by a rotary actuator 2205, thereby counter rotating the container 105 and the inner seaming tool 2215. A seam 110 may thereby advantageously be formed in the container 105. For example, a container end may be fluidly sealed to the container 105 by the seam 110.

The container 105 may, as depicted, be disposed on a rotating platform. The rotating platform may, for example, be rotatably coupled to a mount. The mount may be coupled to a (fixed) frame. Rotating supports (e.g., pillow block bearings) may be coupled to the frame of the seaming system 2200 to support shafts coupled to the inner seaming tool 2215 and/or the outer seaming tool 2220.

As depicted, a right arm (supporting the rotary actuator 2205 and the outer seaming tool 2220) of the frame of the seaming system 2200 is in hinged connection with the main frame of the seaming system 2200. The outer seaming tool 2220 is coupled to the rotary actuator 2205 (e.g., a motor) by a shaft. Accordingly, the rotary actuator 2205 may drive the shaft, thereby rotating the outer seaming tool 2220. When the right arm of the frame is swung toward the main frame such that the seaming system 2200 is in a seaming mode, then the outer seaming tool 2220 may be thereby urged radially towards and engage the inner seaming tool, thereby rotating the inner seaming tool 2215. Accordingly, a pattern of radial displacement may be applied to the seam 110. In some embodiments, the pattern may be applied after forming (e.g., cold-forming material of the can body and the can end together to create a sealed seam) the seam. In some embodiments the pattern may be applied during (e.g., simultaneously with) forming the seam.

In various embodiments, the outer seaming tool 2220 may be provided with a shaft. The shaft may be provided with an inner lumen. The inner lumen may be configured to slidingly engage the shaft. The lumen may resist relative rotation between the shaft and the outer seaming tool 2220. Accordingly, rotation of the shaft (e.g., by an actuator, not shown) may drive rotation of the outer seaming tool 2220, and/or vice versa.

In various embodiments, the inner seaming tool 2215 may be provided with a shaft. The shaft may be provided with an inner lumen. The inner lumen may be configured to slidingly engage the shaft. The lumen may resist relative rotation between the shaft and the inner seaming tool 2215. Accordingly, rotation of the shaft (e.g., by the rotary actuator 2205) may drive rotation of the inner seaming tool 2215, and/or vice versa.

The outer seaming tool 2220 is provided with engagement features 2225 (e.g., gear teeth). The engagement features 2225 matingly engages with engagement features 2235 of the inner seaming tool 2215. For example, rotation of the outer seaming tool 2220 in a first rotational direction may impart (counter-) rotation in a second rotational direction to the inner seaming tool 2215, and/or vice versa, via mating engagement between the engagement features 2225 and the engagement features 2235. As depicted, the inner seaming tool 2215 is provided with an engagement ramp 2245. The engagement features 2225 are chamfered (e.g., ramped) at an upper end to form a chamfer 2250. The engagement ramp 2245 and the chamfer 2250 of the engagement features 2225 may cooperate to axially align the inner seaming tool 2215 and the outer seaming tool 2220 (e.g., along a radius of each of the tools). For example, the engagement ramp 2245 and the chamfer 2250 may advantageously axially align the seaming tools such that the engagement features 2225 and the engagement features 2235 may fully engage (for example, a minimum gear tooth engagement, a minimum overlap distance, a minimum percentage/ratio).

The outer seaming tool 2220 is provided with an outer form 2230. The outer form 2230 is configured to matingly engage with an inner form 2240. Together, the outer form 2240 and the inner form 2230 may cooperate to form the seam 110. For example, the inner form 2240 and the outer form 2230 may apply a pattern of radial displacement to form the seam 110 (e.g., by deformation of the material of a container body and a separate container end placed thereon). When the inner seaming tool 2215 and the seaming system 2200 are fully engaged (e.g., when the engagement features 2225 and the engagement features 2235 are fully engaged in a radial direction) there may be a (predetermined) gap between the outer form 2230 and the inner form 2240. In various embodiments the gap may be determined according to a desired thickness of the finished seam 110. In some embodiments the gap may be determined by a (compressed) thickness of the (unfinished) seam.

In operation (e.g., when transitioning from a loading mode to a seaming mode), the outer seaming tool 2220 may be moved laterally toward the inner seaming tool 2215. Once the engagement features 2235 and the engagement features 2225 mesh, the seam 110 may be formed by the outer form 2230 and the inner form 2240. Rotation of at least one of the inner seaming tool 2215 (e.g., by a shaft) and the outer seaming tool 2220 may rotate the container 105 such that the seam 110 is formed around the entire circumference of the container 105. Accordingly, in various embodiments the separate container end and the container 105 may advantageously be fluidly sealed to fluidly contain contents of the container 105.

The rotating platform (depicted as supporting the container 105) of the coupling features 220 may idle (e.g., be driven by rotation of the container 105). In some embodiments the rotating platform may be driven (e.g., by an actuator, not shown). In some embodiments the rotating platform may be provided with a platform. The platform may be coupled to a shaft (e.g., mechanically coupled to, integrally, and/or unitarily formed with the platform). The shaft may be rotatably coupled to a mounting mechanism. The mounting mechanism may, for example, be a part of the mount. The mounting mechanism may, by way of example and not limitation, include a bearing, a bushing, or some combination thereof.

A shaft connected to the platform may, for example, be provided with a bushing adapter. The bushing adapter may, for example, have an interior lumen configured (e.g., having a hexagonal shape) to receive the shaft. The adapter may, for example, have an outer surface configured to interface with an aperture of a rotating support (e.g., the pillow bearings). In various embodiments supports may be provided with adapters to adapt the shaft to the support.

Figure 23:
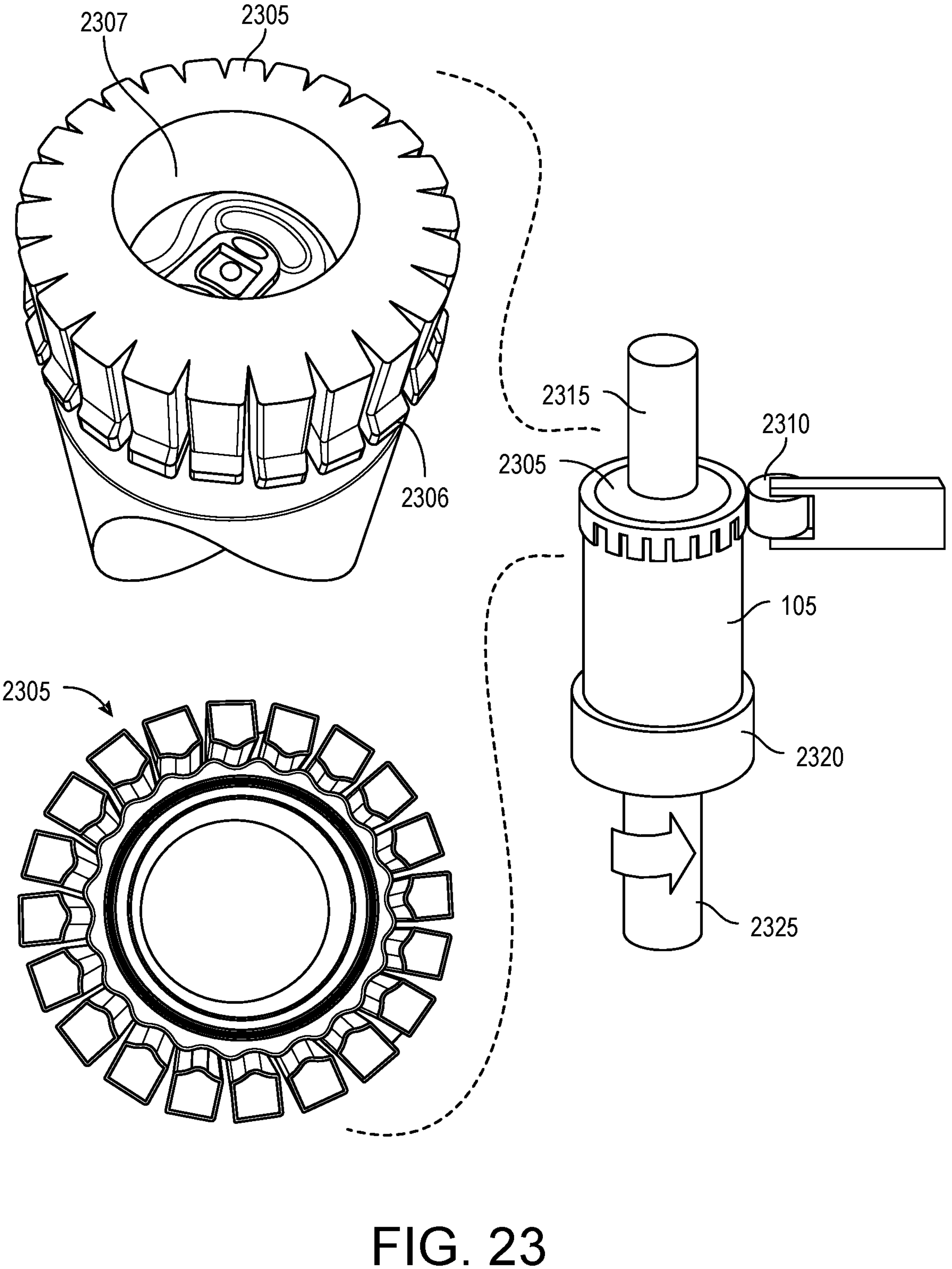
FIG. 23 depicts an exemplary seaming tool configured to individually form seam pattern elements.

FIG. 23 depicts an exemplary seaming tool configured to individually form seam pattern elements. In the depicted example, a seaming tool 2305 is provided. The seaming tool 2305 may, for example, be one-piece. For example, the seaming tool 2305 may be integrally formed from a single material (e.g., injection molded, 3D printed, cast). In some embodiments the seaming tool 2305 may, by way of example and not limitation, be formed of multiple components and assembled.

The seaming tool 2305 is disposed over a container 105 (e.g., a can). The seaming tool 2305 includes multiple forming lugs 2306 distributed circumferentially around the outside of the tool 2305. The seaming tool 2305 further includes an inner form 2307. In some embodiments, the outer form may be solid and the inner form may be constructed of deflectable forming lugs.

As depicted, in an exemplary seam forming set up at right in FIG. 23, the seaming tool 2305 is disposed over a top of the container 105 (e.g., with a separate container end disposed on the top of a body of the container 105). The seaming tool 2305 is urged radially inwards towards a longitudinal axis of the container 105 by a pressing tool 2310. The pressing tool 2310 may radially advance against the forming lugs 2306 to deflect the forming lugs 2306 radially inward. Inward radial deflection of each of the forming lugs 2306 (e.g., in sequence), may compress a member of the container 105 and the container end (not shown) between the deflected forming lug 2306 and the inner form 2307. Accordingly, a seam (e.g., seam 110) may advantageously be formed.

In various embodiments a radial (e.g., lateral) position and/or force of the pressing tool 2310 may, for example, be dynamically controlled. A position of the pressing tool 2310 along a second longitudinal axis may be controlled, the second longitudinal axis being a longitudinal axis of a depicted supporting arm of the pressing tool 2310. The second longitudinal axis may be substantially colinear with a radius of the seaming tool 2305.

For example, the pressing tool 2310 may be alternatingly advanced and retracted along the second longitudinal axis. The pressing tool 2310 may be advanced and/or retracted along the second longitudinal axis in synchrony with rotation of the container 105. A predetermined sequence of advancement and retraction may, for example, selectively deflect various of the forming lugs 2306 (e.g., fully deflect, partially deflect, no deflection) to form a pattern of radial displacement in the seam 110.

As an illustrative example, a static position of the pressing tool 2310 along the second longitudinal axis may, by way of example and not limitation, correspond to a pattern of radial displacement such as shown in FIG. 2 and in container end 1901, container end 1902, and container end 1903 of FIG. 19. As an illustrative example, a dynamic position of the pressing tool 2310 along the second longitudinal axis during rotation of the container 105 may, by way of example and not limitation, be controlled to form a non-uniform patterned seam. For example, a dynamic position of the pressing tool 2310 during rotation of the container 105 may be used, by way of example and not limitation, to form the first patterned seam 2005, the second patterned seam 2010, the third patterned seam 2015 disclosed at least with reference to FIG. 20.

As depicted, the seaming tool 2305 is coupled to a shaft 2315. The container 105 is disposed on a platform 2320. The platform 2320 is coupled to a shaft 2325. The shaft 2325 and/or the shaft 2315 may be rotatably mounted, driven by a rotary actuator, or some combination thereof. In various embodiments, the platform 2320 may, for example, be configured such as disclosed at least with reference to the container-supporting platform of the seaming system 2200.

In various embodiments, the pressing tool 2310 may, for example, be configured as a roller (as depicted). For example, the pressing tool 2310 may be provided with a rolling end effector. The rolling end effector may progressively and sequentially engage one or more of the forming lugs 2306. In some embodiments, by way of example and not limitation, the pressing tool 2310 may be configured as a solid end effector. For example, the pressing tool 2310 may be provided with a (rigid) end effector having a non-rotating surface to engage the forming lugs 2306. The non-rotating surface may, for example, 'slide' along the seaming tool 2305. In some embodiments, a position of the pressing tool 2310 along the second longitudinal axis may be timed with rotation of the seaming tool 2305 such that the pressing tool 2310 individually engages only one of the forming lugs 2306 at a time. For example, the pressing tool 2310 may be timed to individually 'strike' each lug (e.g., each lug desired to be actuated) in sequence. For example, the pressing tool 2310 may deflect a forming lug radially inwards and then be withdrawn, the seaming tool 2305 may be rotated to bring a next forming lug to be deflected into register with the second longitudinal axis, the pressing tool 2310 may be advanced to deflect the currently registered forming lug, and the process may continue until a desired pattern of radial displacement is formed.

Figure 24:
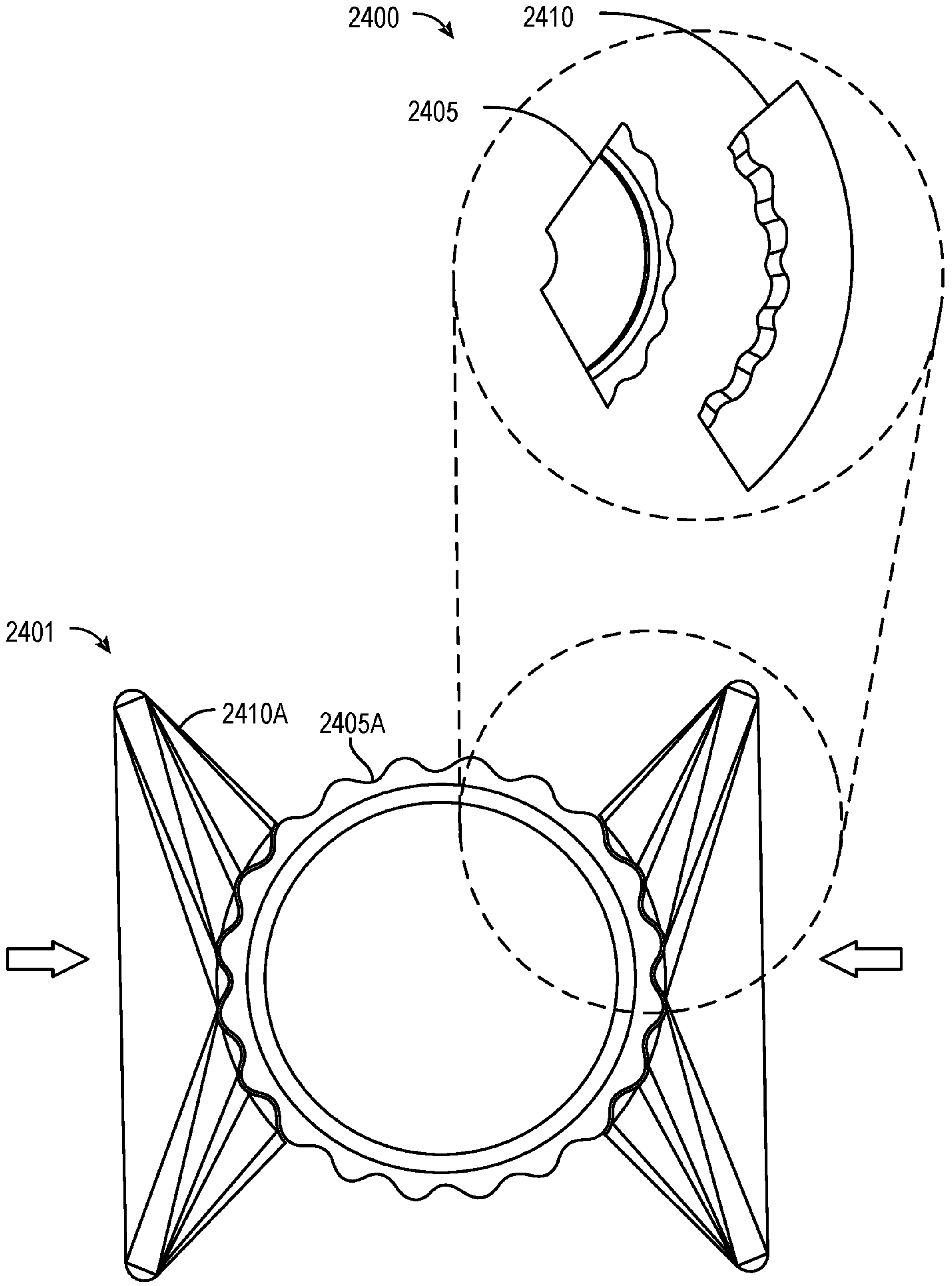
FIG. 24 depicts an exemplary seaming tool configured to form multiple seam pattern elements in a single operation.

FIG. 24 depicts an exemplary seaming tool configured to form multiple seam pattern elements in a single operation. At least one portion of an exemplary seaming tool 2400 is depicted. As depicted, the seaming tool 2400 includes an outer form 2410 and an inner form 2405. The outer form 2410 and the inner form 2405 may have a corresponding number of pattern elements (e.g., lobes, 'petals', sinusoidal period). The inner form 2405 may be disposed inside a container end, and the outer form 2410 may be advanced along a radius of the container (e.g., a radius extending orthogonally from a longitudinal axis of the container) such that a patterned seam of the container is formed between the pattern of the inner form 2405 and a corresponding pattern of the outer form 2410.

In some embodiments the exemplary seaming tool 2400 may, for example, be an individual tool set. For example, the inner form 2405 and the outer form 2410 may be repeatedly urged radially together on a container seam, with the container being rotated relative to the tool set after each compression, to form a complete pattern of radial displacement in a seam (e.g., seam 110). As depicted, for example, the exemplary seaming tool 2400 may be configured to pattern about one-third of a circumference of a container.

In some embodiments, the exemplary seaming tool 2400 may, for example, be components of a larger tool. As an illustrative example, the exemplary seaming tool 2400 may be configured as (replaceable) inserts into a larger tool.

In a depicted example, a seaming tool 2401 includes an inner form 2405A. The inner form 2405A may be disposed inside a container end. Outer forms 2410A may be advanced against the inner form 2405A to form a seam of the container therebetween. The outer forms 2410A may be advanced in opposite directions along a single axis and intersecting a longitudinal axis passing through the center of the container and/or the inner form 2405A. Accordingly, lateral forces applied by the outer forms 2410A to the inner form 2405A and/or the container may be advantageously canceled out to substantially zero. In various embodiments multiple outer forms may be provided to completely encircle the container. As applied to the depicted example, four outer forms 2410A may, by way of example and not limitation, be provided to completely engage every pattern element of the inner form 2405A.

In some embodiments, for example, such as depicted, the outer form 2410 may be a (replaceable) insert in the outer forms 2410A. The inner form 2405 may, for example, be a (replaceable) insert in the inner form 2405A. Various embodiments with replaceable (e.g., interchangeable) inserts, for example, may advantageously allow a single seaming system and/or tool to be adapted to a specific pattern (e.g., 15 lobes, 27 lobes).

In various embodiments, an inner tool and/or outer tool may, for example, be provided with a patterned surface corresponding to a single element or a portion of a single element of a pattern. For example, a tool may have a patterned surface corresponding to a single repeating pattern element (e.g., single sinusoidal period). The tool may, for example, be repeatedly urged (e.g., struck, pressed) radially towards an opposing tool (e.g., inner tool, outer tool) to form a feature in a pattern. The tool may be synchronized with rotation of the container relative to the tool. For example, the outer forms 2410A may have a single element of the pattern. In some embodiments the inner form 2405A may have a single element of the pattern.

Such embodiments may, for example, advantageously provide an easily and/or economically replaceable and/or interchangeable tooling. Such embodiments may, for example, advantageously provide enhanced flexibility in creating multiple different complete patterns. For example, a single surface may be applied in varying depths and/or circumferential spacing to form multiple patterns of radial displacement in a seam 110. As an illustrative example, multiple single tools may be selectively brought into register with an opposing tool(s) (e.g., a single entire-pattern tool, a replaceable tool, an interchangeable tool, single pattern element tools) to form a custom pattern. In some embodiments a controller may be configured to generate a predetermined custom pattern using one or more existing single element tools.

Figure 25:
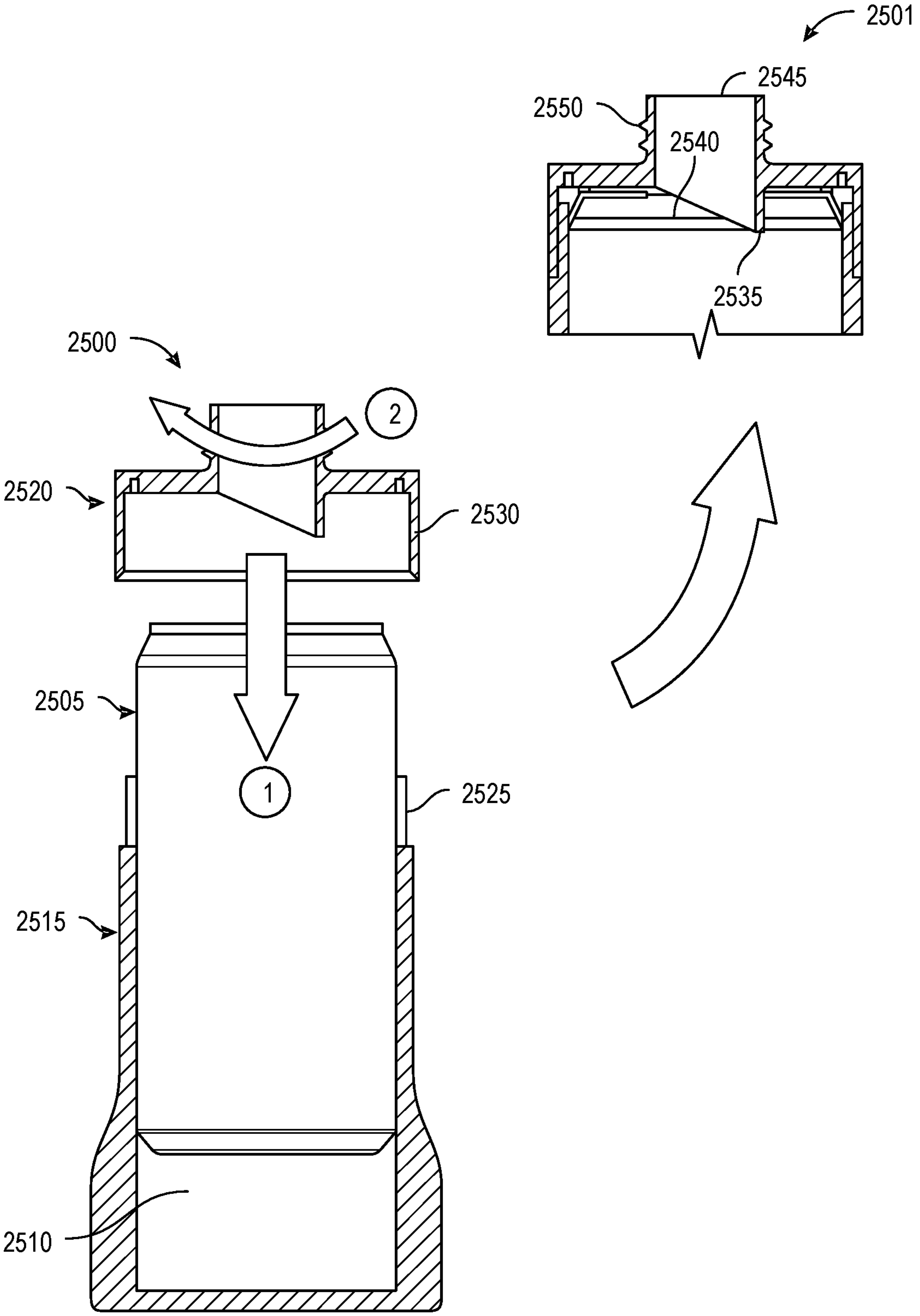
FIG. 25 depicts an exemplary RDE in an exemplary use case scenario.

FIG. 25 depicts an exemplary RDE in an exemplary use case scenario. In the depicted example a container 2505 (e.g., a disposable, recyclable can) is disposed within a cavity 2510 of a lower housing 2515 of an RDE. In a loading mode 2500, a cap 2520 is axially assembled (operation "1") along a longitudinal axis of the container 2505 and the housing 2515 onto the housing 2515. The housing 2515 is provided with a coupling member 2525 (e.g., outer threads). The cap 2520 is provided with a coupling member 2530 (e.g., inner threads). Once the cap 2520 is axially assembled onto the housing 2515 such that the coupling member 2525 and coupling members 2530 engage, the cap 2520 may be rotated in a first rotational direction (operation "2"). Accordingly, the coupling member 2525 and coupling members 2530 may threadedly engage, thereby releasably coupling the cap 2520 to the housing 2515.

The cap 2520 is provided with an opening member (e.g., which may be referred to as a hammer) 2535. As the cap 2520 continues to be operated in the first rotational direction, the opening member 2535 may be axially advanced (e.g., parallel to the longitudinal axis) into contact with an end 2540 of the container 2505. Continued axial advancement of the opening member 2535 may open the end 2540. For example, the opening member 2535 may increase a stress concentration in a desired region of the end 2540. The end 2540 may, by way of example and not limitation, be opened by tearing, fracturing, cutting, and/or otherwise inducing failure in the end 2540.

Once the end 2540 has been opened by the opening member 2535, a lumen 2545 of the cap 2520 may be placed into (fluid) communication with an interior of the container 2505, as shown in a dispensing mode 2501. The cap 2520 is further provided with a dispensing mechanism coupling member 2550 (e.g., outer threads). Accordingly, by way of example and not limitation, a dispenser (e.g., a hand operated vertically reciprocating pump) may be advantageously (threadedly) coupled to the cap 2520 and thereby placed in fluid communication with an interior of the container 2505. A user may thereby advantageously dispense contents of the container 2505 using the RDE.

In various embodiments at least some portion of the housing 2515 and/or the cap 2520 may be formed, by way of example and not limitation, by materials including metal (e.g., steel, stainless steel, brass, bronze, aluminum, cast-iron, titanium).

In some embodiments at least some portion of the housing 2515 and/or the cap 2520 may be formed, for example, from a polymer (e.g., plastic, fiberglass, carbon fiber). In some embodiments at least some portion of the housing 2515 and/or the cap 2520 may, for example, be formed from a fibrous material (e.g., wood, hardwood, oak, mahogany, walnut, cherry, Ipe, bamboo). In some embodiments, at least some portion of the housing 2515 and/or the cap 2520 may be formed, for example, from a stone material (e.g., marble, granite, limestone, slate).

In some embodiments, for example, an outer (visible) portion of the housing 2515 and/or the cap 2520 may be formed of an aesthetically pleasing material. An inner and/or working portion of the RDE may be formed of an engineering material. Accordingly, various embodiments may allow a standard (disposable, recyclable) container to be used as a refill "cartridge" in a user selected RDE. Accordingly, a user may advantageously select an RDE having user-desired function (e.g., dispensing functions) and/or aesthetics (e.g., coordinating with a desired style and/or environment) for use with (standard) containers 2505. In various embodiments the RDE may, for example, be configured to receive decoration by a user (e.g., having a surface configured to accept ink, having an outer transparent shield behind which a user-selected insert may be placed).

In various embodiments an RDE may, by way of example and not limitation, include a housing configured to be disposed on a horizontal surface (e.g., a counter, table, ledge, shelf), to be hung on a vertical surface (e.g., a wall, post), suspended from a surface above (e.g., by a cord, cable, bail, handle), or some combination thereof.

In various embodiments a cap of an RDE (e.g., cap 2520) may, by way of example and not limitation, be configured to open a container end before and/or without placing the container into a lower housing (e.g., housing 2515). For example, the cap may be configured with a coupling engine configured to releasably couple the cap to a container end (e.g., by a seam). The coupling engine may, for example, be removable and/or deactivatable such that the cap may engage a lower housing directly without coupling (directly) to the container (end).

In various embodiments a cap (e.g., cap 2520) may couple to a housing with mating engagement members (e.g., coupling member 2525, coupling members 2530). In various such embodiments, the engagement members may, by way of example and not limitation, include threads. In some embodiments engagement members may include mating twist-lock features. In some embodiments engagement members may include locking cams, latches, hooks, or some combination thereof. Some embodiments may be provided with engagement members including, for example, hinges.

Figure 26:
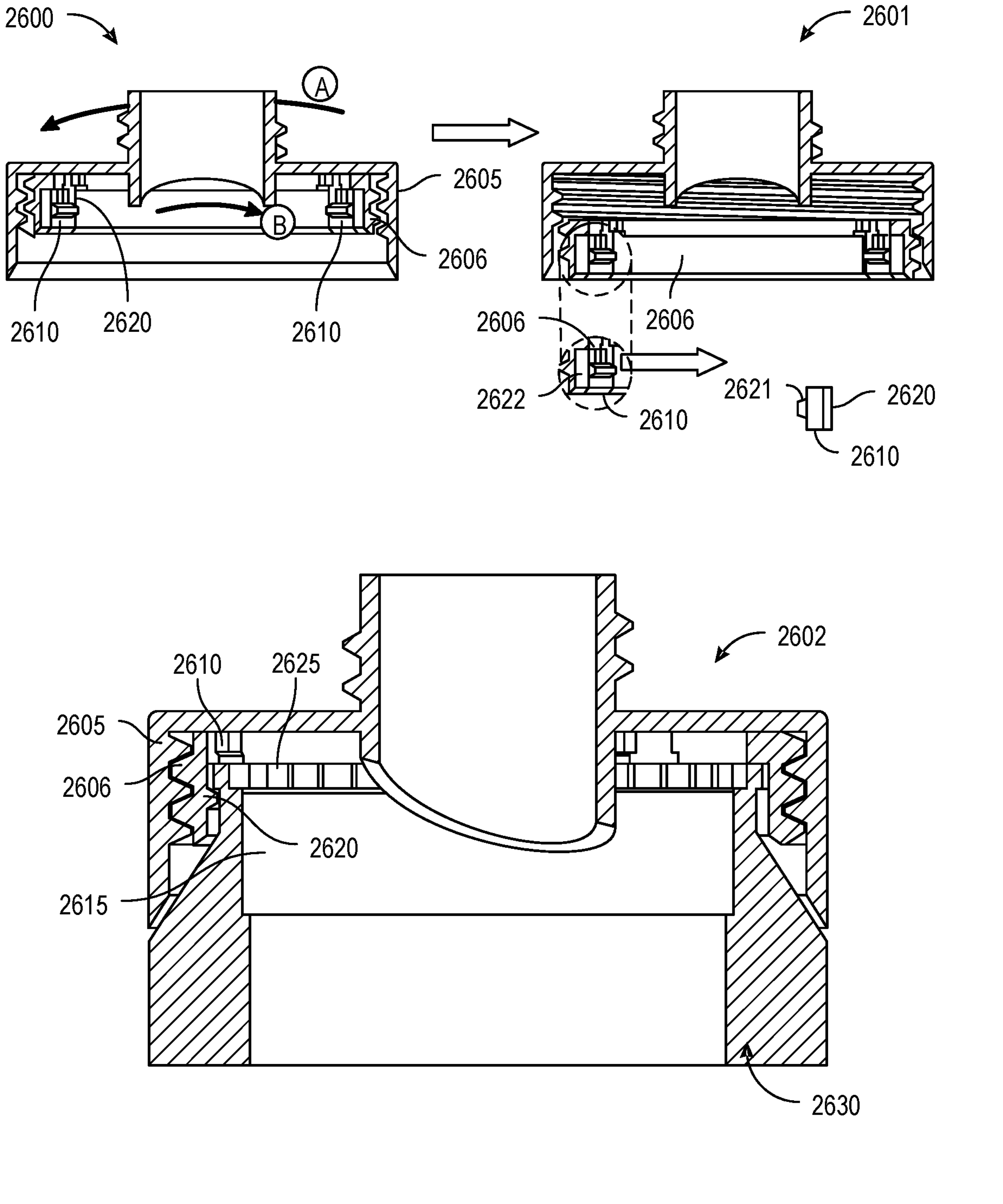
FIG. 26 depicts an exemplary RDE configured to releasably couple to a container end in a ready mode.

FIG. 26 depicts an exemplary RDE configured to releasably couple to a container end in a ready mode. In the depicted example an RDE is shown in cross-section in an engaged (e.g., coupled to a container end such that the container end is opened) mode 2600 and in a ready mode 2601. The RDE includes a housing 2605 and a coupling engine 2606. The coupling engine 2606 includes multiple deflectable coupling members 2610. Each coupling member 2610 is provided with a lateral (e.g., horizontal) protrusion extending radially inward from the coupling engine 2606. The lateral protrusion may, for example, 'clip' under a rim/seam of a container (e.g., a container 105).

As depicted, operation of the housing 2605 in a first rotational direction ("A") and/or the coupling engine 2606 in a second rotational direction ("B") transitions the RDE from an engaged mode to a ready mode (e.g., ready to remove from a container, ready to apply to a container), and/or vice versa. The lateral protrusion may, for example, advantageously provisionally retain the RDE on a container (e.g., keep it from 'falling off') while a user is operating the RDE (e.g., from the ready mode 2601 to the engaged mode 2600), repositioning their hand (e.g., during operation, after operating from the engaged mode 2600 to the ready mode 2601 and before pulling the RDE off the container), or some combination thereof.

In various embodiments the coupling members 2610 are slidably coupled to the coupling engine 2606 such that they are driven (e.g., translated relative to the coupling engine 2606) by the housing 2605. The RDE depicted is further provided with an orientation retention mechanism including a protrusion 2621 on the coupling member 2610 and a cavity 2622 in the coupling engine 2606. The cavity(ies) 2622 may, for example, be positioned (e.g., radially and/or axially) such that the protrusion 2620 engages the corresponding cavity 2622 when the RDE is in the ready mode 2601.

Accordingly, the orientation retention mechanism may, for example, act as a detent. The orientation retention mechanism may, for example, advantageously resist (unwanted) rotation of the housing 2605 relative to the coupling engine 2606.

In various embodiments the orientation retention mechanism may, by way of example and not limitation, be separate from the coupling member 2610. In various embodiments protrusions and cavities may, for example, be reversed. Various embodiments may, for example, be provided with a 'detent' between the coupling engine 2606 and the housing 2605. For example, the orientation rotation mechanism may include a circumferential (e.g., lateral) groove and/or protrusion (ridge) in the housing and/or coupling engine. The other of the housing and coupling engine may, for example, have a deflectable engagement mechanism (e.g., having a protrusion/cavity) that engages the groove and/or protrusion when in an axial and/or rotational orientation.

As depicted at least with reference to an exemplary use-case scenario 2602, a container 2615 (e.g., a container 105, a can) is disposed in a lower housing 2630. The container 2615 has a patterned seam 2625. The RDE is coupled to the container 2615 and operated into the engaged mode (e.g., 2600) such that the coupling engine 2606 releasably secures the housing 2605 to the container 2615. In various embodiments the RDE may be assembled onto the container 2615 before or after the container 2615 is disposed within the lower housing 2630. The container 2615 may, for example, advantageously be used as a (disposable, recyclable) refill 'cartridge' for the lower housing 2630 and RDE. As depicted, the RDE slidingly mates over an upper edge of the housing 2630. In various embodiments the RDE may, by way of example and not limitation, engage the lower housing 2630 (e.g., threadedly, via at least one sealing member, clips, cams).

Figure 27A:
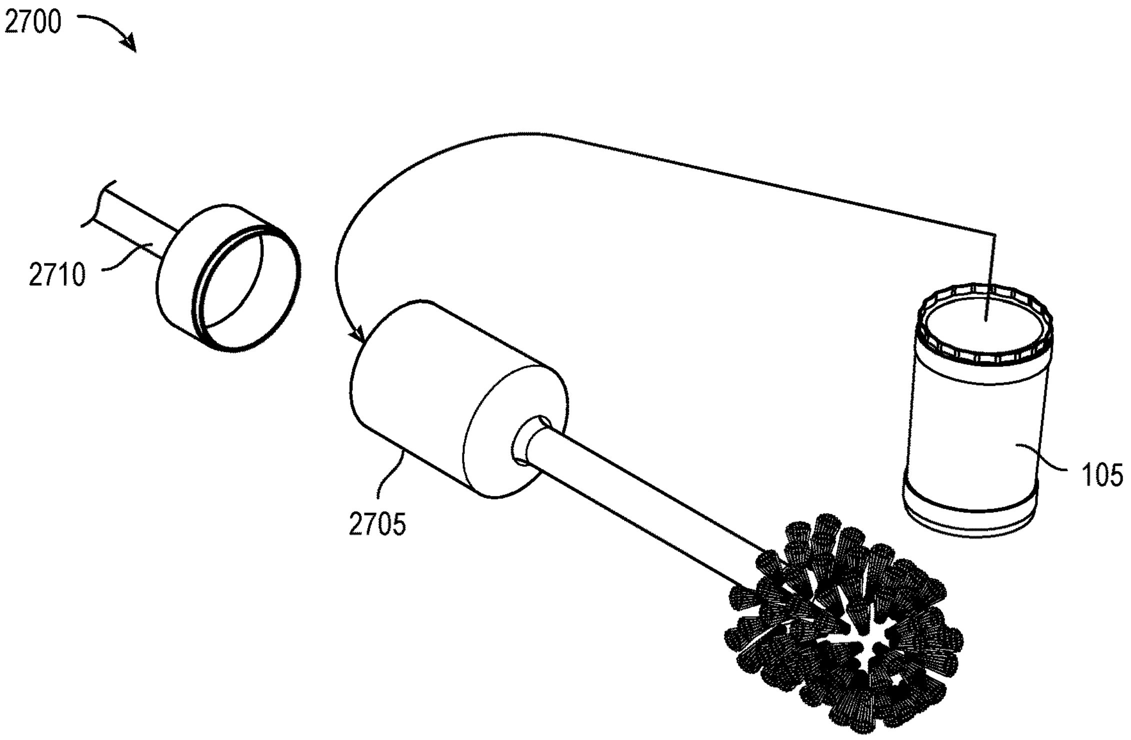
FIG. 27A and FIG. 27B depict exemplary multi-functional RDEs.
Figure 27B:
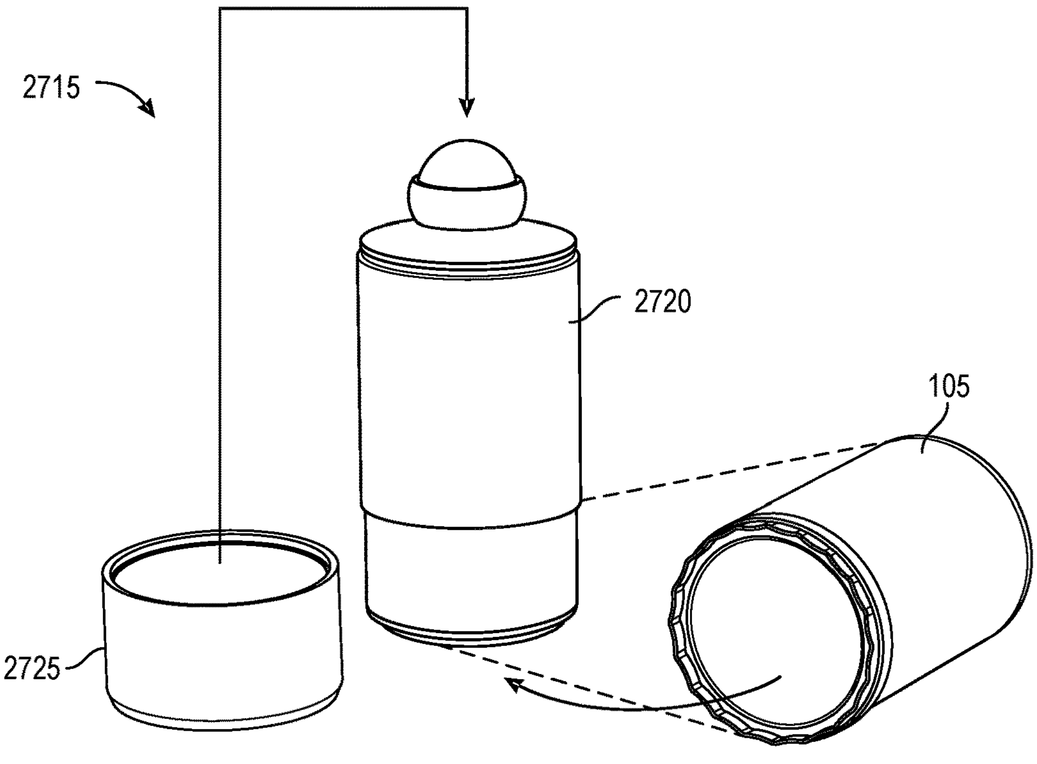
Figure 28:
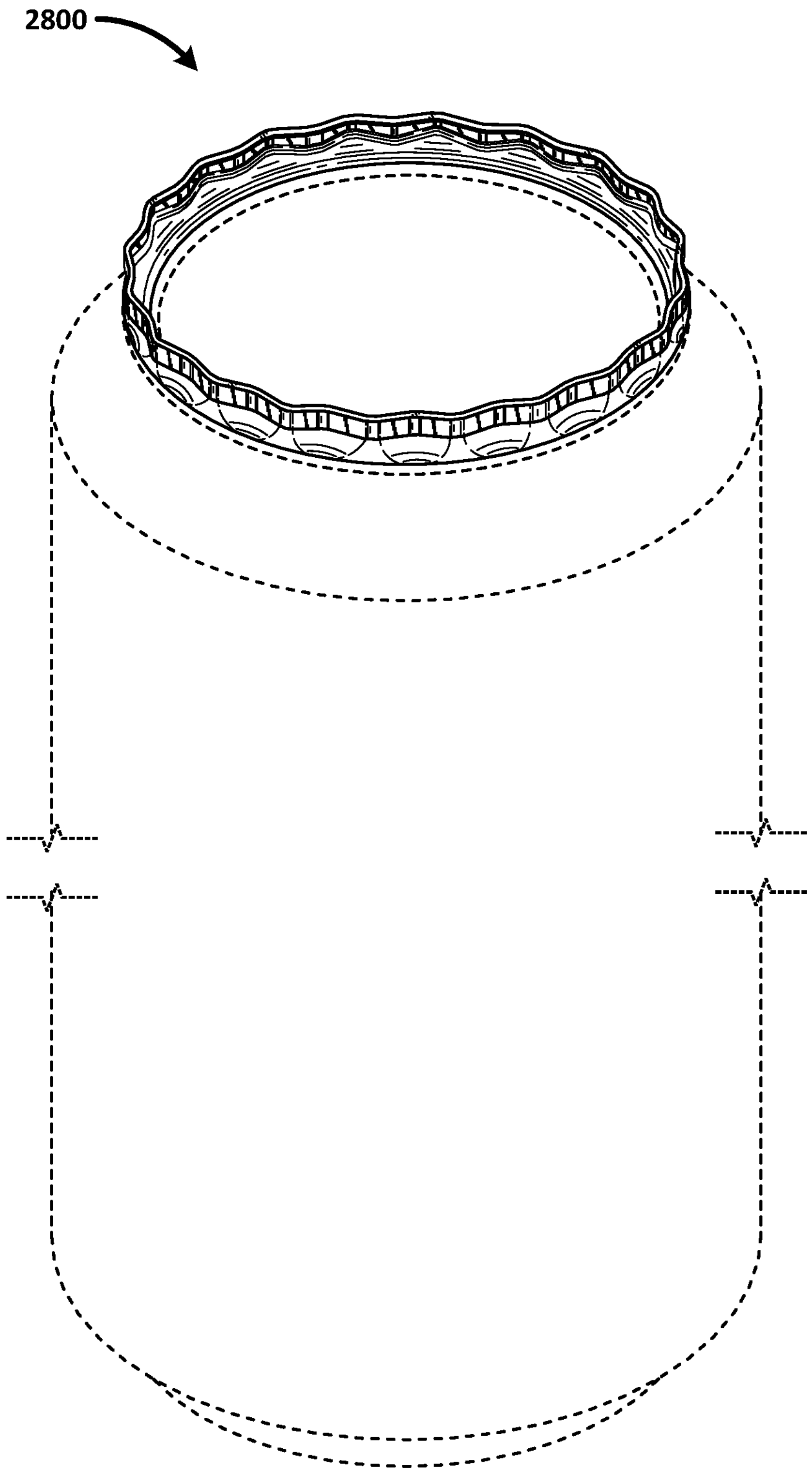
FIG. 28, FIG. 29, FIG. 30, FIG. 31, FIG. 32, FIG. 33, FIG. 34, FIG. 35, FIG. 36, and FIG. 37 depict exemplary views of a radially patterned can seam applied to malleable cans.
Figure 29:
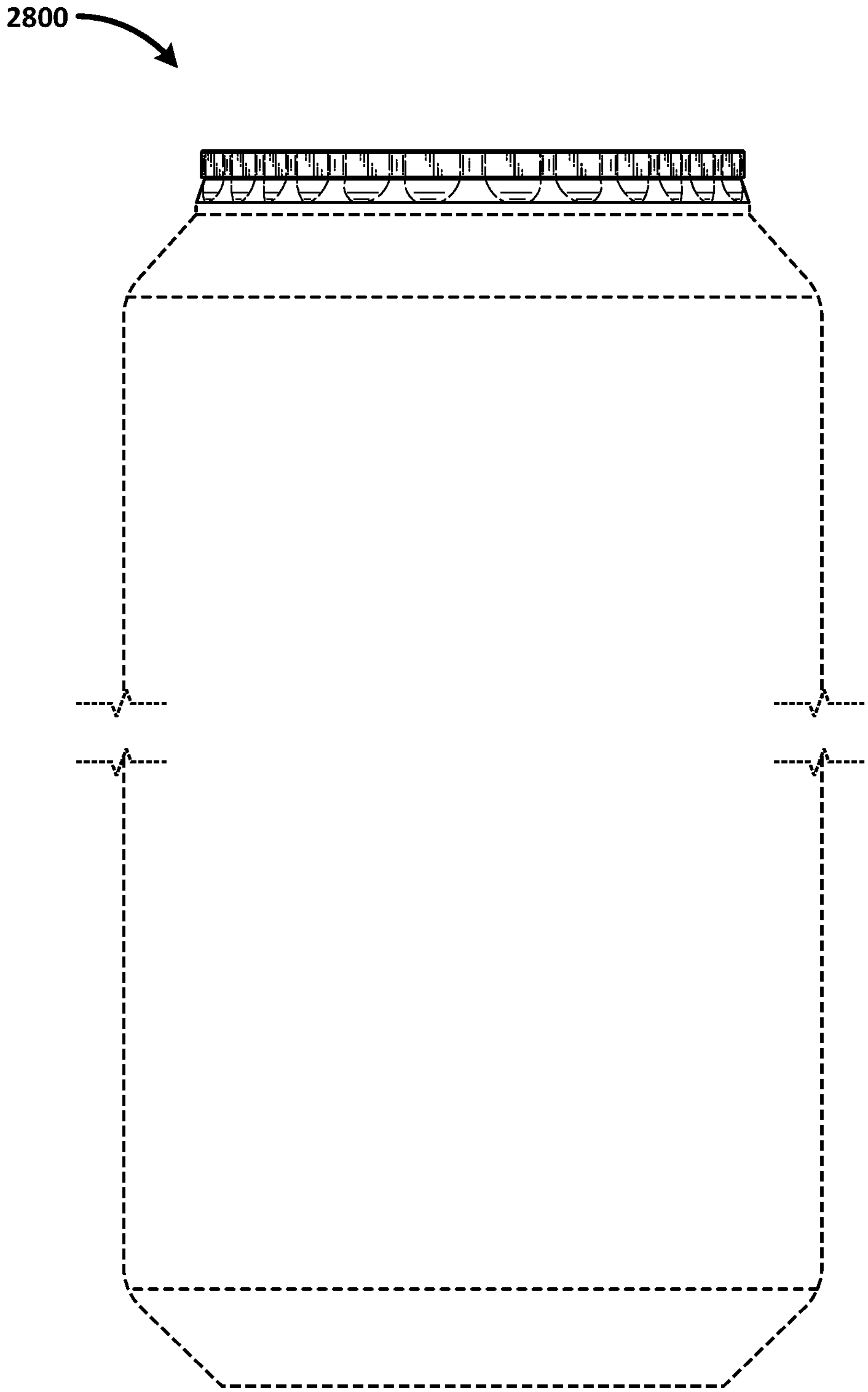
Figure 30:
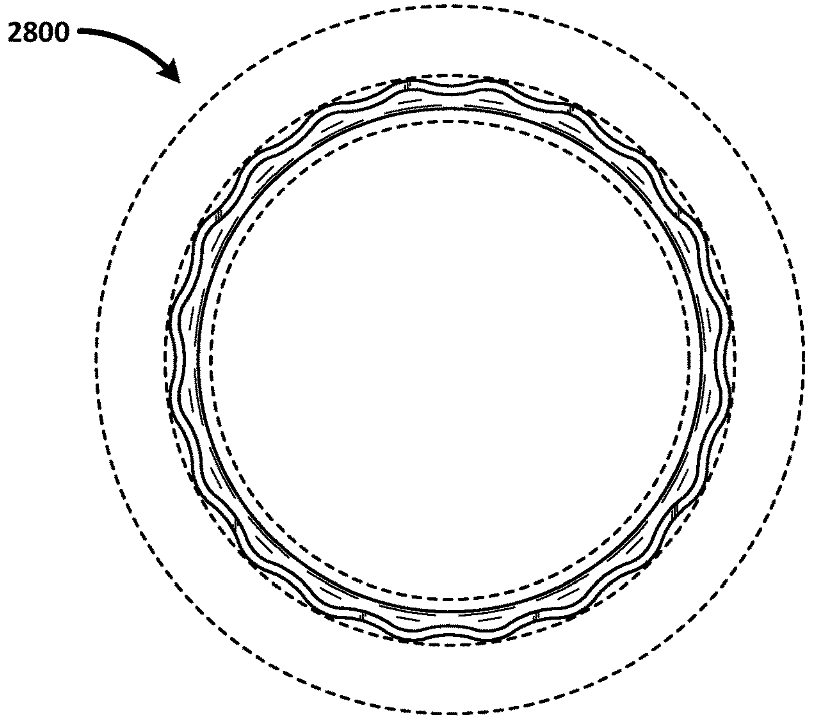
Figure 31:
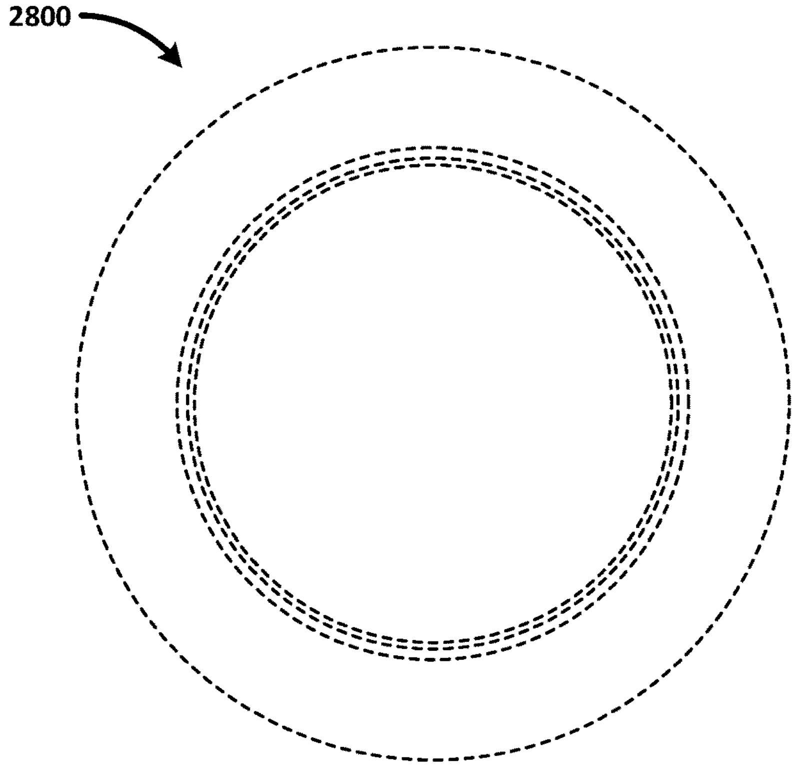
Figure 32:
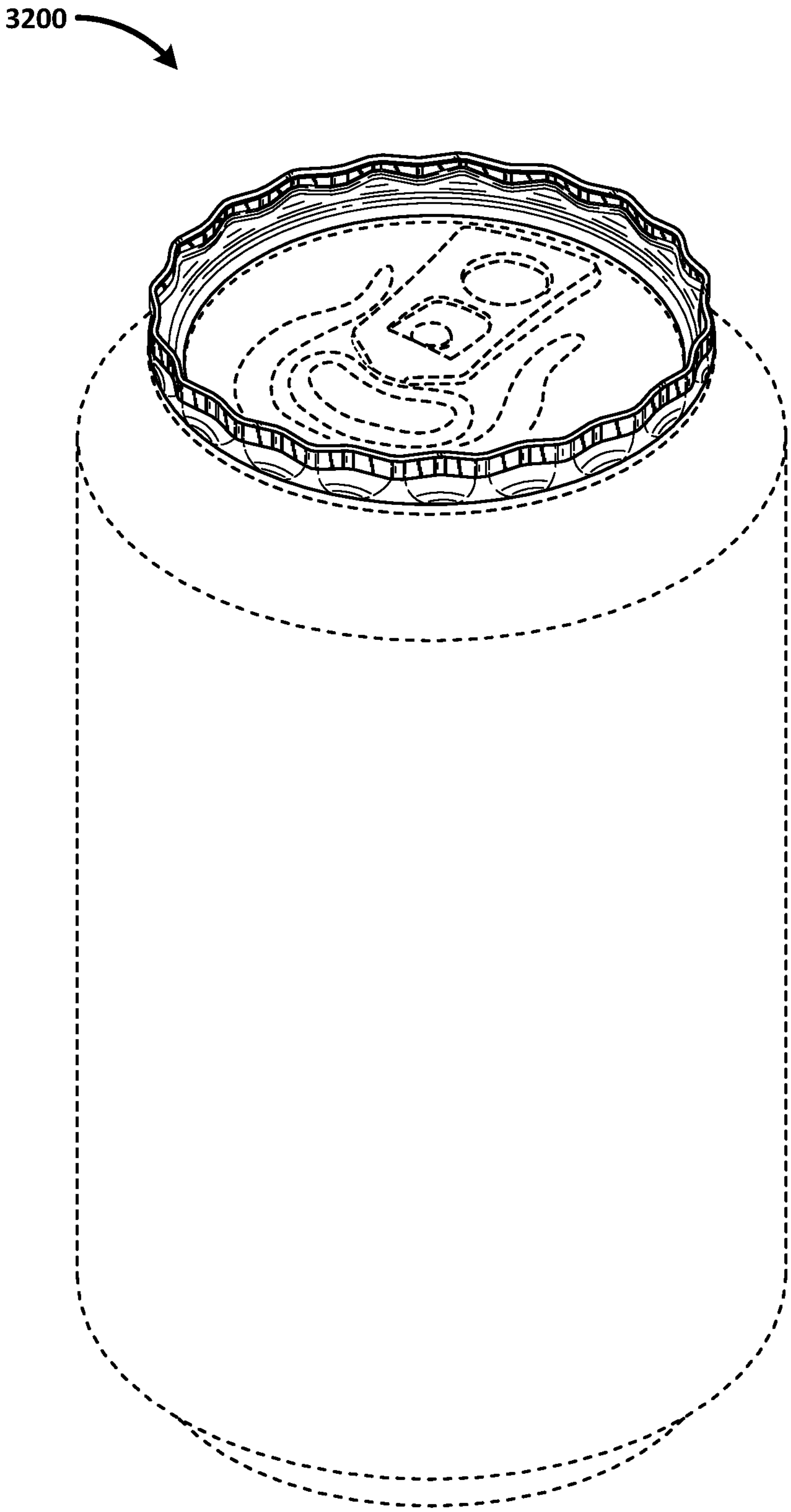
Figure 33:
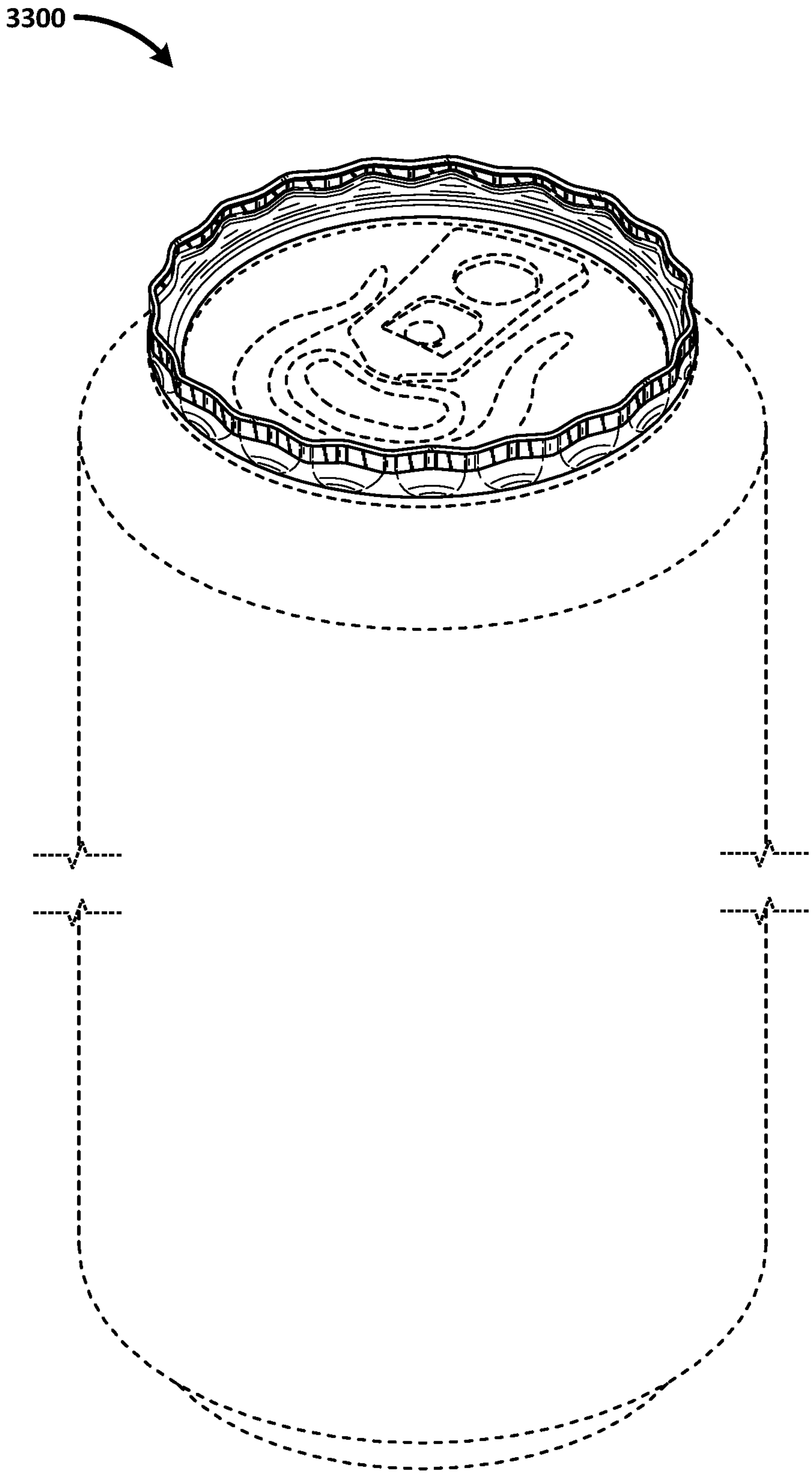
Figure 34:
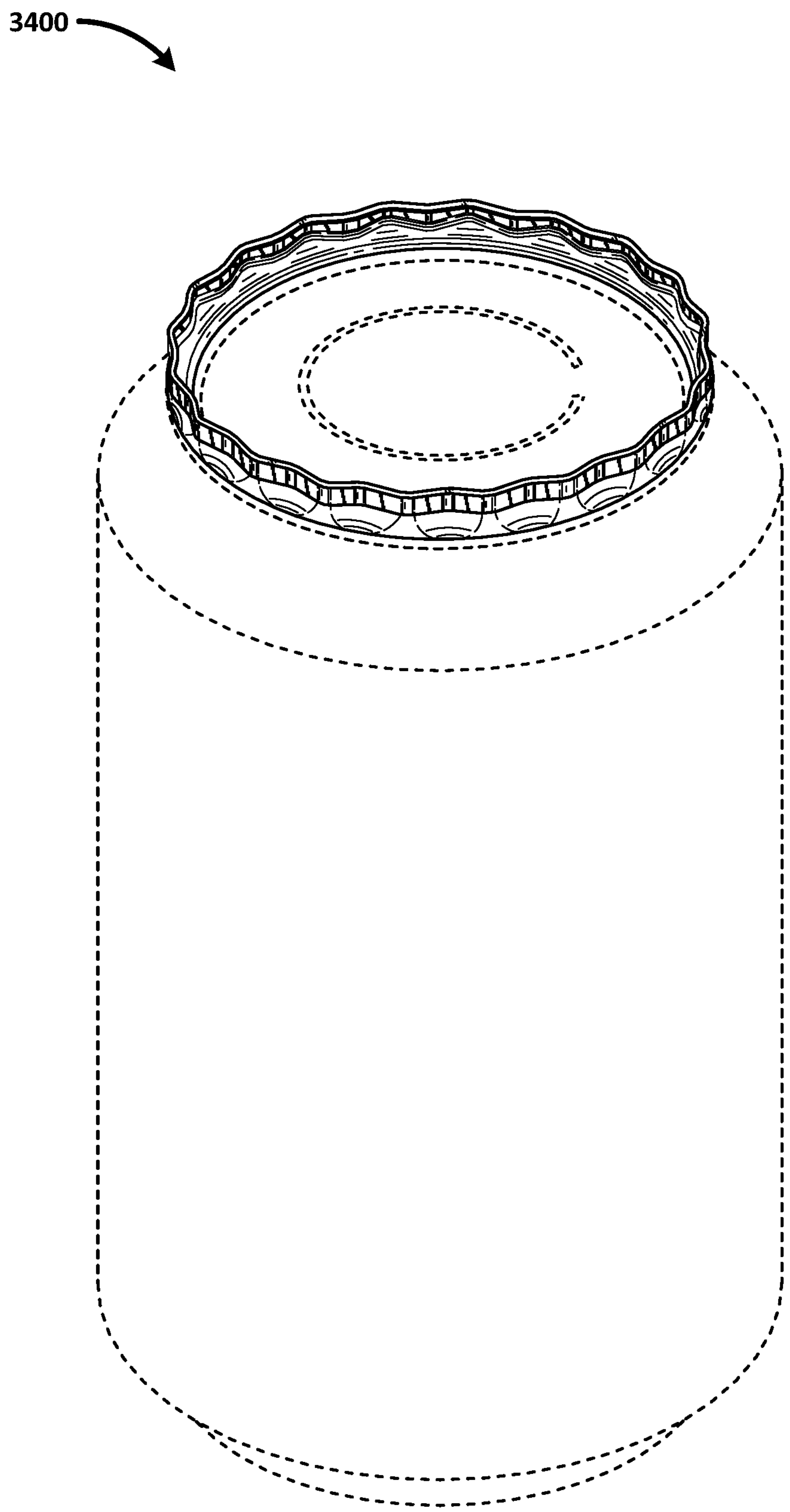
Figure 35:
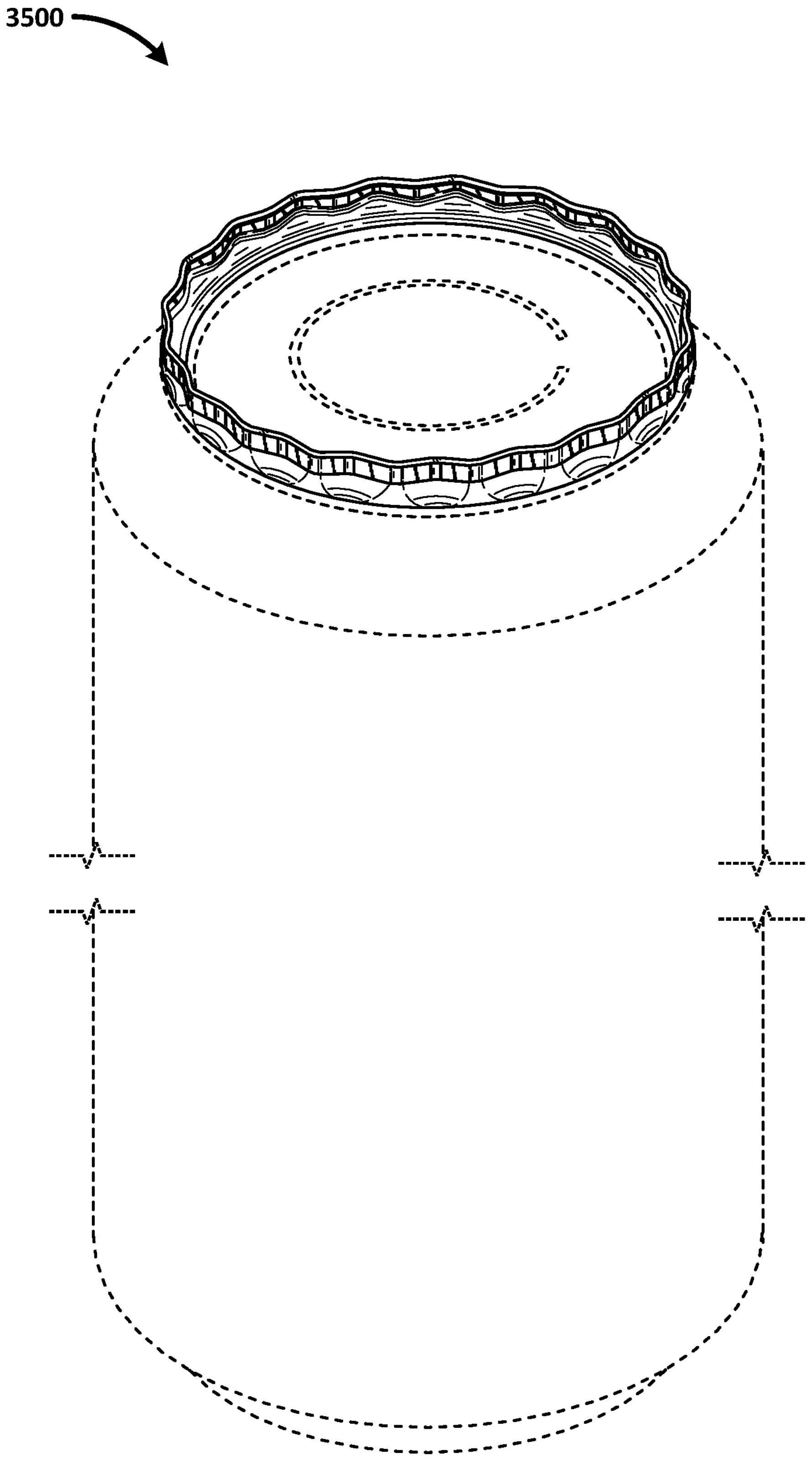
Figure 36:
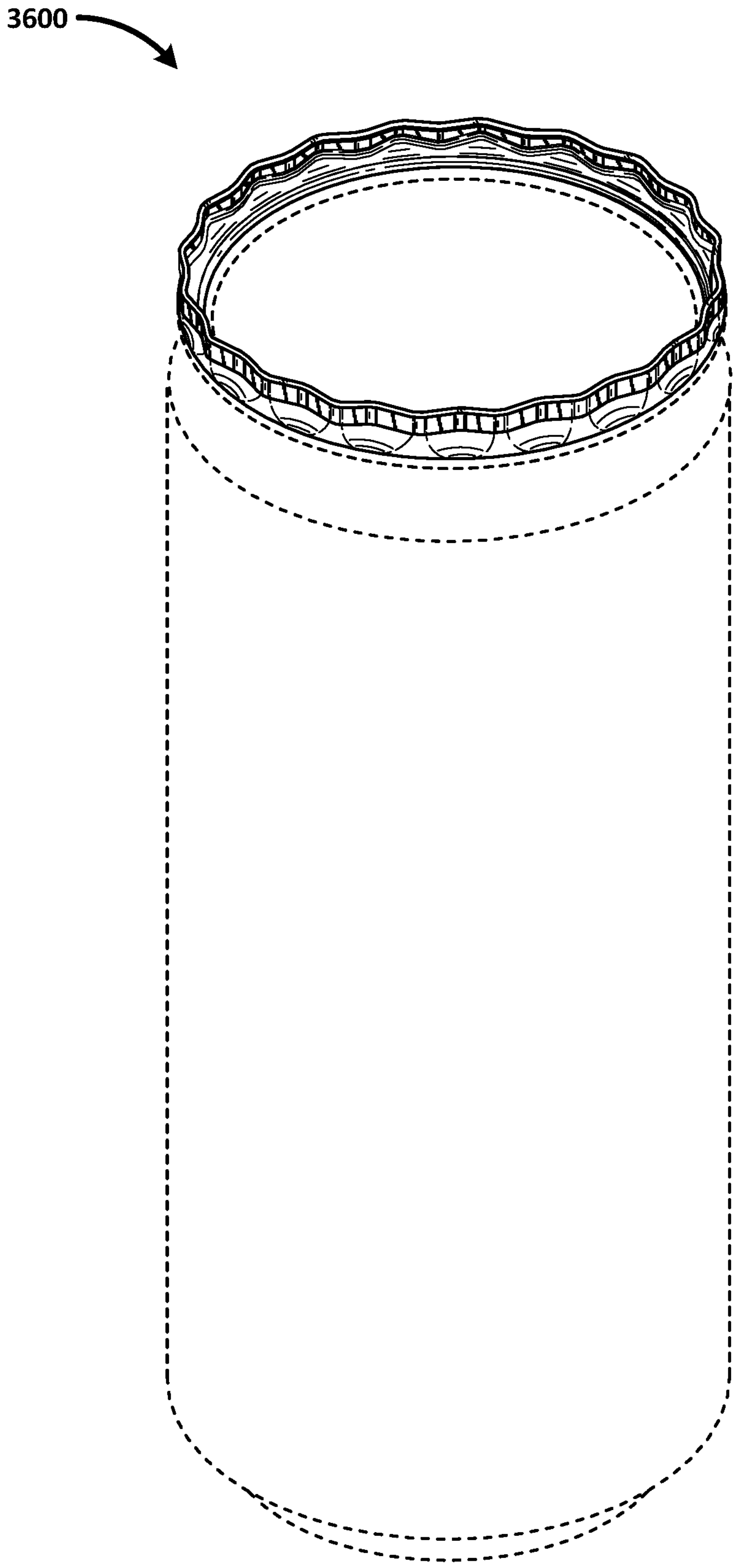
Figure 37:
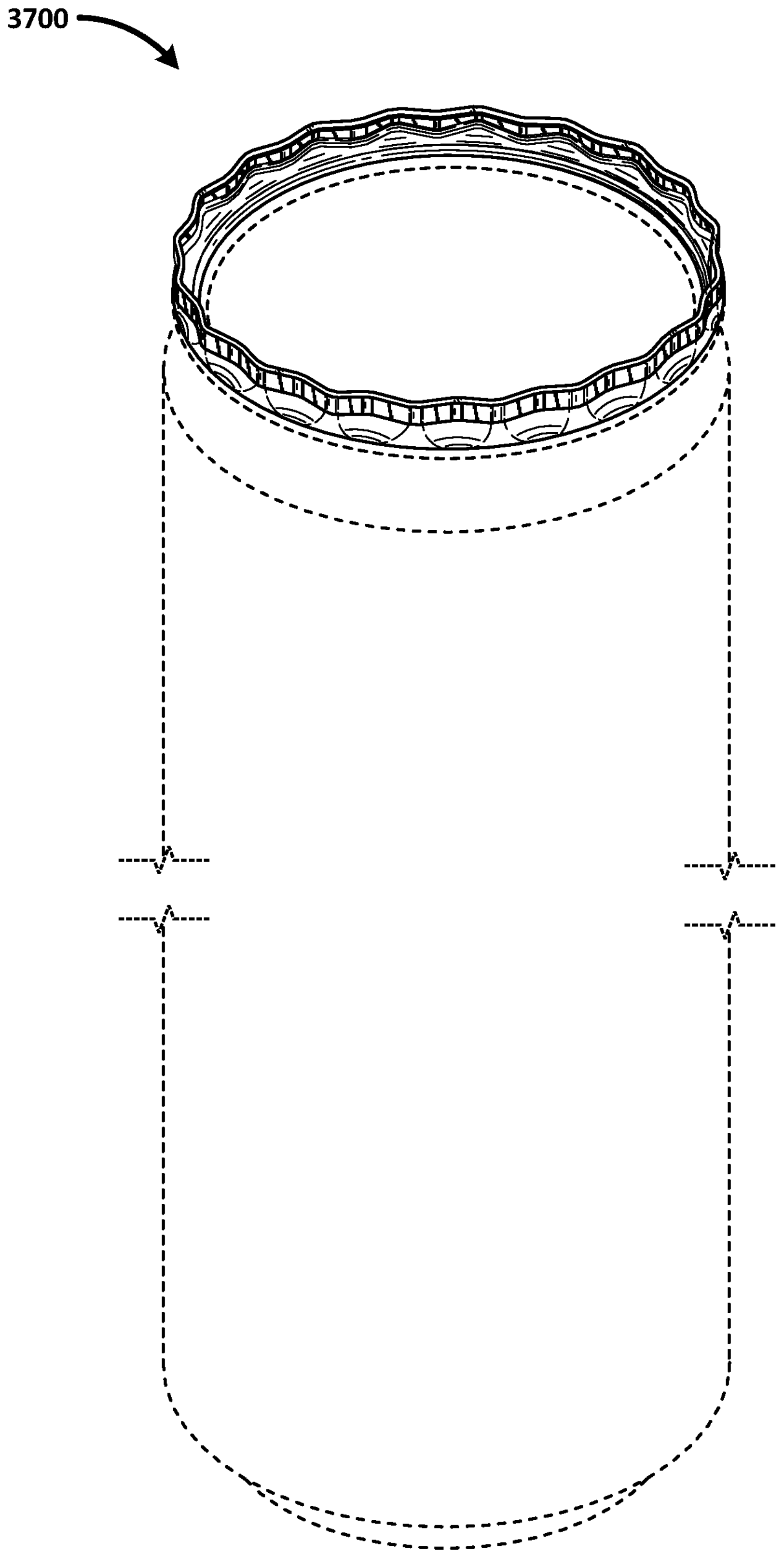

FIG. 27A and FIG. 27B depict exemplary multi-functional RDEs. A toilet cleaning assembly 2700, for example, includes a first housing 2705 and a second housing 2710. As depicted, the first housing 2705 includes a toilet bowl brush. The second housing 2710 includes a handle. An RDE (e.g., as disclosed at least with reference to the RDE 125) may, for example, be included in the second housing 2710 and/or the first housing 2705. The first housing 2705 is configured to receive a container 105 (e.g., with an end having a patterned seam oriented 'downwards' towards the toilet bowl brush). The container 105 may, for example, contain cleaning solution. Operation of the container 105 into the 2705 and/or assembly of the second housing 2710 to the first housing 2705 may, for example, open an aperture(s) into the container 105 (e.g., by engaging the patterned seam of the container 105 by an RDE in the first housing 2705 and advancing a hammer such as the hammer 235 axially against the can end). The interior of the container 105 may thereby be placed in fluid communication with the toilet bowl brush via at least one lumen. Accordingly, for example, the toilet cleaning assembly 2700 may advantageously provide a toilet bowl brush with a replaceable cleaning solution reservoir in (selective) fluid communication with the toilet bowl brush.

A deodorant dispensing assembly 2715, for example, includes a first housing 2720 and a second housing 2725. The first housing 2720 includes a roller, as depicted. An RDE may, for example, be included in the first housing 2720 and/or the second housing 2725. The first housing 2720 is configured to receive a container 105. The container 105 may, for example, contain deodorant. Operation of the container 105 into the first housing 2720 and/or the second housing 2725 may, for example, open an aperture(s) into the container 105 (e.g., by engaging the patterned seam of the container 105 by an RDE in the first housing 2720 and advancing a hammer such as the hammer 235 axially against the can end). The interior of the container 105 may thereby be placed in fluid communication with the roller via at least one lumen. Accordingly, for example, the deodorant dispensing assembly 2715 may advantageously provide a deodorant applicator with a replaceable deodorant reservoir in fluid communication with the roller.

Various such embodiments may, for example, advantageously provide a recyclable refill cartridge for an applicator (e.g., cleaning brush, roller applicator).

FIG. 28, FIG. 29, FIG. 30, FIG. 31, FIG. 32, FIG. 33, FIG. 34, FIG. 35, FIG. 36, and FIG. 37 depict exemplary views of a radially patterned can seam applied to malleable cans. Can 2800 depicts a radially patterned seam on a standard-style can. The can may be of different heights. The can end may have no score. The can end may have an invisible score (e.g., underneath the can end facing an interior of the can). Can 3200 and can 3300 depict a radially patterned seam on a standard-style can with an opening tab, a score line and a horseshoe-shaped axial reinforcement pattern. The can 3300 may be of different heights. Can 3400 and can 3500 depict a radially patterned seam on a standard-style can. The can end is provided with a C-score (visible). The can 3500 may be of different heights. Can 3600 and can 3700 depict a radially patterned seam on a sleek-style or slim-style can. The can end may have no score. The can end may have an invisible score (e.g., underneath the can end facing an interior of the can). The can 3700 may be of different heights. Dashed lines in FIGS. 28-37 may, for example, indicate features (e.g., can body, can end, scores, tab) not part of the radially patterning of the seam. For example, the radially patterned seam may be applied to other can bodies and/or can ends.

Although various embodiments have been described with reference to the figures, other embodiments are possible. For example, although an exemplary system has been described with reference to the figures, other implementations may be deployed in other industrial, scientific, medical, commercial, and/or residential applications.

In various embodiments a housing retaining and/or aligning element may be provided (e.g., on a housing, coupling engine, opening engine, or some combination thereof). An alignment element of a housing (e.g., housing 120) may, for example, engage an alignment element of a coupling engine (e.g., coupling engine 115) at a predetermined relative angular orientation. The aligning elements may, for example, engage when the housing is operated in a particular rotational direction (e.g., 'unscrewing,' such as counter-clockwise when viewed from a top of a container when viewed along the longitudinal axis). The aligning elements may, for example, engage when a user unscrews an RDE off a first container such that the RDE is prepared to be screwed onto a second container. For example, the aligning elements may engage at a predetermined position before (e.g., just before) the housing and coupling engine are completely unscrewed from one another such that the housing and coupling engine are still engaged together (e.g., by coupling features 220 and coupling features 215).

In various embodiments, a detent, a clip, and/or other retention feature(s) may be provided in at least one component of the RDE. For example, the retention features may releasably rotationally couple the housing and coupling engine when the aligning elements engage. In various embodiments, for example, an urging element (e.g., a spring, a flexible beam) may urge a retention feature in the housing or coupling engine into releasably coupling with a mating detent in the other of the housing or coupling engine. In various embodiments, for example, the retention features may retain the coupling engine and housing in a predetermined 'ready-to-apply' configuration (e.g., nearly unscrewed from one another). Accordingly, the retention features may advantageously prevent the coupling engine from accidentally 'screwing' into the housing before the user applies it to a container. The retention features may thereby prevent a user from having to reach into the RDE to restore the coupling engine to a desired configuration. Accordingly, various embodiments may advantageously reduce frustration, increase convenience, increase safety (e.g., preventing pinching, touching a (sharp) hammer), or some combination thereof.

In various embodiments an RDE may be configured to provide at least one visual indicium when the RDE is in a mode ready to remove to from a container (e.g., when the lugs are released from being deflected radially inwards). For example, at least some portion of a coupling engine (e.g., coupling engine 115) and/or opening engine (e.g., opening engine 1010) may be a different color (e.g., orange, red) than the housing (e.g., housing 120). In various embodiments, by way of example and not limitation, the visual indicium may, be generated by exposure of some portion of the coupling engine to view when the housing is 'unscrewed' to release the lugs (e.g., lugs 210). In various embodiments a window (e.g., an aperture in the housing, a portion of the housing at least partially transparent) may be provided which aligns with a visual indicium (e.g., a differently colored region of the coupling engine, a mark on the coupling engine, a mark on the container end) when the RDE is in a mode in which it can be (axially) removed from the container. Accordingly, a user may advantageously discern at a glance when the RDE is ready to separate from the container.

In various embodiments pressing features (e.g., pressing features 225) of a housing (e.g., housing 120) may, for example, be omitted. For example, a 'skirt' of the housing may be configured to engage lugs (e.g., lugs 210) of a coupling engine (e.g., coupling engine 115). In various embodiments ribs and/or other reinforcement features may, for example, be disposed on an outside circumference of the housing. In various embodiments ribs (e.g., inner, outer) disposed on the circumference of the housing may, by way of example and not limitation, serve for reinforcement, as pressing features (e.g., pressing features 225), or some combination thereof.

In various embodiments the ribs, may, by way of example and not limitation, be of a width (e.g., corresponding to an arc angle with reference to a radius from the center of the coupling engine) greater than a separation (e.g., 'gap') between lugs (e.g., lugs 210) of a corresponding coupling engine (e.g., coupling engine 115). In various embodiments, a spacing density of ribs relative to lugs (e.g., number of ribs on housing vs number of lugs on coupling engine) may be determined such that at least one rib is always engaging every lug. Accordingly, the ribs may be prevented from 'catching' between lugs when the housing is rotated relative to the coupling engine.

In various embodiments an RDE may be provided with an access control mechanism. For example, some embodiments may be configured to restrict access to contents to authorized personnel. For example, the RDE may releasably couple to the container and/or may releasably close a lumen (e.g., the lumen 240) of the RDE in communication with an interior of the container. In various embodiments the RDE may, by way of example and not limitation, be provided with an RFID-activated latch, a biometric (e.g., fingerprint, facial recognition activated) latch, a child-proof latch, or some combination thereof.

Various embodiments may be configured to meter and/or monitor dispensing of contents. For example, various embodiments may measure (e.g., mass, volume, quantity) liquid, powder, objects (e.g., capsules, tablets) dispensed through the RDE. For example, various embodiments may be provided with at least one proximity sensor, flow meter, rotation sensor (e.g., activated by a capsule rotating a lever arm), capacitive sensor (e.g., touch, volume), or some combination thereof. Various embodiments may, for example, store (e.g., locally, remotely) logging data of dispensing (e.g., measurements, access date/time, identity of person accessing the RDE). For example, the RDE may communicate (e.g., wirelessly, wired) with at least one remote controller and/or data store. Various such embodiments may be provided with at least one controller (e.g., processor, data store, non-volatile memory, random-access memory).

In various embodiments, an RDE may be provided with a handle. For example, a handle may be integrally formed into the RDE. In some embodiments, a movable (e.g., foldable, rotatable, telescoping) handle(s) may be provided in an RDE. The handle may, for example, be releasably coupled. The handle may, for example, be fixedly coupled to the RDE. In various embodiments, a handle may, for example, be releasably coupled to a container and/or housing configured to receive a container. For example, in some embodiments a handle may be releasably coupled to a container via at least a coupling engine (e.g., coupling engine 115) of an RDE. Various such embodiments may advantageously facilitate gripping, picking up, and/or otherwise manipulating an RDE and/or associated container.

In various embodiments at least one port may be provided in an RDE (e.g., in a housing) to introduce contents into the container. For example, a small port may be in communication with the lumen 240 and/or may separately open (e.g., puncture) a corresponding container end. Various embodiments may, for example, advantageously permit a user to 'rinse out' the last contents of the soap not (easily) accessible using a dispensing assembly (e.g., dispensing assembly 130) coupled to the RDE. In various embodiments the port may be configured such that contents of a container may be activated by introducing at least one ingredient through the port into the container. For example, the container may contain dehydrated and/or powdered edible substance (e.g., food, condiment such as ketchup, mustard). Water may be added through the port to reconstitute the food before dispensing. In various embodiments the contents of the container may, for example, be one part of a multi-part epoxy, urethane, or other chemical substance. Another component (e.g., hardener, catalyst) may be introduced into the container through the port.

In various embodiments, a container (e.g., container 105) may, for example, be recyclable. A recyclable container may, by way of example and not limitation, be a disposable can made of a recyclable material. Recyclable material may, for example, include aluminum, steel, other metals, or some combination thereof. In some embodiments recyclable material may, for example, include plastics. In some embodiments, recyclable material may, for example, include plant fibers (e.g., wood, bamboo).

For example, aluminum may be nearly infinitely recyclable. Many regions of the world have already achieved recycling rates from 45%-95% for aluminum. It is estimated that 75% of aluminum mined is still in circulation. In contrast, only 14% of current plastic bottles are recycled.

Accordingly, various embodiments may advantageously provide for use of highly recyclable containers, such as aluminum cans.

In various embodiments, sealed aluminum cans may, for example, advantageously protect contents (e.g., cosmetics) from degradation (e.g., from air or light). Such embodiments may, for example, advantageously reduce or eliminate a need for aluminizing and/or otherwise providing a 'barrier' lining in containers made from other materials.

Moreover, aluminum and similar cans may advantageously facilitate improved 360-degree branding incorporating, by way of example and not limitation, direct printing, color-changing inks, textured coatings, printable QR codes, and similar features. Accordingly, various embodiments may advantageously enable use of enhanced branding.

In various embodiments, a container (e.g., container 105) may contain a liquid such as, by way of example and not limitation, shampoo, bodywash, soap, hand soap, lotion, hand sanitizer, cleaner, cosmetics, other personal care items, or some combination thereof. In some embodiments, contents of a container may include a topical therapeutic formulation, other pharmaceutical or supplements, or some combination thereof. In some embodiments, contents of a container may include liquids and/or other fluids. For example, some embodiments may include flowable solids (e.g., powders, granules, capsules).

In various embodiments, a container may be configured to contain foods (e.g., condiments such as mayonnaise, ketchup, or mustard). The container may be provided with one or more appropriate linings. The container may, for example, be a standard aluminum or other can (e.g., as commonly used with carbonated beverages, energy drinks, other beverages) provided with a closure suitable for receiving a releasable, closure-opening cap (e.g., an RDE 125 or including an RDE). In some embodiments, the 'disposable' container may be refilled, if desired.

In various embodiments, a dispenser may, for example, include a standard liquid dispensing pump (e.g., as commonly used for hand soaps, lotions, and the like). In various embodiments, a dispenser may be omitted altogether. In various embodiments a dispenser may, for example, include a cap (e.g., a screw cap, a flip cap, a cap with sliding opening, or a cap with swiveling opening). Some embodiments may be provided with dispenser(s) configured as a pouring device (e.g., a funnel or spout). In some embodiments a dispenser may include a squirt top (e.g., as used in sport drinks, in shampoo, in topical applications). Various embodiments may include a metering dispenser. In some embodiments a dispenser may include a spray end (e.g., for household or commercial cleaners). Various embodiments may be configured with a ready-pour lid dispenser (e.g., for beverage ingredients used in mixing drinks), a child-proof lid (e.g., for use with pharmaceuticals). In some embodiments a dispenser may include, for example, a re-sealable top (e.g., for milk or other beverages).

In various embodiments, an RDE may be provided with an integrated dispenser. In some embodiments an RDE may be suitable for use directly. In some embodiments an RDE may include at least some portion of a dispenser apparatus integrated into the RDE. Various embodiments with reusable dispensers may advantageously facilitate, by way of example and not limitation, the use of a relatively higher quality, more durable, more accurate, more featureful, and/or otherwise more desirable dispenser than would typically be used with disposable containers.

In various embodiments, a closure-opening cap (e.g., an RDE) may, by way of example and not limitation, be formed from recyclable materials. For example, in some embodiments, the RDEs may be made predominantly or entirely of recyclable materials, non-plastic materials, or both. Such embodiments may advantageously, for example, facilitate a 'war on plastic' by reducing the use of non-recyclable or non-sustainable plastic materials.

In various embodiments, a tab-less closure (e.g., container end without a tab) may advantageously enhance public recognition of the resulting closed container as not holding edible beverages or other edible substances, including, for example, children and persons not able to read descriptions on the container. The tab-less closure may require a separate device to open (such as an RDE). Requiring a separate opening device may advantageously prevent persons (e.g., children or people unable to read description on the container) from opening and ingesting the can because they think it contains edible contents, such as a beverage.

In various embodiments, a tab-less closure may omit the opening tab common on many can ends. In conventional can body and can end combinations, the tab may account for 5-6% of the entire can. Embodiments having a tab-less can closure may, thus, advantageously reduce the material required by the can. Omitting the opening tab may facilitate omission of not only the tab, but the rivet which secures the tab to the can end.

Embodiments omitting an opening tab and associated rivet may, for example, permit omission of one or more manufacturing operations including: forming the tab, riveting the tab to the closure. Accordingly, a tab-less closure may advantageously reduce the cost and increase the speed of manufacturing. Additionally, a conventional opening tab may often fall off or be broken off after opening the can and being folded back out of the way. The tab may fall inside the can or may be lost and not recycled with the can. Accordingly, embodiments having a tab-less closure may advantageously reduce littering and improve the percentage of material recycled.

In conventional tab-opening can ends, the tab must often be pried up with a fingernail. This may be uncomfortable or distasteful, particularly, for example, if it risks breaking, chipping, or pulling fingernails. Embodiments having a tab-less can closure may advantageously provide an enhanced opening experience. Furthermore, conventional tab-opening can ends may leave one or more sharp edges exposed. For example, if the tab breaks off, a sharp edge may be left on both the tab and the can end where the tab was connected. The opening in the can end may have sharp edges. The edge of the can end piece which was torn out to open the can may likewise be sharp. Accordingly, embodiments having a tab-less closure opened by a reusable cap which is coupled to the can may advantageously eliminate sharp edges or shield sharp edges from access (e.g., to fingers or hands, particularly of children). Accordingly, various embodiments may provide multiple advantages in sustainability, recycling, cost-reduction, end-user experience, comfort, safety, or some combination thereof.

In various embodiments, tab-less closures may be made from a can alloy (e.g., including materials such as aluminum, magnesium, manganese). For example, such embodiments may advantageously enable use of conventional can body material for the can end. Such embodiments may advantageously increase use of recycled and/or recyclable material. Various embodiments may advantageously reduce or eliminate a need for pure and/or virgin aluminum in the can end to achieve tab-opening characteristics.

In various embodiments, a container and tab-less closure may be adapted as a disposable, recyclable, 'refill cartridge.'

For example, many hotels may ban single-use plastics. Accordingly, a recyclable, 'disposable' container may advantageously permit hospitality providers to meet sustainability and recyclability goals while still offering 'single-use,' hygienic personal care products to patrons.

In various embodiments, tab-less closure and container assemblies may be packaged as kits. For example, a kit may include a plurality of containers (e.g., with the same contents, or a 'sampler' of different contents) with a lesser number (e.g., single) of closure-opening dispensing caps (e.g., a cap assembly including a coupling ring, or a cap if adapted to not require a coupling ring). A kit may, for example, include multiple 'refill' can and closure assemblies with no dispensing cap. A kit may, for example, include multiple identical or different closure-opening dispensing caps. A kit may, for example, include one or more identical or different dispensers adapted to couple to a closure-opening dispensing cap. Various kits may, for example, provide consumers with advantages of economy, choice, or some combination thereof. In various embodiments, individual components may be sold separately or in multiples (e.g., container and closure assemblies, closure-opening dispensing caps, dispensers adapted to attach to a cap, coupling rings, tab-less container closures, or some combination thereof).

In various embodiments, a closure opening dispensing cap and retaining coupler may be formed as a single unit, for example, by forming the unit such that the coupler is rotatably coupled to the cap by one or more flexible elements. The flexible elements may, for example, operate as a 'living hinge' to allow the cap to rotate relative to the coupler. The flexible elements may provide, for example, a range of rotation of about a quarter-turn of the cap relative to the coupler. The coupler and cap may be adapted so that the cap is fully installed and has sufficiently opened the closure to permit dispensing within the range of rotation permitted by the flexible elements. Embodiments connecting the cap and coupler may advantageously facilitate ease of use in installing and may advantageously reduce cost of manufacturing by reducing the number of individual components and so at least reducing assembly required.

In various embodiments, a dispenser may, by way of example and not limitation, be configured as a mixing dispenser. For example, a mixing dispenser may be configured to mix from a plurality of different container and closure assemblies, each of which may be connected thereto by respective closure-opening dispensers. A mixing dispenser may, similarly, be configured to mix from at least one container and closure assembly and at least one refillable reservoir. The dispenser may be provided with an enclosure such as is disclosed in reference to FIGS. 13-15. For example, a dispenser may be configured to mix water from a refillable reservoir or replaceable container (e.g., a container and closure assembly) with a concentrate from a replaceable container and closure assembly. Such a dispenser may, for example, be used for mixing foaming hand soap. Again, a dispenser may be adapted to mix the contents of a plurality of replaceable containers. For example, a dispenser may be adapted to mix a custom personal care product, such as a lotion, by mixing a base lotion with one or more additives (e.g., essential oils, scents, and the like). In embodiments with multiple replaceable containers, the containers may be of similar size, or may be of disparate sizes (e.g., a larger base lotion container with smaller additive containers). Various such embodiments may offer multiple advantages including but not limited to reduction of transportation costs (e.g., by adding a readily available bulkier ingredient such as water at the point of use), increase of customizability (e.g., 'custom blends' by user selected combinations of bases and additives), or some combination thereof.

In various embodiments, a closure-opening dispensing cap (e.g., RDE) may be configured to introduce radial compression that radially deflects inward a plurality of tabs of a retaining coupler, thereby reducing a radius of deflection of the plurality of tabs such that the plurality of tabs engages a bottom shoulder portion of an annular feature of the container. The mean cross-sectional area may be defined as average cross-sectional area. The cap and coupler may be configured such that rotation of the dispensing cap relative to the retaining coupler may cause two operations including (a) releasably gripping the bottom shoulder portion, and (b) opening the container closure.

In various embodiments, rotation of the cap relative to the coupler may first cause the tabs of the coupler to engage a contoured annular feature of the container, and subsequently press an opening element of the cap against the closure such that it forms an aperture therein. The cap may threadedly engage the coupler by rotation of the cap relative to the coupler in a predetermined circumferential direction. The cap may be releasable from the coupler by threadedly disengaging the cap by rotation of the cap relative to the coupler in an opposite circumferential direction. The cap may have an opening member extending longitudinally down to pressingly engage the container closure in an arcuate path as the cap is axially advanced such that an aperture is created in the container closure.

In various embodiments, a dispensing mechanism may include, for example, a straw configured to accommodate different container sizes, such as variations in can heights. By way of example and not limitation, some such embodiments may be provided with a helical or spring-type straw such that the straw may extend to a maximum height but may be compressed to a shorter height. Such embodiments may, for example, advantageously allow a user to use a single dispenser with multiple container sizes.

In various embodiments, a dispensing cap may, for example, be provided with a gasket (e.g., a rubber gasket). The gasket may, for example, make a fluid-tight seal (e.g., 'water-tight' or 'air-tight') seal between the container and the dispensing cap. In various embodiments, a dispensing cap may be provided, by way of example and not limitation, with a pump mechanism and one-way valve. The pump mechanism may, for example, introduce air into an attached container with every dispensing action (e.g., pumping of soap). Such embodiments may, for example, advantageously reduce the likelihood of a recyclable container (e.g., an aluminum can) crushing as contents are dispensed, particularly in embodiments in which the dispensing cap may be sealed to the container.

In various embodiments, an RDE may be provided with more than one hammer. For example, various embodiments may be provided with, by way of example and not limitation, 2, 3, or more hammers. The hammers may, for example, be circumferentially distributed. Various embodiments may therefore advantageously reduce rotation required to open a container end (e.g., 2 hammers may allow a half-turn, 3 hammers may allow a third turn).

Various embodiments may be provided with one or more container end score (e.g., stress concentration region) reinforcement features. For example, a 'ridge' provided nearby (such as, by way of example and not limitation, within 0.5 mm) of at least some portion of a score may increase stress concentration at the score when a hammer is applied. Accordingly, force required to open a container end may be advantageously reduced.

In various embodiments a hammer may be configured as a (sharp) knife. The knife may, for example, 'cut' the container end open. Various such embodiments may, for example, not require a score. In various embodiments the knife may be hidden and/or shielded when the RDE is removed from a container. For example, the knife may be withdrawn behind a slot sized to prevent insertion of a body part (e.g., a finger) when the RDE is unscrewed off the container. For example, the knife may be configured to travel with the housing, may be spring-loaded and exposed when pressed down by the housing, or some combination thereof.

In various embodiments an RDE may, for example, be configured such as disclosed at least with reference to the RDE 125. In various embodiments, the housing 120 and the coupling engine 115 may be configured to remain coupled (e.g., as disclosed at least with reference to FIG. 26). For example, the housing 120 and the coupling engine 115 may be applied and/or removed from a can end as a single unit (e.g., in a two-stage action of snap on, then rotate to apply and/or rotate and then snap off to remove). In some embodiments, the housing 120 and the coupling engine 115 may be readily separable. For example, the coupling engine 115 may be operated onto a can end and then the housing 120 may be operated onto the coupling engine 115. To remove the RDE 125 from the can, the housing 120 may be removed, and then the coupling engine 115 may be removed.

In various embodiments a container and/or container end may be configured as described at least with reference to FIGS. 2-3 and 7A of U.S. Application Ser. No. 63/107,603, incorporated herein by reference. In various embodiments a housing, opening engine, and/or coupling engine may, by way of example and not limitation, be configured as disclosed at least with reference to FIGS. 1A-1B, 4A-5C, and 7B of U.S. Application Ser. No. 63/107,603, incorporated herein by reference.

In various embodiments the RDE may, by way of example and not limitation, be provided (e.g., 'pre-loaded') with contents (e.g., in a reservoir). When the RDE is assembled into fluid communication with a container (e.g., container 105), the contents of the RDE may, for example, mix with the contents of the container. The contents may, for example, induce a chemical reaction. For example, the contents of the RDE may be a hardener and/or catalyst configured to induce a chemical reaction in an epoxy base (e.g., resin) in the container. In various embodiments the contents of the container may, for example, be an edible substance (e.g., food), and the contents of the RDE may, for example, be a flavoring, preservation agent (e.g., to prevent spoilage and/or discoloring upon opening), nutritional supplement, and/or activator. In various embodiments, for example, the RDE may be pre-loaded with a disposable sachet (e.g., pierceable, tearable, dissolvable) which is dispensed (e.g., by piercing, tearing, dissolving, crushing) into the contents of the container when the RDE is assembled onto the container.

In various embodiments an RDE (e.g., a coupling engine 115) may be configured to engage a patterned container seam (e.g., seam 110) with bayonet-style members (e.g., instead of and/or in addition to lugs 210). The bayonet-style members may, for example, extend downward and be shaped like a hook such that an assembly motion of the coupling engine over the container end may align the bayonet-style members with a seam pattern element(s). A rotational motion about the longitudinal axis of the container may rotate the bayonet-style members to 'hook' under an adjacent seam pattern element(s). Accordingly, the RDE may be releasably coupled and resist axial disassembly of the RDE from the container.

In various embodiments outer forms of a seaming tool (e.g., as disclosed at least with reference to FIGS. 22-24) may be advanced against an inner form by actuators including, by way of example and not limitation, hydraulic actuators (e.g., hydraulic cylinders), electronic actuators, manually activated mechanical actuators, or some combination thereof.

In various embodiments an outer surface of outer forms (e.g., as disclosed at least with reference to FIGS. 23-24) may be configured to be operated by a collet. For example, each outer form may be slidingly attached to a scroll plate of a collet chuck such that operation of a rotary actuator to rotate the scroll plate may advance the outer forms radially inward. In some embodiments the outer forms may have a tapered outer surface such that a hollow ram may be advanced along the longitudinal axis such that an inner wall of the ram may engage the tapered surface and force the outer forms radially inward. In some embodiments a ram provided with an outer collet (e.g., a collar with a tapered lumen) may slidingly and/or threadedly engage outer forms having a matching threaded and (tapered) outer surface. Threaded engagement of the tapered lumen with the tapered outer surface of the outer forms may advance the outer forms radially inward.

In various embodiments a seaming device, such as is disclosed at least with reference to FIGS. 22-24, may be provided in an industrial canning line. For example, the seaming device may be configured as part of a module where a container end is introduced and/or seamed to a container after filling of the container and/or prior to cleaning, labeling, and/or other operations.

In various embodiments seaming tools may be provided with one or more different patterns. For example, seaming tools may be configured to create a lobed/sinusoidal pattern (e.g., as disclosed at least with reference to FIGS. 2, 19, and 22-24). In some embodiments, seaming tools may be configured to create one or more geometric (e.g., triangular, stepped) pattern elements. Some embodiments may be provided with seaming tools configured to create one or more irregular pattern elements. Various embodiments may, for example, be provided with seaming tools including custom decorative pattern elements (e.g., custom-designed by a designer, mimicking a pattern or object in nature or man-made). In various embodiments, a seaming tool may be interchangeable in a seaming device (e.g., seam 110). Accordingly, various patterned seams may be formed.

Various embodiments may, for example, provide pattern-differentiated RDEs for specific use-cases corresponding to specific container end patterns (e.g., as disclosed at least with reference to FIGS. 19-20). As an illustrative example, a first RDE may configured to (only) releasably couple to the first patterned seam 2005, a second RDE may be configured to (only) releasably couple to the second patterned seam 2010, and a third RDE may be configured to (only) releasably couple to the third patterned seam 2015. Each RDE may, for example, be provided with a corresponding coupling engine (e.g., coupling engine 115) configured to uniquely engage the pattern of the corresponding container end. For example, retention features 610 may be spaced in each specific coupling engine to only permit axial assembly of the RDE onto the container end with the corresponding pattern. Various embodiments may advantageously prevent coupling of an RDE onto a container with a non-matching end. Various embodiments may advantageously prevent cross-contamination of contents by use of a single RDE across incompatible contents.

For example, in various embodiments, an RDE may be provided with a dispensing mechanism configured to dispense a certain dose (e.g., quantity, volume, mass, weight), medication type (e.g., capsule, tab, liquid, powder), or some combination thereof. In various embodiments an RDE may be provided with indicia corresponding to a specific container content (e.g., medication). The indicia may, by way of example and not limitation, be visual (e.g., color, icon), haptic (e.g., Braille, depressions, protrusions, vibrational), audible, or some combination thereof. Accordingly, a content specific RDE may be configured to uniquely engage a specific container end pattern. The content specific RDE may thereby advantageously resist coupling to a container with a different container in the patent. Various such embodiments may advantageously improve safety.

In various embodiments unique end patterns may correspond to different classes of contents. For example, household (e.g., toxic) cleaners may be provided with at least one specific end pattern. Body products (e.g., lotions) may correspond to a different at least one specific end pattern. Medications may be provided with yet a different at least one specific end pattern. Various end patterns may, for example, be defined by one or more standards and/or governmental organizations (e.g., ISO, ANSI, FDA).

Various embodiments may provide a recyclable container with a tab-less opening closure and a contoured-rim closure. For example, a closure rim (e.g., seam 110) may be contoured with repeating concave regions of substantially equal width. The repeating concave regions of the closure rim may advantageously provide releasable engagement features, for example, for a closure-opening cap.

In various embodiments, a contoured rim may be formed with a variety of different contours. The contours may, by way of example and not limitation, correspond to different purposes, contents, manufacturers, markets, or some combination thereof. In various embodiments, a contoured rim of a distinct appearance and/or a tab-less closure may advantageously identify a container's contents as non-drinkable goods, without requiring further description or labeling. For example, various embodiments may provide container lids and self-opening dispensing mechanisms for contents that are not ready to consume. Various such embodiments may, for example, advantageously identify the contents as not "ready to consume," even in the absence of labeling to that effect.

Some embodiments may provide an exemplary container end opening test device. For example, a test device may be provided with a threaded presser. The presser may engage a collar. The collar may threadedly engage with a coupler. A coupler may be configured to releasably couple to a container (e.g., a can, such as by the seam 110). The presser may be rotationally operated to axially advance in the collar towards the coupler, such that the presser axially displaces a spacer. Axial displacement of the spacer may cause downward deflection of a hammer about a flexion beam.

Some embodiments may, for example, provide an exemplary container end opening test set up. In the depicted example, a container 105 may be fitted with a test device having a flexion beam and hammer at the end of a beam. The test device may be provided with a pressing foot configured to axially deflect the flexion beam and thereby press the hammer into an end of the container 105. The test device may, for example, be provided with an electronic display. As the pressing foot is axially advanced towards the container 105, force applied may be measured and displayed on the display. Accordingly, force required to open the container end with the hammer may, for example, advantageously be measured.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a can closure may include a malleable can end sealingly coupled to an open aperture end of a longitudinally extending malleable can body by a circumferential seam to form a sealed can-defining cavity. The circumferential seam may include a pattern of radial displacement of material of at least the malleable can end with respect to a longitudinal axis of the can.

The circumferential seam may include a pattern of radial displacement of material of the malleable can end and the malleable can body with respect to the longitudinal axis of the can. The pattern of radial displacement may include a plurality of repeating radial displacement features. The plurality of repeating radial displacement features may be substantially uniformly circumferentially distributed.

The plurality of repeating radial displacement features may include at least eighteen radial displacement features. The pattern of radial displacement may include a substantially sinusoidal lobe. A cross-section, in a plane orthogonal to the longitudinal axis, of the pattern of radial displacement may be substantially defined by a repeating sinusoidal curve in a circle centered on the longitudinal axis of the can. The pattern of radial displacement may be selected to identify contents of the can.

The malleable can end may further include a curvilinear score. The score may correspond to a region of elevated stress concentration in the malleable can end. The curvilinear score may be substantially circular. The curvilinear score may be interrupted by at least one bridge.

The can closure may further include a tab coupled to the malleable can end. The tab may be configured to be operated by a user to introduce an aperture in the malleable can end. The aperture may provide fluid communication between the cavity and an exterior of the can.

In an illustrative aspect, a can-opening dispenser may include a first collar comprising at least one radially displaceable element, a second collar configured to threadedly engage with the first collar, and at least one opening member coupled to at least one of the first collar and the second collar. The at least one radially displaceable element may be brought into register with a radially patterned seam of a can end of a can. When the second collar is threadedly engaged with the first collar and operated in a first rotational direction, the at least one radially displaceable element may be operated into releasably engagement with the radially patterned seam such that the first collar resist rotation relative to the can about a longitudinal axis of the can. Continued operation of the second collar in the first rotational direction may axially advance the at least one opening member against the can end such that an interior of the can is in fluid communication with an exterior of the can via the can end.

The can-opening dispenser may further include a dispensing member configured such that the interior of the can and the exterior of the can, via the can end, are in selective fluid communication through the dispensing member. The dispensing member may be configured to releasably couple to at least one of the first collar and the second collar. The dispensing member may include a liquid pump. The dispensing member may further be in fluid communication with a source of a mixing fluid. The dispensing member may be configured such that, when the dispensing member is operated, contents of the can are combined with the mixing fluid.

The can may include thermodynamically solid contents.

The at least one opening member may be configured to register with a predetermined region of elevated stress concentration in the can end such that, when the at least one opening member is axially advanced against the can end, the at least one opening member induces material failure of the can end substantially at the predetermined region.

The at least one opening member may include an opening feature extending from the second collar, along the longitudinal axis when the second collar threadedly engages the first collar and the at least one radially displaceable element is operated into releasably engagement with the radially patterned seam. A distal end of the opening feature may include an inclined plane relative to a first plane orthogonal to the longitudinal axis of the can.

The second collar may include a skirt configured such that, when the second collar threadedly engages the first collar and the at least one radially displaceable element is operated into releasably engagement with the radially patterned seam, the skirt extends along an outer surface of the can in a direction substantially parallel to the longitudinal axis of the can. The skirt may be configured to receive and support substantially an entirety of a user's grip when the user is dispensing contents from the can, such that the skirt resists crushing of the can by the user's grip.

The can-opening dispenser may further include a housing configured to removably receive the can. The housing may be configured to releasably couple to at least one of the first collar and the second collar.

In an illustrative aspect, a can seaming system may include an inner tool including a first surface defined by a nominal first radius and having a first pattern of radial displacement relative to the first radius, and an outer tool having a second surface defined by a nominal second radius. The second surface may have a second pattern of radial displacement relative to the second radius. The second pattern may be configured to mesh with the first pattern when the inner tool and the outer tool are brought into register such that the first radius is axially aligned with the second radius. When the inner tool and the outer tool are brought into register, separated by a malleable seam of a can end, and a radially compressive force is applied urging the inner tool and the outer tool radially together, the first pattern and the second pattern may cooperate to deform the malleable seam into a circumferential pattern of radial displacement while substantially maintaining a total perimeter length of the malleable seam.

The malleable seam may couple a malleable can end to a can body such that the malleable can end closes an aperture into a cavity defined by a wall of the can body. When the inner tool and the outer tool are brought into register, the malleable seam may be in an unsealed state. The inner tool and outer tool may be configured such that applying the radially compressive force urging the inner tool and the outer tool radially together forms the malleable can seam into a sealed state sealingly coupling the malleable can end to the can body.

The first surface of the inner tool may be a generally convex surface. The second surface of the outer tool may be a generally concave surface.

The first pattern of radial displacement of the inner tool may include a plurality of repeating radial displacement features. The plurality of repeating radial displacement features may be substantially uniformly circumferentially distributed.

The inner tool and the outer tool may be mechanically coupled as a unitary structure.

At least one of the first surface and the second surface may include a plurality of radially displaceable elements configured such that application of the radially compressive force urging the inner tool and the outer tool radially together includes inducing radial displacement of the plurality of radially displaceable elements towards an opposing surface of the at least one of the first surface and the second surface.

The radial displacement of the plurality of radially displaceable elements may be induced by axial advancement of a ram along a second axis substantially parallel to a longitudinal axis of a can coupled to the can end. The radial displacement of the plurality of radially displaceable elements may be induced by advancement of a ram along a second axis substantially parallel to the first radius.

At least one of the inner tool and the outer tool may oscillate along a second axis substantially parallel to the first radius as the malleable seam rotates relative to the inner tool and the outer tool.

In an illustrative aspect, a can-opening dispensing housing may include a first housing comprising a first circumferential engagement member (CEM), a second housing comprising a second CEM configured to threadedly engage the first CEM such that the first housing and the second housing are releasably coupled to define a cavity, an opening member configured to extend into the cavity when the first housing and the second housing are releasably coupled, and a dispensing member comprising a conduit and configured to releasably couple to the first housing. When a can having a first end is disposed in the cavity such that the first end is brought into register with the opening member, and at least one of the first housing and the second housing are operated in a first rotational direction such that the first CEM engages the second CEM, continued operation in the first rotational direction may advance the opening member against the first end of the can such that at least one aperture is introduced in the first end. When the dispensing member is releasably coupled to the first housing, the conduit may extend into the at least one aperture such that an interior of the can is in fluid communication with an exterior of the cavity via the dispensing member.

The dispensing member may include a pump. The dispensing member may be configured to be operated such that the interior of the can is in selective fluid communication with the exterior of the cavity via the dispensing member.

The opening member may be configured to receive the dispensing member. The opening member may be configured to register with a predetermined region of elevated stress concentration in the first end such that, when the opening member is axially advanced against the first end, the opening member induces material failure of the can end substantially at the predetermined region. The opening member may include an opening feature extending from the first housing, along a longitudinal axis of the can when the first housing and the second housing are brought into register and operated such that the first CEM engages the second CEM. A distal end of the opening feature may include an inclined plane relative to a first plane orthogonal to the longitudinal axis of the can.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A can closure comprising:
- a malleable can end (115) sealingly coupled to an open aperture end (205) of a longitudinally extending malleable can body (105) by a circumferential seam to form a sealed can-defining cavity,
- wherein an outer surface of the circumferential seam (110) comprises:
  - a pattern of radially varying displacement of material of at least the malleable can end (115) about a longitudinal axis of the can body (105),
  - wherein the malleable can end comprises the circumferential seam sealing the can end to the can body and the circumferential seam includes the pattern of radially varying displacement of material of the malleable can end and further of the malleable can body, and,
  - wherein the pattern of radially varying displacement is formed after sealing the can end to the can body.

2. The can closure of claim 1, wherein the circumferential seam includes a pattern of radial displacement of material of the malleable can end and the malleable can body with respect to the longitudinal axis of the can.

3. The can closure of claim 1, wherein the pattern of radial displacement comprises a plurality of repeating radial displacement features.

4. The can closure of claim 3, wherein the plurality of repeating radial displacement features is substantially uniformly circumferentially distributed.

5. The can closure of claim 3, wherein the plurality comprises eighteen radial displacement features.

6. The can closure of claim 1, wherein the pattern of radial displacement comprises a substantially sinusoidal lobe.

7. The can closure of claim 1, wherein a cross-section, in a plane orthogonal to the longitudinal axis, of the pattern of radial displacement is substantially defined by a repeating sinusoidal curve in a circle centered on the longitudinal axis of the can.

8. The can closure of claim 1, wherein the pattern of radial displacement is capable of identifying contents of the can.

9. The can closure of claim 1, the malleable can end further comprising a curvilinear score, the score corresponding to a region of elevated stress concentration in the malleable can end.

10. The can closure of claim 9, wherein the curvilinear score is substantially circular and is interrupted by at least one bridge.

11. The can closure of claim 1, further comprising a tab coupled to the malleable can end and configured to be operated by a user to introduce an aperture in the malleable can end, the aperture providing fluid communication between the cavity and an exterior of the can.

12. The can closure of claim 1, wherein the circumferential seam comprises a continuous region of deformation of the can body and the malleable can end coupled into a direct, sealing contact.

13. The can closure of claim 1, wherein the circumferential seam is substantially orthogonal to the longitudinal axis of the can.

14. The can closure of claim 9, wherein the curvilinear score comprises one or more regions at an underside of the malleable can end such that the curvilinear score is interior to the cavity of the malleable can end.

15. The can closure of claim 10, wherein the curvilinear score circumscribes a tabless panel.

16. A can closure comprising:
- a malleable can end configured to sealingly couple to an open aperture end of a longitudinally extending malleable can body by a circumferential seam to form a sealed can-defining cavity,
  - wherein an outer surface a perimeter of the malleable can end comprises a pattern of radially varying displacement of material of at least the malleable can end about a longitudinal axis of the can body,
  - wherein the malleable can end comprises the circumferential seam sealing the can end to the can body and the circumferential seam includes the pattern of radially varying displacement of material of the malleable can end and further of the malleable can body, and,
  - wherein the pattern of radially varying displacement is formed after sealing the can end to the can body.

17. The can closure of claim 16, wherein the malleable can end further comprises a circular score circumscribing a tabless panel centered in the malleable can end, the score corresponding to a region of elevated stress concentration in the malleable can end.

* * * * *